US012799239B2

(12) United States Patent
Stevens et al.

(10) Patent No.: US 12,799,239 B2
(45) Date of Patent: Nov. 17, 2026

(54) FINES REDUCTION AND AGGLOMERATION OF CATALYST SYSTEM COMPONENTS FOR USE IN OLEFIN POLYMERIZATIONS

(71) Applicant: Chevron Phillips Chemical Company LP, The Woodlands, TX (US)

(72) Inventors: Micheal P. Stevens, Bartlesville, OK (US); Kathy S. Clear, Bartlesville, OK (US); Max P. McDaniel, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 19/394,995

(22) Filed: Nov. 20, 2025

(65) Prior Publication Data

US 2026/0146109 A1 May 28, 2026

Related U.S. Application Data

(60) Provisional application No. 63/724,444, filed on Nov. 25, 2024.

(51) Int. Cl.
*C08F 10/02* (2006.01)

(52) U.S. Cl.
CPC .................................... *C08F 10/02* (2013.01)

(58) Field of Classification Search
CPC ... C08F 10/00; C08F 10/02; B01J 8/10; B01J 8/20; B01J 8/224
See application file for complete search history.

(56) References Cited

U.S. PATENT DOCUMENTS

| | | | |
|---|---|---|---|
| 3,248,179 | A | 4/1966 | Norwood |
| 4,060,480 | A | 11/1977 | Reed |
| 4,124,699 | A | 11/1978 | Michel |
| 4,452,910 | A | 6/1984 | Hopkins |
| 4,501,885 | A | 2/1985 | Sherk |
| 4,588,790 | A | 5/1986 | Jenkins, III |
| 4,599,321 | A | 7/1986 | Rainis |

(Continued)

FOREIGN PATENT DOCUMENTS

| | | | |
|---|---|---|---|
| WO | 2008132059 | A1 | 11/2008 |
| WO | 2013092195 | A1 | 6/2013 |

OTHER PUBLICATIONS

Pinnavaia, Thomas J., "Intercalated Clay Catalysts," Apr. 22, 1983, pp. 365-371, vol. 220, No. 4595, Science.

(Continued)

*Primary Examiner* — Michael P Wieczorek
(74) *Attorney, Agent, or Firm* — Merchant & Gould P.C.

(57) ABSTRACT

Methods for modifying a catalyst system component include the steps of contacting the catalyst system component with a fluid to form either a paste or agglomerated particles, depending upon the relative amount of fluid used based on the void volume of the catalyst system component, followed by drying and comminuting to form a modified catalyst system component. The amount of the modified catalyst system component having a particle size of less than or equal to 10 μm is less than that of the catalyst system component. Specific catalyst component compositions and ethylene polymer compositions characterized by their respective particle size distributions also are disclosed.

22 Claims, 13 Drawing Sheets

(56) References Cited

U.S. PATENT DOCUMENTS

| | | | | |
|---|---|---|---|---|
| 4,659,690 | A * | 4/1987 | McDaniel | C08F 10/00 264/117 |
| 5,352,749 | A | 10/1994 | Dechellis | |
| 5,376,611 | A | 12/1994 | Shveima | |
| 5,436,304 | A | 7/1995 | Griffin | |
| 5,565,175 | A | 10/1996 | Hottovy | |
| 5,575,979 | A | 11/1996 | Hanson | |
| 6,239,235 | B1 | 5/2001 | Hottovy | |
| 6,262,191 | B1 | 7/2001 | Hottovy | |
| 6,613,712 | B1 | 9/2003 | McDaniel | |
| 6,686,306 | B2 * | 2/2004 | Shih | C08F 10/00 526/170 |
| 6,833,415 | B2 | 12/2004 | Kendrick | |
| 6,936,667 | B2 | 8/2005 | Jensen | |
| 7,026,494 | B1 | 4/2006 | Yang | |
| 7,041,617 | B2 | 5/2006 | Jensen | |
| 7,119,153 | B2 | 10/2006 | Jensen | |
| 7,148,298 | B2 | 12/2006 | Jensen | |
| 7,199,073 | B2 | 4/2007 | Martin | |
| 7,247,594 | B2 | 7/2007 | Jayaratne | |
| 7,294,599 | B2 | 11/2007 | Jensen | |
| 7,312,283 | B2 | 12/2007 | Martin | |
| 7,449,030 | B2 | 11/2008 | Robson | |
| 7,470,758 | B2 | 12/2008 | Jensen | |
| 7,531,606 | B2 | 5/2009 | Hendrickson | |
| 7,534,842 | B2 | 5/2009 | Jayaratne | |
| 7,576,163 | B2 | 8/2009 | Yang | |
| 7,598,327 | B2 | 10/2009 | Shaw | |
| 7,601,665 | B2 | 10/2009 | McDaniel | |
| 7,619,047 | B2 | 11/2009 | Yang | |
| 7,629,284 | B2 | 12/2009 | Jensen | |
| 7,884,163 | B2 | 2/2011 | McDaniel | |
| 8,309,485 | B2 | 11/2012 | Yang | |
| 8,623,973 | B1 | 1/2014 | McDaniel | |
| 8,637,420 | B2 | 1/2014 | Yang | |
| 8,703,886 | B1 | 4/2014 | Yang | |
| 8,809,219 | B2 | 8/2014 | Yang | |
| 8,822,608 | B1 | 9/2014 | Bhandarkar | |
| 8,916,494 | B2 | 12/2014 | McDaniel | |
| 8,932,975 | B2 | 1/2015 | Yang | |
| 9,017,811 | B2 | 4/2015 | Te | |
| 9,023,959 | B2 | 5/2015 | McDaniel | |
| 9,346,896 | B2 | 5/2016 | McDaniel | |
| 9,365,667 | B2 | 6/2016 | McDaniel | |
| 9,670,296 | B2 | 6/2017 | McDaniel | |
| 10,239,975 | B2 | 3/2019 | McDaniel | |
| 10,676,553 | B2 | 6/2020 | McDaniel | |
| 10,919,996 | B2 | 2/2021 | McDaniel | |
| 11,125,680 | B1 | 9/2021 | Yang | |
| 11,208,514 | B2 | 12/2021 | McDaniel | |
| 11,300,501 | B1 | 4/2022 | Yang | |
| 11,420,196 | B2 | 8/2022 | McDaniel | |
| 11,801,502 | B2 | 10/2023 | Scott | |
| 11,912,809 | B2 | 2/2024 | McDaniel | |
| 11,999,814 | B2 | 6/2024 | McDaniel | |
| 2003/0037415 | A1 * | 2/2003 | Alt | C09C 1/3036 502/9 |

OTHER PUBLICATIONS

Thomas, J. M., "Sheet Silicate Intercalates: New Agents for Unusual Chemical Conversions," Intercalation Chemistry, 1982, Chapter 3, pp. 55-99, Academic Press, Inc.

Hohenesche, C, et.al., "Agglomerated Non-porous Silica Nanoparticles as Model Carriers in Polyethylene Synthesis", Journal of Molecular Catalysis A: Chemical 221 (2004) 185-199. DOI:10.1016/j.molcata.2004.07.008.

* cited by examiner

Polymer Example 4b
Catalyst Example 4e-1
(notice the spherical shape)

Polymer Example 5a
Catalyst Example 5a, (AS-2 before agglomeration)

Polymer Example 5d
Catalyst Example 5aa

FINES REDUCTION AND AGGLOMERATION OF CATALYST SYSTEM COMPONENTS FOR USE IN OLEFIN POLYMERIZATIONS

REFERENCE TO RELATED APPLICATION

This application claims the benefit of U.S. Provisional Patent Application No. 63/724,444, filed on Nov. 25, 2024, the disclosure of which is incorporated herein by reference in its entirety.

TECHNICAL FIELD

The present disclosure generally relates to methods for modifying the particle size distribution of catalyst system components.

BACKGROUND

Improper particle size features of catalyst system components used in catalyst compositions—such as metallocene, Ziegler-Natta, and chromium catalyst compositions—can lead to operational difficulties during olefin-based polymerizations in loop slurry reactors and fluidized bed reactors, as well as poor and inconsistent properties of the resulting olefin polymer. It would be beneficial to develop methods for modifying catalyst system components that overcome these drawbacks. Accordingly, it is to these ends that the present invention is generally directed.

SUMMARY

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

A first method consistent with an aspect of this invention can comprise (i) contacting a catalyst system component with a fluid to form a paste, wherein an amount of the fluid is in a range from 75 to 200% of a void volume of the catalyst system component, (ii) drying the paste to form a solid, and (iii) comminuting the solid to form a modified catalyst system component. The amount (in weight percent) of the modified catalyst system component having a particle size of less than or equal to 10 μm is less than that of the catalyst system component.

In another aspect of this invention, a second method can comprise (I) contacting a catalyst system component with a fluid to form agglomerated particles, wherein an amount of the fluid is in a range from 10 to 90% of a void volume of the catalyst system component, and (II) drying the agglomerated particles to form a modified catalyst system component. The amount (in weight percent) of the modified catalyst system component having a particle size of less than or equal to 10 μm is less than that of the catalyst system component. After step (II), further particle size reduction is not a requirement, however, often the second method further comprises a step of (III) comminuting the modified catalyst system component.

Also provided herein are modified catalyst system components that can be prepared by the first method and/or the second method, and in some aspects, such catalyst components (compositions) can have or can be characterized by (a) a d50 average particle size in a range from 60 to 140 μm, (b) a particle size span ((d90−d10)/d50) in a range from 0.6 to 1.8, and (c) a bulk density in a range from 0.22 to 0.42 g/mL. Less than or equal to 10 wt. % of the catalyst component has a particle size of less than or equal to 10 μm. In other aspects, such catalyst components (compositions) can have or can be characterized by (A) a d50 average particle size in a range from 30 to 70 μm, (B) a particle size span ((d90−d10)/d50) in a range from 0.6 to 1.8, and (C) a bulk density in a range from 0.22 to 0.42 g/mL. Less than or equal to 10 wt. % of the catalyst component has a particle size of greater than or equal to 100 μm.

Polymerization processes using the catalyst components can comprise contacting a catalyst composition comprising any of the catalyst components disclosed herein and an optional co-catalyst with an olefin monomer and an optional olefin comonomer in a polymerization reactor system under polymerization conditions to produce an olefin polymer.

Ethylene polymer powder (or fluff) compositions produced by the polymerization processes can have or can be characterized by, in another aspect, a d50 average particle size in a range from 700 to 1800 μm, a particle size span ((d90−d10)/d50) in a range from 0.4 to 2.4, less than or equal to 7 wt. % of the composition with a particle size of less than or equal to 250 μm, and less than or equal to 18 wt. % of the composition with a particle size of greater than or equal to 2500 μm.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description and examples.

Figure 1:
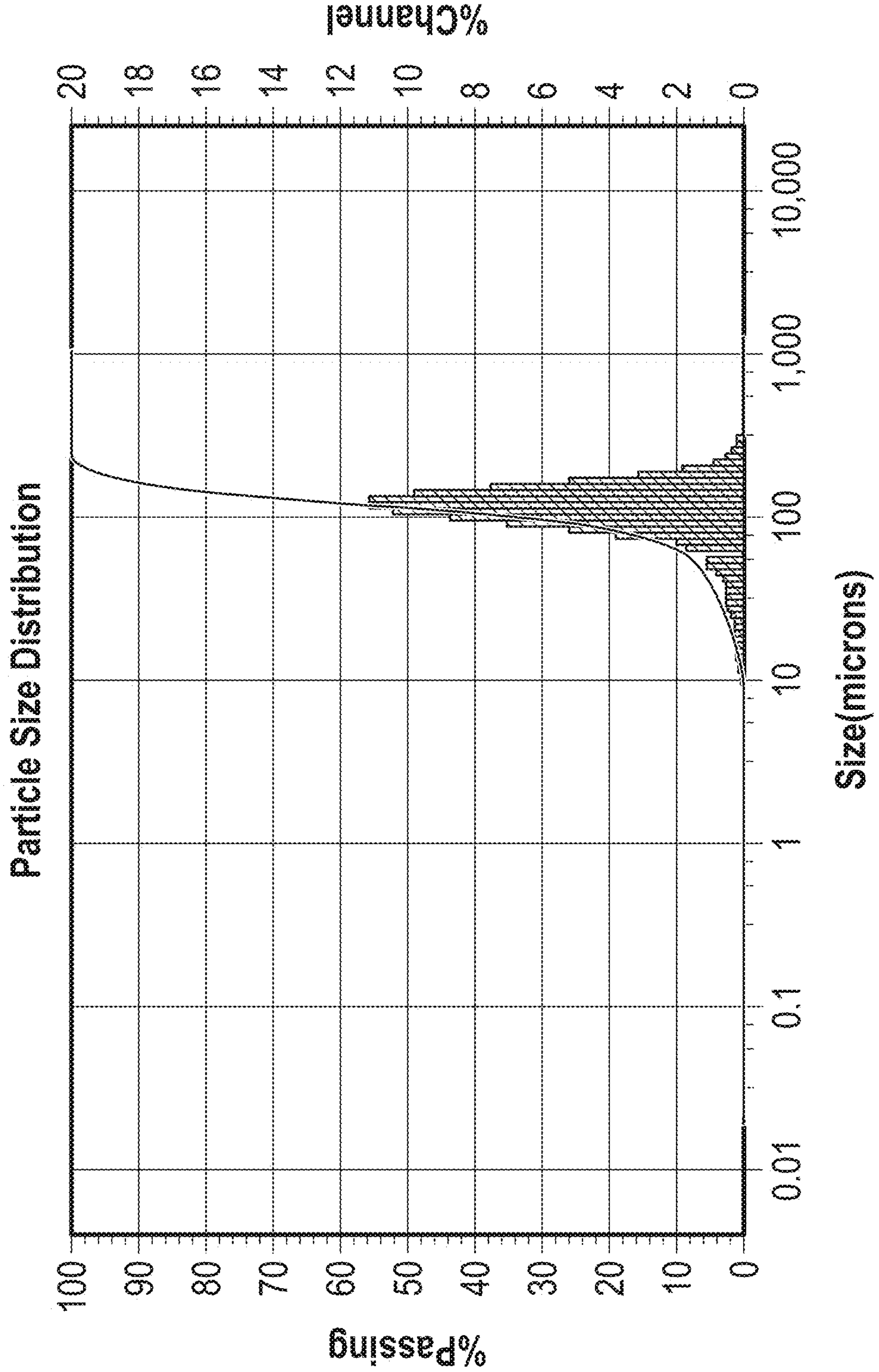
FIGS. 1-8 present plots of the particle size distributions of Examples 1d-2, 5p-2, 5z-2, 3m, 1b-1, 1b-3, 3b-2, and 4e-1, respectively.
Figure 2:
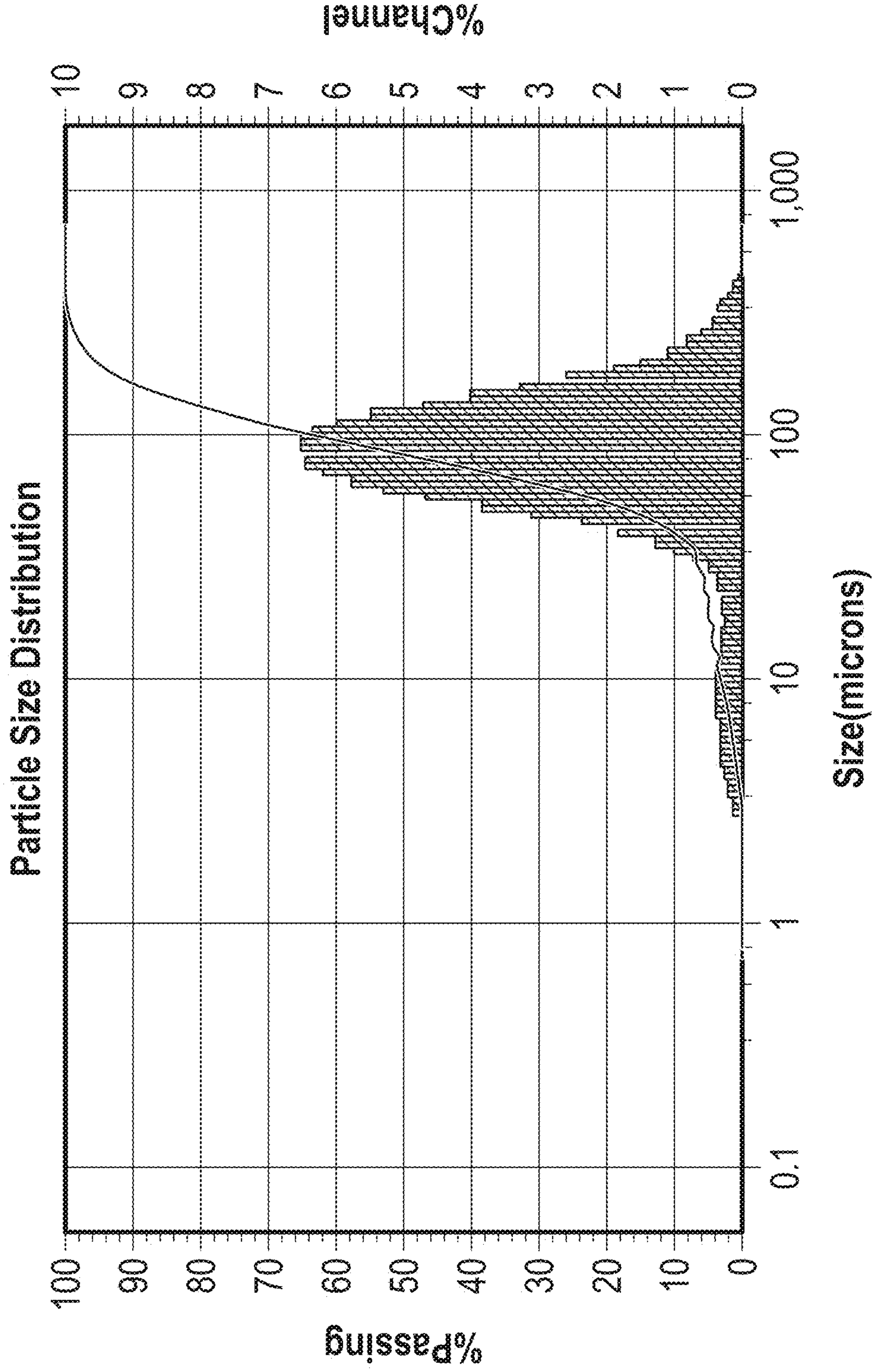
Figure 3:
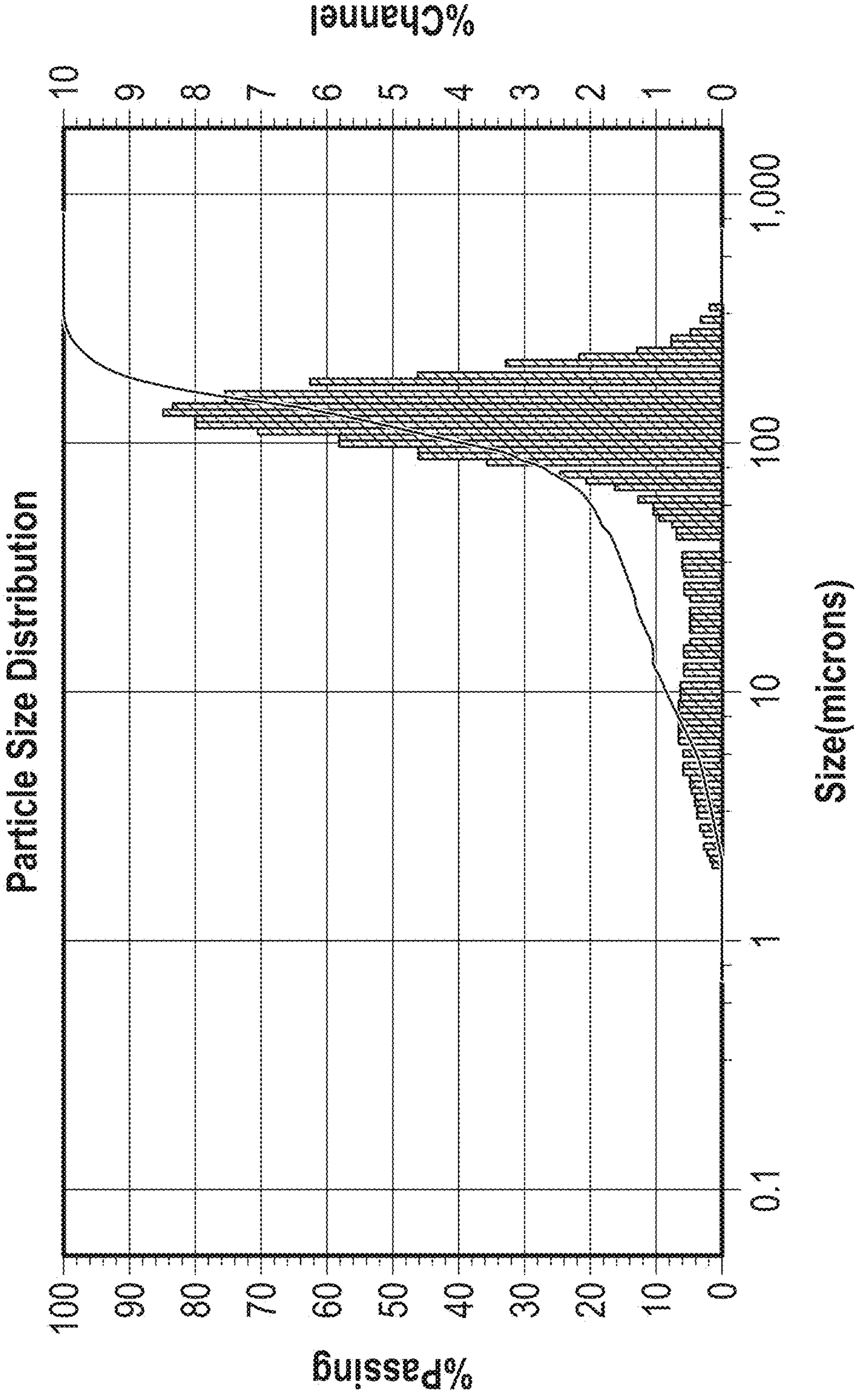
Figure 4:
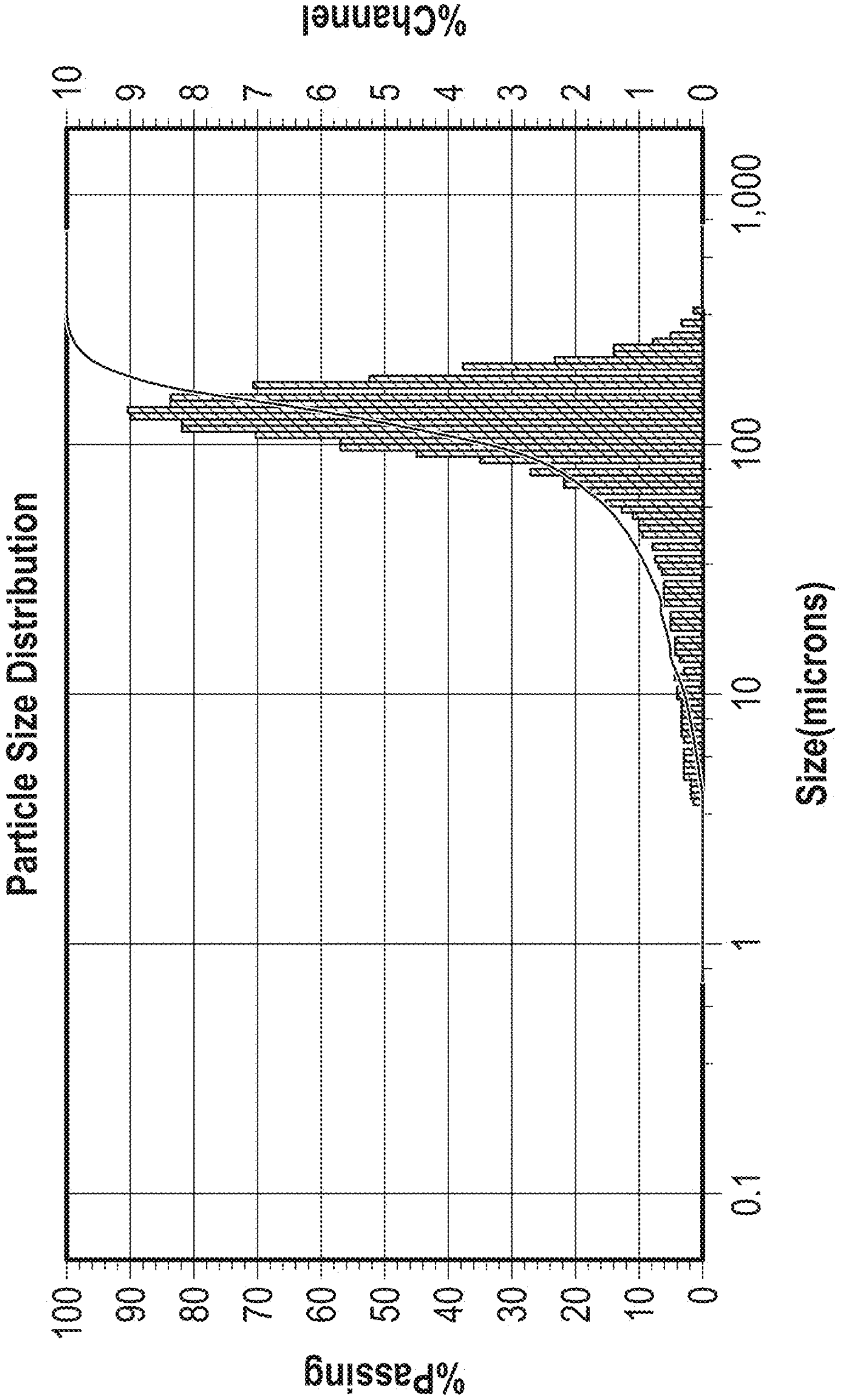
Figure 5:
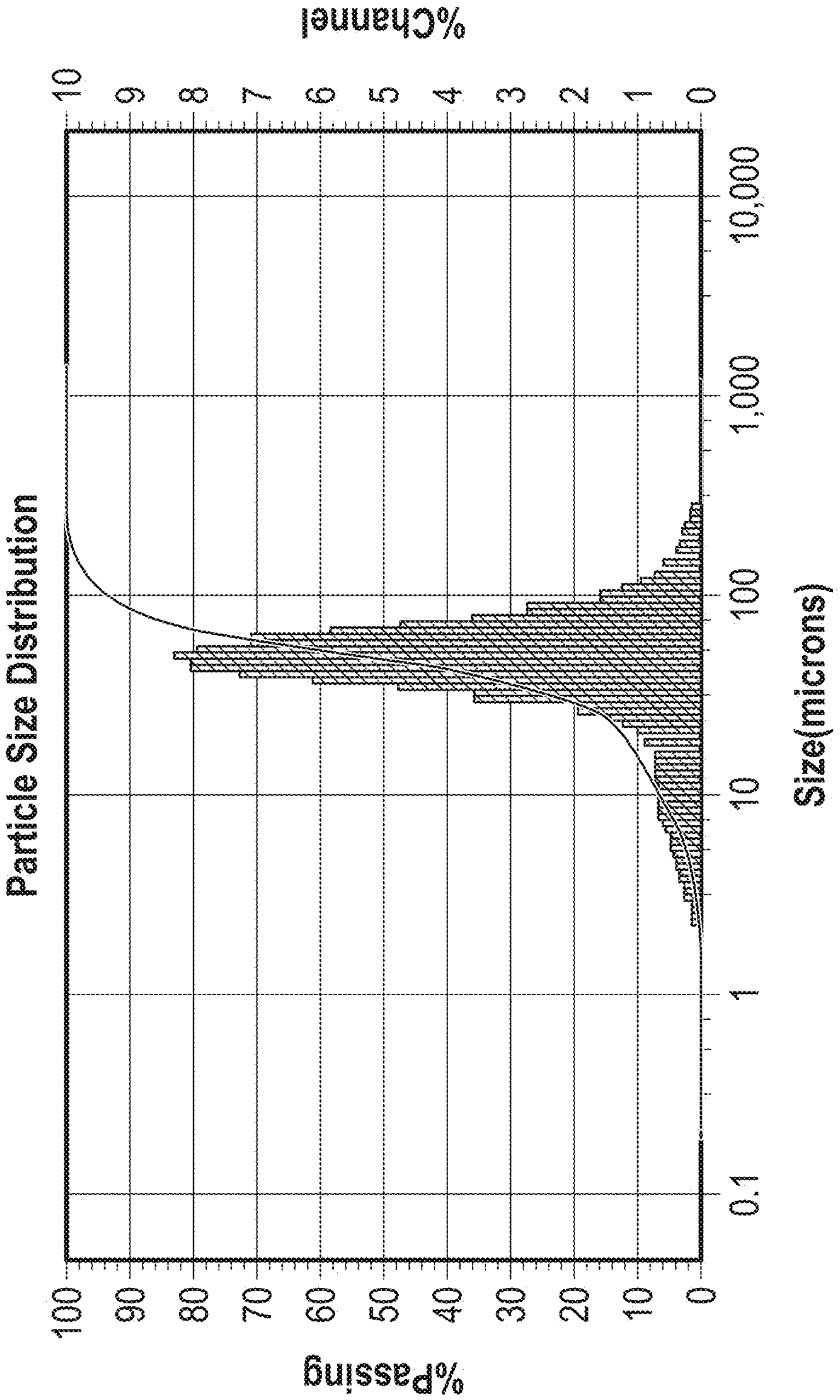
Figure 6:
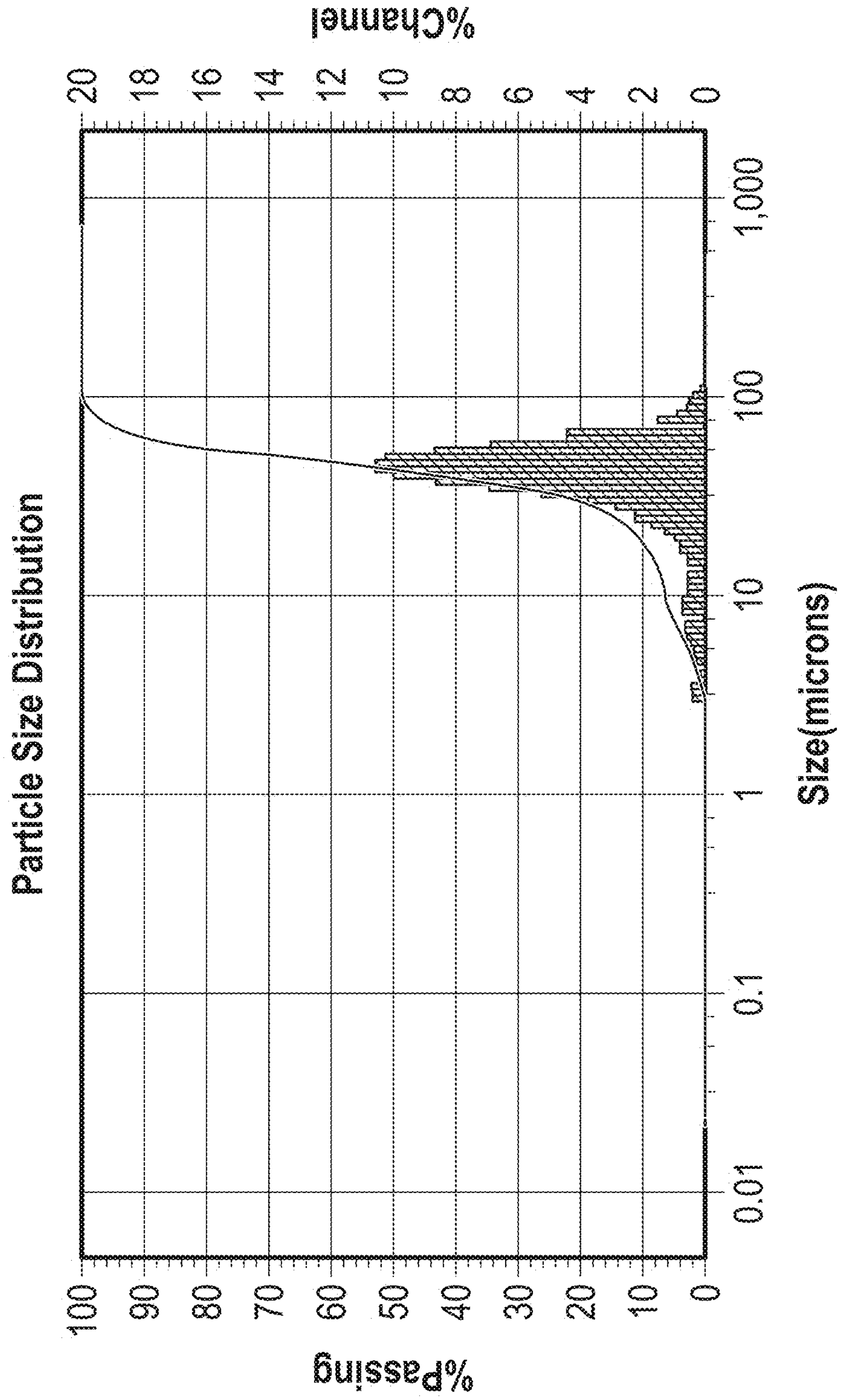
Figure 7:
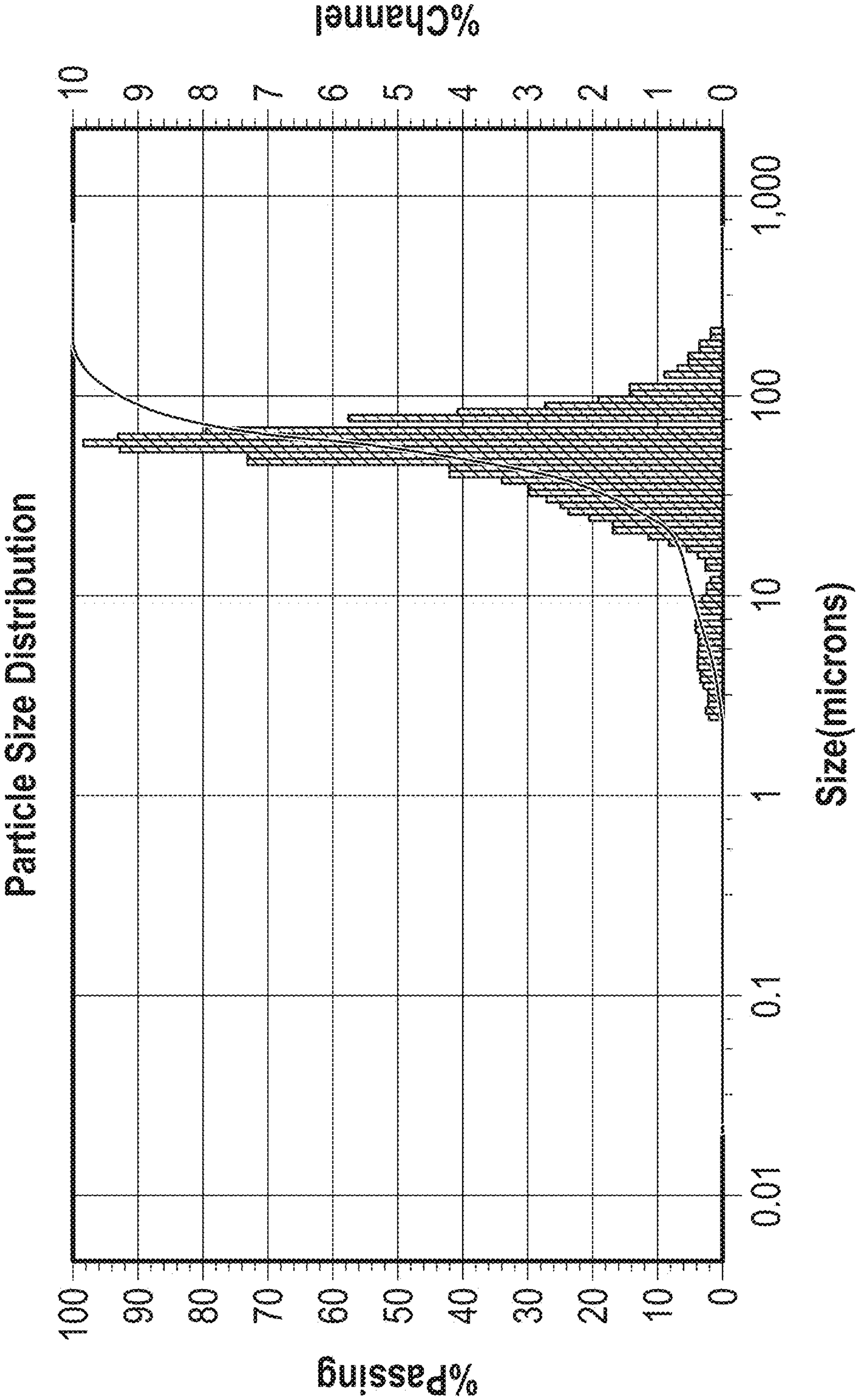
Figure 8:
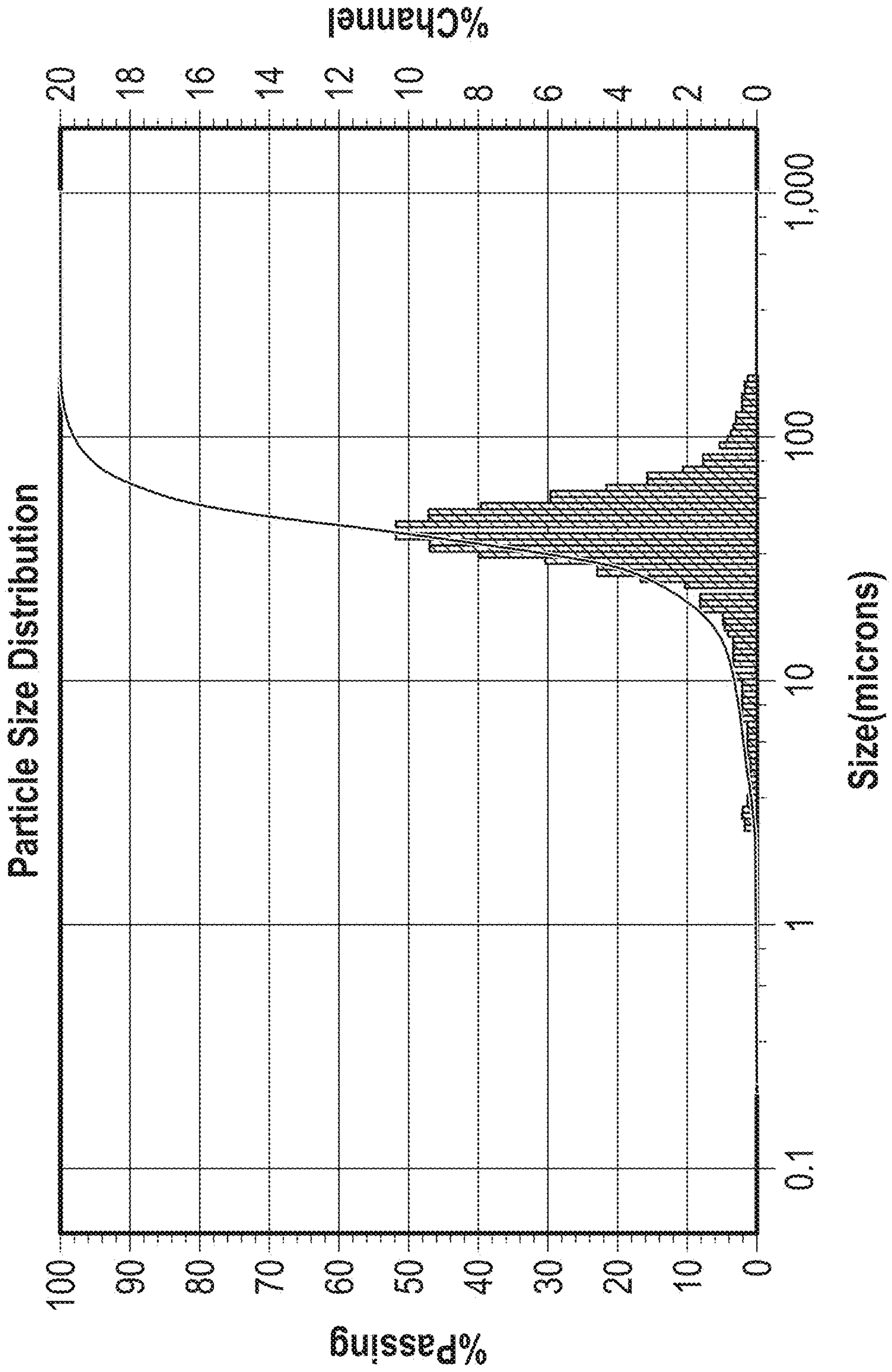

While the inventions disclosed herein are susceptible to various modifications and alternative forms, only a few specific aspects have been shown by way of example in the drawings and described in detail below. The figures and detailed descriptions of these specific aspects are not intended to limit the breadth or scope of the inventive concepts or the appended claims in any manner. Rather, the figures and detailed descriptions are provided to illustrate the inventive concepts to a person of ordinary skill in the art and to enable such person to make and use the inventive concepts.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the catalysts, compositions, processes, or methods described herein are contemplated with or without explicit description of the particular combination. Additionally, unless explicitly recited otherwise, any aspect or feature disclosed herein can be combined to describe inventive catalysts, compositions, processes, or methods consistent with the present disclosure.

Generally, groups of elements are indicated using the numbering scheme indicated in the version of the periodic table of elements published in *Chemical and Engineering News,* 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). Non-limiting examples of hydrocarbons include alkanes (linear, branched, and cyclic), alkenes (olefins), and aromatics, among other compounds. Herein, cyclics and aromatics encompass fused ring compounds such as bicyclics and polycyclics.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The terms "contacting" and "combining" are used herein to describe compositions and processes/methods in which the materials or components are contacted or combined together in any order, in any manner, and for any length of time, unless otherwise specified. For example, the materials or components can be blended, mixed, slurried, dissolved, reacted, treated, impregnated, compounded, or otherwise contacted or combined in some other manner or by any suitable method or technique. In some aspects, "contacting" or "combining" can include working, kneading, rolling, mixing, compressing, compacting, extruding, or applying mechanical energy to, any blend of materials or any composition.

"BET surface area" as used herein means the surface area as determined by the nitrogen adsorption Brunauer, Emmett, and Teller (BET) method according to ASTM D1993-91, and as described, for example, in Brunauer, S., Emmett, P. H., and Teller, E., "Adsorption of gases in multimolecular layers," J. Am. Chem. Soc., 60, 3, pp. 309-319.

In this disclosure, while compositions/components and processes/methods are described in terms of "comprising" various features, materials, or steps, the compositions/components and processes/methods also can "consist essentially of" or "consist of" the various features, materials, or steps, unless stated otherwise.

The terms "a," "an," and "the" are intended to include plural alternatives, e.g., at least one, unless otherwise specified. For instance, the disclosure of "a fluid" or "a catalyst system component" is meant to encompass one, or mixtures or combinations of more than one, fluid or catalyst system component, respectively, unless otherwise specified.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the present disclosure recites that the catalyst system component can have a bulk density in certain ranges. By a disclosure that the bulk density can be in a range from 0.22 to 0.42 g/mL, the intent is to recite that the bulk density can be any density in the range and, for example, can include any range or combination of ranges from 0.22 to 0.42 g/mL, such as from 0.22 to 0.38 g/mL, from 0.22 to 0.35 g/mL, from 0.24 to 0.42 g/mL, from 0.24 to 0.38 g/mL, from 0.24 to 0.35 g/mL, from 0.26 to 0.4 g/mL, from 0.26 to 0.38 g/mL, or from 0.26 to 0.35 g/mL, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

The particle size distributions are characterized by the measurements of dX, such as d5, d10, d50, d90, d95, etc., where the number "X" is the corresponding particle size when the cumulative percentage of particles reaches X %. Thus, d50 is the size when the cumulative percentage of particles is 50%. The measurement d50 is also called the median or average particle size. For example, a sample with d50=40 μm means that 50% of the particles are larger than 40 μm and 50% of the sample particles are smaller than 40 μm. Similarly, a sample with d5=3 μm means that 95% of the particles are larger than 3 μm and 5% of the particles are smaller than 3 μm. The span of the distribution is defined as (d90-d10)/d50. Because the particle densities are the same regardless of particle size, vol % and wt. % are the same and thus these values are interchangeable. Generally, wt. % will be used herein.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION

The present invention is generally directed to methods for modifying the particle size distribution of catalyst system components. The catalyst system component often can be used with other components to form a catalyst system (e.g., a metallocene, a Ziegler-Natta, or a chromium catalyst system) for polymerizing olefins such as ethylene in various reactor types, including fluidized bed gas phase and loop slurry reactors.

In loop slurry processes for the production of ethylene-based polymers, for instance, the benefits of smaller catalyst particle sizes generally include lower gel counts, more external surface area which increases the potential for collisions and mass transfer, lower saltation velocities, greater potential reactor mass solids, longer reactor residence times, higher activities, lower slurry viscosity, and more efficient purge capability. However, there are significant drawbacks to the use of ultra-small particle sizes (fines), in particular, difficulties with calcination and transfer of the solid oxide (or activator, or catalyst) into the reactor, and issues with downstream powder/fluff transfer (since smaller catalyst particles generally make smaller polymer particles). These disadvantages are especially evident when the catalyst or catalyst component (composition) contains a significant quantity of fines that are 10 μm in diameter or smaller.

Likewise, fines also present problems in fluidized bed gas phase reactors. In a gas phase reactor, the ability of both catalyst particles and polymer powder to fluidize, without blowing over, is similarly important, and small particles or fines can cause significant operational problems.

Removing fines by techniques such as air classification or sieving add an expensive process step with only marginal improvement, and discard a significant amount of the starting material. Sieving can be fairly selective, but too slow to be commercially viable. Air classification is faster, but also less selective, as it removes too much of the desirable particle size particles along with the fines. And even with good selectivity and unlimited time, both techniques still discard a significant portion of the starting material, creating higher costs from wasted product, and also resulting in a waste disposal cost.

An objective of this invention, therefore, is to modify the particle size distribution of a catalyst system component, such that only a small quantity of fines remain in the modified catalyst system component after processing. A further objective is to convert these fines or fine particles into larger particles, but in so doing, result in no waste of the original catalyst system component (and its fine particle fraction).

Moreover, it is also believed that the particle size distribution of catalyst system components also can significantly impact the particle size distribution of the polymer produced therefrom. Fine catalyst particles generally produce fine polymer, and this fine fraction of polymer has poor fluidization performance in downstream purge columns, prior to the polymer (in powder or fluff form) being extruded and converted into conventional beads or pellets. Thus, improving the particle size distribution of the catalyst system component will improve the particle size distribution of the resulting polymer.

Herein, the first method of modifying a catalyst system component typically begins with adding water or another liquid to the original catalyst system component (e.g., in powder form) in a mixing device, to create a paste. Upon drying, this paste turns into a semi-hard solid mass. If allowed to dry and solidify in pans or molds, it creates a hard mass sometimes referred to as a "brick" or "bricks." Alternatively, the paste can set up into smaller particles if it is spray dried, formed into a sheet, or extruded. The solid material formed (e.g., the brick(s)) is/are then crushed or milled into particles of approximately the desired size. This also generates some material which is larger than desired, and this fraction is then separated out and recycled by adding it back to the comminution device, or to the next batch to be made. Other particles also can be produced which are smaller than desired, and these are also sieved out. These smaller particles are added back to the mixer, to be incorporated into the paste of the next batch. In this way, all of the original catalyst system component is used, and none is wasted.

In the first method, the transition of the starting catalyst system component into "bricks" can be accomplished in many different ways. For example, the dough or paste can fill molds to produce rectangular shapes similar to a brick. Or, the paste can be dumped onto a belt that travels through a heated zone, to produce large irregular shapes. Or the dough or paste can be extruded through various shaped dies in a continuous extruder to produce extrudates or pellets of a few mm in diameter and length. Alternatively, the paste or dough can be dropped into a hot oil system to produce spheres. Any suitable method of drying and shaping can be used in first method. Likewise, the drying step also can involve a calcination step. This can be accomplished in a single operation, or in two steps (drying followed by calcination). The dried and/or calcined larger shapes or "bricks" produced in the first method are then comminuted (crushed, ground, etc.) into an irregular shaped granular powder of varying sizes that includes a large fraction of particles within a desired particle size range.

The second method of modifying a catalyst system component described herein typically begins with adding considerably less water or another liquid to the original catalyst system component (e.g., in powder form) during or after it is stirred in a dry mixer. During this mixing process, smaller particles can agglomerate into larger ones. Under some conditions, the finest particles will preferentially stick onto larger ones, thus selectively removing fines without affecting the overall particle size distribution significantly.

The basic wetting, mixing, and drying techniques involved in both of these methods also can be combined with other process steps, such as crushing/grinding, sieving, and calcining, so that any off-sized material inadvertently generated can be re-claimed. In this way, the amount of waste material can be less than 25 wt. %, and more often, less than 20 wt. %, less than 15 wt. %, less than 10 wt. %, less than 5 wt. %, less than 2 wt. %, or less than 1 wt. %. Desirably, the final yield of the modified catalyst system component in the target particle size range can be near 100 wt. %, based on the weight of the initial catalyst system component.

Methods for Modifying Catalyst System Components

Disclosed herein are various methods for modifying the particle size distributions of catalyst system components, in particular, to reduce fines and to maximize the yield of the original catalyst system component being modified. A first method can comprise (or consist essentially of, or consist of) (i) contacting a catalyst system component with a fluid to form a paste, wherein an amount of the fluid is in a range from 75 to 200% of a void volume of the catalyst system component, (ii) drying the paste to form a solid, and (iii)

comminuting the solid to form a modified catalyst system component. The amount of the modified catalyst system component having a particle size of less than or equal to 10 μm is less than that of the catalyst system component, and this is measured in percentage by weight (wt. %). A second method can comprise (or consist essentially of, or consist of) (I) contacting a catalyst system component with a fluid to form agglomerated particles, wherein an amount of the fluid is in a range from 10 to 90% of a void volume of the catalyst system component, and (II) drying the agglomerated particles to form a modified catalyst system component. The amount (in wt. %) of the modified catalyst system component having a particle size of less than or equal to 10 μm is less than that of the catalyst system component.

As used herein and in reference to both the first and second methods, "comminuting" refers to reducing the average size of solids/particles, and can include processes such as milling, grinding, crushing, cutting, pulverizing, disintegrating, fragmenting, and the like, as well as combinations thereof. Comminution devices can be any device that is capable of reducing the average size of solids/particles, non-limiting examples of which can include an impact crusher, a hammer mill, a jet mill, a ball or roller mill, a roll crusher, a jaw crusher, a v-crusher, an ultrasonic device, a blender, a rotating paddle mill, a grinder, and the like, and including combinations of two or more of these devices. The "void volume" is described in detail in the example section and is used to determine the porosity of a powder/particle. For many catalyst system components, the void volume tracks very closely with traditional pore volume testing, however, one main difference is that the void volume also can include the largest pores or macro-pores, e.g., those greater than approximately 10,000 Angstroms in diameter, which are more difficult to distinguish through nitrogen sorption. The void volume also includes some space between the particles, which when filled create a paste or dough-like consistency. The "relative fill volume" or RFV is the fraction of voids or pores that have been filled. Thus, in the second method, the amount of the fluid is in a range from 10 to 90% of a void volume of the catalyst system component; the relative fill volume is in a range from 10 to 90%, Generally, the features of the first method and the second method (e.g., the fluid, the relative fill volume, the characteristics of the catalyst system component, the drying step, and the comminuting step, among others) are independently described herein and these features can be combined in any combination to further describe the disclosed methods. Moreover, additional process steps can be performed before, during, and/or after any of the steps in any of the methods disclosed herein, and can be utilized without limitation and in any combination to further describe these methods, unless stated otherwise. For instance, prior to step (i) and step (I) of the first and second methods, the catalyst system component can be calcined. Further, any modified catalyst system components produced in accordance with the disclosed methods are within the scope of this disclosure and are encompassed herein.

Referring now to the first method, in step (i), the catalyst system component is contacted with the fluid to form a paste, and the amount of the fluid is in a range from 75 to 200% of the void volume of the catalyst system component (relative fill volume). The result of step (i) is called a paste, and its form and viscosity can depend greatly on the relative fill volume and how step (i) is performed. The paste also can be described as a semi-wet fraction, or a more viscous form such as a dough. Step (i) and the contacting of the catalyst system component with the fluid can comprise working, kneading, rolling, mixing, compressing, compacting, extruding, or applying mechanical energy to, the paste (or a blend of the catalyst system component and the fluid). Combinations of two or more of these techniques can be utilized, if desired.

The amount of the fluid is in a range from 75 to 200% of the void volume of the catalyst system component (relative fill volume) in step (i). In some aspects, the amount of the fluid can range from 80 to 150% of the void volume, while in other aspects, the amount of the fluid can range from 85 to 125% of the void volume.

The yield of the modified catalyst system component based on the weight of the paste (or based on the weight of the initial catalyst system component) in step (i) can be at least 40 wt. %, and more often, the yield of the modified catalyst system component can be at least 50 wt. %, at least 60 wt. %, at least 70 wt. %, at least 80 wt. %, or at least 90 wt. 0.

Referring now to the second method, in step (I), the catalyst system component is contacted with the fluid to form agglomerated particles, and the amount of the fluid is in a range from 10 to 90% of the void volume of the catalyst system component (relative fill volume). The result of step (I) is agglomerated particles, and their form and shape can depend greatly on the relative fill volume and how step (I) is performed. Thus, in its simplest form, the second method does not require a step of comminuting or milling the agglomerated particles (after drying). However, in many instances, the second method can further comprise a step of (III) comminuting the modified catalyst system component, and reducing the average particle size to any desirable target size.

Similar to the first method, step (I) and the contacting of the catalyst system component with the fluid in the second method can comprise working, kneading, rolling, mixing, compressing, compacting, extruding, or applying mechanical energy to, the agglomerated particles (or a blend of the catalyst system component and the fluid). Combinations of two or more of these techniques can be utilized, if desired. Typically, the amount or working, mixing, etc., in the second method is less than that of the first method.

The amount of the fluid is in a range from 10 to 90% of the void volume of the catalyst system component (relative fill volume) in step (I). In some aspects, the amount of the fluid can range from 20 to 80% of the void volume, while in other aspects, the amount of the fluid can range from 30 to 70% of the void volume. The agglomerated particles in step (I) of the second method (and/or in step (II) after drying) often can be described as free flowing particles.

The yield of the modified catalyst system component based on the weight of the agglomerated particles (or based on the weight of the initial catalyst system component) in step (i) can be at least 40 wt. %, and more often, the yield of the modified catalyst system component can be at least 50 wt. %, at least 60 wt. %, at least 70 wt. %, at least 80 wt. %, or at least 90 wt. %.

The second method often is configured to decrease the fines of the original catalyst system component without a significant increase in overall large particles. This can be determined by the d90 of the (original) catalyst system component in step (I) being within +/−25% of the d90 of the modified catalyst system component (after step (II) or step (III)). In some aspects, the d90 of the catalyst system component can be within +/−20%, +/−15%, or +/−10%, of the d90 of the modified catalyst system component.

In each of the first method and the second method, the void volume of the catalyst system component is not particularly limited. Nonetheless, the catalyst system component typically has a void volume in a range from 0.3 to 5 mL/g, and in some aspects, the void volume can be in a range from 0.5 to 4 mL/g, from 0.5 to 3 mL/g, or from 0.5 to 2 mL/g, while in other aspects, the void volume can range from 0.6 to 3 mL/g, or from 0.9 to 1.9 mL/g, and the like.

Referring now to the first step in the first method and the second method, the catalyst system component is contacted with a fluid. Any suitable fluids and catalyst system components can be utilized in the first and second methods. Representative catalyst system components are discussed further hereinbelow. As to the fluid, in one aspect, the fluid can comprise (or consist essentially of, or consist of) water. For instance, water can be at least 50 wt. % of the fluid, such as at least 75 wt. %, at least 85 wt. %, at least 95 wt. %, at least 98 wt. %, or at least 99 wt. %, of the fluid.

In another aspect, the fluid can comprise an organic oxygen-containing compound, non-limiting examples of which can include, an alcohol compound, a ketone compound, an aldehyde compound, or an ether compound, as well as any combination thereof. In yet another aspect, the fluid can comprise a mixture of water and the organic oxygen-containing compound; for instance, the fluid can comprise a mixture of water and an alcohol compound.

In still another aspect, the fluid can further comprise a binder. Illustrative examples of binders that can be utilized as a component of the fluid either singly or in any combination can include an acid, a carbohydrate, a mineral, a protein, or a polymer, and the like. Representative acid binders can include mineral acids (such as HCl, $HNO_3$, $H_2SO_4$, $H_3PO_4$, or $HBF_4$) or carboxylic acids (such as acetic acid, oxalic acid glycolic acid, or lactic acid). Representative carbohydrate binders can include a konjac, a glucose-starch, a chemically resistance starch, a dextrin, an inulin, a guar gum, a carboxycellulose, a glucomannan, a psyllium, and the like, as well as combinations thereof. Representative mineral binders can include a colloidal titania, a colloidal silica, a colloidal alumina-treated silica, a bentonite, a kaolin, and the like, as well as combinations thereof. Representative protein binders can include a casein, a gelatin, a collagen, a collagen peptide, and the like, as well as combinations thereof. Representative polymer binders can include a polyvinyl alcohol, a polyoxyethylene, a polyoxypropylene, a polyvinyl pyrrolidone, a siloxane, a water-soluble or swellable organic polymer, and the like, as well as combinations thereof.

The amount of the binder used is not particularly limited. Nonetheless, the amount of binder often can vary from 0.1 wt. % to 50 wt. %, based on the weight of the original catalyst system component, and more often, the amount of binder ranges from 1 wt. % to 25 wt. %, or from 5 wt. % to 15 wt. %.

In the first step in both the first method and the second method, the catalyst system component is contacted with the fluid. The contacting can be performed in any suitable mixing device, and non-limiting examples include a paddle blender, a ribbon blender, a fluidized bed mixer, a pin mixer, a tumble mixer, a roll mixer, a drum mixer, a tilted saucer or pan mixer, and the like. Combinations of two or more of these mixing devices can be utilized in step (i) and step (I), if desired. The temperature used during the first step of the first and second methods is not particularly limited, other than a temperature at which the fluid remains a liquid throughout. In certain aspects, the temperature during step (i) and step (I) can fall within a range from 10° C. to 80° C., such as from 15° C. to 60° C., from 15° C. to 40° C., or from 20° C. to 45° C., and the like. These temperature ranges also are meant to encompass circumstances where step (i) and step (I) are performed at a series of different temperatures, instead of at a single fixed temperature, falling within the respective temperature ranges, wherein at least one temperature is within the recited ranges. Conveniently, room temperature conditions often are used for the first step.

The duration of step (i) and step (I), or the mixing time, can vary considerably, because it depends on the properties of the catalyst system component and the fluid (e.g., amount of water with or without binder), and the speed and horsepower of the mixing device. Under high intensity mixing conditions, the mixing time may be only a few see, such as 1-10 sec, or 1-30 sec, or 30-60 sec. Under less intense mixing conditions, a few min may be necessary, such as 1-60 min, or 5-45 min, or 10-30 min. The mixing operation can be performed batchwise, or it can be performed continuously, in which paste or agglomerated particles is/are continually removed from the mixing device and simultaneously more fluid/water and original catalyst system component are added continually to the mixing device.

In the first method, the paste is subjected to a drying step to form a solid, and in the second method, the agglomerated particles are subjected to a drying step to form the modified catalyst system component. Any suitable drying technique can be used. Accordingly, step (ii) and step (II) can comprise fluidized bed drying, rotary kiln drying, oven drying, tray drying, spray drying, flash drying, oil drying, belt drying, roll drying, and the like, as well combinations thereof. Drying can be used for one or more of the following purposes: (1) To drive off the water (or other fluid) that was added prior to or during the mixing process; (2) To harden the paste of the first method or the agglomerated particles of the second method; (3) To burn off or pyrolyze organic or even inorganic binders to remove material that is unwanted in the final product.

Any suitable drying temperature can be used, including from 60° C. to 800° C., such as from 60° C. to 200° C., from 200° C. to 600° C., from 300° C. to 500° C., from 90° C. to 150° C., or from 200° C. to 600° C. Drying times can be 1-10 sec, or 5-10 sec, or 30 min to 12 hr, or 5-30 min, and this will depend upon the machinery and drying conditions that are utilized.

Any drying step (or calcination step) can be accomplished in any suitable atmosphere. This includes most any oxidizing gas, such as air, oxygen or a mixture, or oxides of nitrogen. It also includes inert atmospheres, such as nitrogen, carbon dioxide, or a vacuum. Reducing gasses such as hydrogen, carbon monoxide, or certain hydrocarbons, also can be used.

In addition, in some operations it may be advantageous to add other volatile materials, such as sources of electron withdrawing anions during drying/calcining. Examples include adding sulfate, in the form of sulfur dioxide or trioxide, or a volatile sulfate-containing compound. Alternatively, halogen agents can also be added, such as HF, freons and other halo-carbon compounds containing fluoride and/or chloride or bromide, as well as acidic compounds such as $HBF_4$, $H_2SiF_6$, or $H_2SO_4$. Other volatile compounds can also be used, such as $SiCl_4$, $SiF_4$, $AlCl_3$, and $SnCl_4$. Compounds that decompose into haliding agents during drying or calcination are also sometimes useful, such as $NH_4BF_4$, $(NH_4)_2PF_6$, and the like.

In the first method, the solid is subjected to a comminuting step to form the modified catalyst system component, and in the second method, the modified catalyst system component can be subjected to a comminuting step (if desired). Any suitable comminution device can be used. Therefore, step (iii) and step (III) can comprise comminuting in an impact crusher, a hammer mill, a jet mill, a ball or roller mill, a roll crusher, a jaw crusher, a v-crusher, an ultrasonic device, a blender, a rotating paddle mill, a grinder, and the like, as well as combinations thereof.

In the first and second methods, the amount (in wt. %) of the modified catalyst system component having a particle size of less than or equal to 10 μm is less than that of the catalyst system component. Effectively, the amounts of "fines" present in the modified catalyst system component has been reduced as compared to that of the (original) catalyst system component. In one aspect, the amount of the modified catalyst system component having a particle size of less than or equal to 10 μm is at least 10% less than that of the catalyst system component, while in another aspect, the amount is at least 25% less, and in yet another aspect, the amount is at least 40% less, and in still another aspect, the amount is at least 50% less. In particular aspects encompassed herein, the amount of the modified catalyst system component having a particle size of less than or equal to 10 μm is at least 60% less, at least 70% less, at least 80% less, or at least 90% less, than that of the catalyst system component.

Another improvement resulting from the first method and the second method is an increase in bulk density. A "compaction ratio" is the bulk density of the modified catalyst system component divided by the bulk density of the (original) catalyst system component. The compaction ratio of the first and second methods is at least 1.05, and more often the compaction ratio is at least 1.1, at least 1.15, at least 1.2, at least 1.25, at least 1.3, at least 1.4, at least 1.5, at least 1.6, at least 1.7, at least 1.8, at least 1.9, or at least 2. While not particularly limited, the (maximum) compaction ratio can be less than or equal to 5, less than or equal to 4.5, less than or equal to 4, less than or equal to 3.5, less than or equal to 3, less than or equal to 2.8, less than or equal to 2.4, less than or equal to 2, less than or equal to 1.8, or less than or equal to 1.5. Often, the compaction ratio can fall within a range from any minimum compaction ratio to any maximum compaction ratio disclosed herein. Representative and non-limiting ranges include, for instance, from 1.05 to 5, from 1.1 to 4.5, from 1.1 to 3, from 1.1 to 2.4, from 1.1 to 1.8, from 1.2 to 3.5, from 1.2 to 2, from 1.2 to 1.8, from 1.2 to 1.5, from 1.5 to 4, from 1.5 to 3, from 1.5 to 2.4, from 2 to 5, from 2 to 4, or from 2 to 3.

In some aspects, both the first method and the second method can further comprise a step of isolating a target particle size fraction from the modified catalyst system component. For example, a middle cut of particle sizes can be isolated from the modified catalyst system component to minimize very small particles and very large particles. Any suitable technique can be employed to isolate the target particle size fraction, and illustrative techniques can include, for instance, sieving, screening, air classifying, settling, cycloning, and hydrocycloning. Combinations of two of more of these techniques can be utilized, if desired.

For example, the target particle size fraction can be any desirable middle cut of particle sizes isolated from an overall particle size distribution, such as a "target" particle size fraction with sizes within the range of from d10 to d90, or within the range from d20 to d80. As a representative example, a hypothetical modified catalyst system component can have a d10 of 18 μm, a d50 of 45 μm, a d90 of 80 μm, 7 wt. % of the modified catalyst system component with a particle size of less than or equal to 10 μm, and 6 wt. % of the modified catalyst system component with a particle size of greater than or equal to 100 μm. In this hypothetical, it can be desired to isolate a target particle size fraction in the range from d10 to d90 (from 18 μm to 80 μm), such that particles having sizes of less than or equal to 10 μm and having sizes of greater than or equal to 100 μm are not present in the isolated/target fraction (or if present, at much lesser amounts).

To improve the yield and to minimize waste, the first and second methods can further comprise the steps of segregating a first portion (which can be all or any fraction) of the modified catalyst system component having particle sizes less than that of the target particle size fraction, and then recycling the first portion to step (i) or step (I). Thus, small particles can be recycled and reused in the first step of the first and second methods to form larger particles. Additionally or alternatively, to also improve the yield and to minimize waste, the first and second methods can further comprise the steps of segregating a second portion (which can be all or any fraction) of the modified catalyst system component having particle sizes greater than that of the target particle size fraction, and then recycling the second portion to step (iii) or step (III). Thus, large particles can be recycled and reused (and comminuted) in the third step of the first and second methods to form more of the modified catalyst system component having the target particle size fraction. As needed, the segregating and recycling steps can be performed two or more times (e.g., 2 times, 3 times, 4 times, 5 times, 10 times, 15 times, etc.) to continue to recycle and reuse material that is not within the target particle size fraction. Illustrations of these iterative processes are shown in the example section hereinbelow.

By following this methodology, substantially no waste or loss of the original catalyst system component can result. In one aspect, for instance, the yield of the target particle size fraction based on the weight of the catalyst system component can be at least 70 wt. %, and in another aspect, the yield can be at least 80 wt. %, at least 90 wt. % in another aspect, at least 95 wt. % in another aspect, at least 98 wt. % in another aspect, at least 99 wt. % in yet another aspect, and at least 99.5 wt. % in still another aspect.

An integrated process based on the first method, therefore, can comprise the following steps: (i) contacting a catalyst system component with a fluid to form a paste, wherein an amount of the fluid is in a range from 75 to 200% of a void volume of the catalyst system component, (ii) drying the paste to form a solid, (iii) comminuting the solid to form a modified catalyst system component, wherein an amount (wt. %) of the modified catalyst system component having a particle size of less than or equal to 10 μm is less than that of the catalyst system component, (iv) isolating a target particle size fraction from the modified catalyst system component, (v) segregating a first portion of the modified catalyst system component having particle sizes less than that of the target particle size fraction, and recycling the first portion to step (i), and (vi) segregating a second portion of the modified catalyst system component having particle sizes greater than that of the target particle size fraction, and recycling the second portion to step (iii).

Likewise, an integrated process based on the second method can comprise the following steps: (I) contacting a catalyst system component with a fluid to form agglomerated particles, wherein an amount of the fluid is in a range from 10 to 90% of a void volume of the catalyst system component, (II) drying the agglomerated particles to form a modified catalyst system component, (III) comminuting the modified catalyst system component, wherein an amount of the modified catalyst system component having a particle size of less than or equal to 10 μm is less than that of the catalyst system component, (IV) isolating a target particle size fraction from the modified catalyst system component, (V) segregating a first portion of the modified catalyst system component having particle sizes less than that of the target particle size fraction, and recycling the first portion to step (I), and (VI) segregating a second portion of the modified catalyst system component having particle sizes greater than that of the target particle size fraction, and recycling the second portion to step (III).

Generally, the catalyst system component has a relatively low wet particle density, due to the high porosity of the catalyst system component, and thus the wet particle density can be significantly different from the skeletal density of the catalyst system component (with no porosity). As disclosed herein, the wet particle density is the particle density in water and is determined by the following equation: wet particle density=(1+PV)/(PV+1/skeletal density), where PV is the pore volume of the catalyst system component. The wet particle density of the catalyst system component can range from 1.05 to 2.0 g/cc in one aspect, from 1.05 to 1.5 g/cc or from 1.2 to 2.0 g/cc in another aspect, from 1.2 to 1.8 g/cc or from 1.2 to 1.6 g/cc in another aspect, from 1.3 to 1.9 g/cc or from 1.3 to 1.7 g/cc in yet another aspect, and from 1.3 to 1.5 g/cc in still another aspect.

The catalyst system component can have any suitable pore volume and BET surface area features, as a skilled artisan would consider useful for catalyst system components typically employed in olefin-based polymerization processes. Pore volumes (total) of the catalyst system component can range from 0.3 to 5 mL/g; therefore, illustrative non-limiting ranges for the pore volume include from 0.5 to 5 mL/g, from 0.3 to 3 mL/g, from 0.5 to 2 mL/g, from 0.5 to 1.8 mL/g, or from 0.7 to 1.6 mL/g, and like. BET surface areas of the catalyst system component can range from 50 to 1000 $m^2/g$; therefore, illustrative non-limiting ranges for the BET surface area include from 100 to 700 $m^2/g$, from 100 to 400 $m^2/g$, from 150 to 500 $m^2/g$, or from 200 to 450 $m^2/g$, and the like.

Catalyst System Components

Generally, any suitable catalyst system component can be used in the first method and the second method. In one aspect, the catalyst system component can comprise a solid oxide, which can contain oxygen and one or more elements selected from Group 2, 3, 4, 5, 6, 7, 8, 9, 10, 11, 12, 13, 14, or 15 of the periodic table, or comprise oxygen and one or more elements selected from the lanthanide or actinide elements (See: Hawley's Condensed Chemical Dictionary, $11^{th}$ Ed., John Wiley & Sons, 1995; Cotton, F. A., Wilkinson, G., Murillo, C. A., and Bochmann, M., Advanced Inorganic Chemistry, $6^{th}$ Ed., Wiley-Interscience, 1999). For example, the solid oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr. Illustrative examples of solid oxide materials or compounds that can be used as the catalyst system component can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof.

The solid oxide can encompass oxide materials such as silica, alumina, or titania, "mixed oxide" compounds thereof such as silica-titania, and combinations or mixtures of more than one solid oxide material. Mixed oxides such as silica-titania can be single or multiple chemical phases with more than one metal combined with oxygen to form the solid oxide. Examples of mixed oxides that can be used as solid oxide include, but are not limited to, silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, and the like, or a combination thereof. In some aspects, the catalyst system component can comprise silica, silica-alumina, silica-coated alumina, silica-titania, silica-titania-magnesia, silica-zirconia, silica-magnesia, silica-boria, aluminophosphate-silica, and the like, or any combination thereof. Silica-coated aluminas are encompassed herein; such oxide materials are described in, for example, U.S. Pat. Nos. 7,884,163 and 9,023,959.

The percentage of each oxide in a mixed oxide can vary depending upon the respective oxide materials. As an example, a silica-alumina (or silica-coated alumina) typically has an alumina content from 5 wt. % to 95 wt. %. According to one aspect, the alumina content of the silica-alumina (or silica-coated alumina) can be from 5 wt. % alumina 50 wt. % alumina, or from 8 wt. % to 30 wt. % alumina. In another aspect, high alumina content silica-aluminas (or silica-coated aluminas) can be employed, in which the alumina content of these materials typically ranges from 60 wt. % alumina to 90 wt. % alumina, or from 65 wt. % alumina to 80 wt. % alumina.

In one aspect, the solid oxide can comprise silica-alumina, silica-coated alumina, silica-titania, silica-zirconia, alumina-titania, alumina-zirconia, zinc-aluminate, alumina-boria, alumina borate, silica-boria, aluminum phosphate, aluminophosphate, aluminophosphate-silica, titania-zirconia, or a combination thereof; alternatively, silica, silica-alumina, silica-coated alumina, silica-titania, silica-titania-magnesia, silica-zirconia, silica-magnesia, silica-boria, aluminophosphate-silica, alumina, alumina borate, or any combination thereof; alternatively, silica; alternatively, silica-alumina; alternatively, silica-coated alumina; alternatively, silica-titania; alternatively, silica-zirconia; alternatively, alumina-titania; alternatively, alumina-zirconia; alternatively, zinc-aluminate; alternatively, alumina-boria; alternatively, silica-boria; alternatively, aluminum phosphate; alternatively, aluminophosphate; alternatively, aluminophosphate-silica; or alternatively, titania-zirconia.

In another aspect, the solid oxide can comprise silica, alumina, titania, thoria, stania, zirconia, magnesia, boria, zinc oxide, a mixed oxide thereof, or any mixture thereof. In yet another aspect, the solid oxide can comprise silica, alumina, titania, or a combination thereof; alternatively, silica; alternatively, alumina; alternatively, titania; alternatively, zirconia; alternatively, magnesia; alternatively, boria; or alternatively, zinc oxide. In still another aspect, the solid oxide can comprise silica, alumina, silica-alumina, silica-coated alumina, aluminum phosphate, aluminophosphate, heteropolytungstate, titania, zirconia, magnesia, boria, zinc oxide, silica-titania, silica-yttria, silica-zirconia, alumina-titania, alumina-zirconia, zinc-aluminate, alumina-boria, silica-boria, aluminophosphate-silica, titania-zirconia, and the like, or any combination thereof.

Consistent with certain aspects of this invention, the catalyst system component can comprise a chemically-treated solid oxide, and where the chemically-treated solid oxide comprises a solid oxide (any solid oxide disclosed herein) treated with an electron-withdrawing anion (any electron withdrawing anion disclosed herein). The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, and the like, including mixtures and combinations thereof. In addition, other ionic or non-ionic compounds that serve as sources for these electron-withdrawing anions also can be employed.

It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The chemically-treated solid oxide generally can contain from 1 wt. % to 30 wt. % of the electron-withdrawing anion, based on the weight of the chemically-treated solid oxide. In particular aspects provided herein, the chemically-treated solid oxide can contain from 1 to 20 wt. %, from 2 wt. % to 20 wt. %, from 3 wt. % to 20 wt. %, from 2 wt. % to 15 wt. %, from 1 wt. % to 10 wt. %, from 2 wt. % to 10 wt. %, from 3 wt. % to 10 wt. %, of the electron-withdrawing anion, based on the total weight of the chemically-treated solid oxide.

In an aspect, the chemically-treated solid oxide can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, and the like, as well as any mixture or combination thereof.

In another aspect, the chemically-treated solid oxide employed as the catalyst system component in the methods described herein can be, or can comprise, a fluorided solid oxide and/or a sulfated solid oxide, non-limiting examples of which can include fluorided alumina, sulfated alumina, fluorided silica-alumina, sulfated silica-alumina, fluorided silica-zirconia, fluorided silica-coated alumina, sulfated silica-coated alumina, and the like, as well as combinations thereof. Additional information on chemically-treated solid oxides, and methods of their preparation, can be found in, for instance, U.S. Pat. Nos. 7,294,599, 7,601,665, 7,884,163, 8,309,485, 8,623,973, 8,703,886, and 11,912,809.

In another aspect, the catalyst system component (or modified catalyst system component) can comprise a clay mineral having exchangeable cations and layers capable of expanding. Typical clay minerals include, but are not limited to, ion-exchangeable, layered aluminosilicates such as pillared clays. The clay materials encompass materials either in their natural state or that have been treated with various ions by wetting, ion exchange, or pillaring. Typically, the clay material can comprise clays that have been ion exchanged with large cations, including polynuclear, highly charged metal complex cations. However, the clay materials also encompass clays that have been ion exchanged with simple salts, including, but not limited to, salts of Al(III), Fe(II), Fe(III), and Zn(II) with ligands such as halide, acetate, sulfate, nitrate, or nitrite.

Consistent with certain aspects of this invention, the catalyst system component (or modified catalyst system component) can comprise a clay, an acid-modified clay, a zinc-exchanged clay, and the like, as well as combinations thereof. Accordingly, the catalyst system component (or modified catalyst system component) can comprise a modified clay material such as a sulfated bentonite composition, as described in U.S. Pat. No. 11,999,814. The sulfated bentonite can further comprise zinc, or phosphorus, or both zinc and phosphorus, if desired. Therefore, the catalyst component can comprise, either singly or in any combination, alumina, silica-alumina, silica-coated alumina, and/or clay (e.g., sulfated bentonite).

The catalyst system component (or modified catalyst system component) can comprise a pillared clay, which is used to refer to a clay material that has been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to an exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. Nos. 4,452,910; 5,376,611; and 4,060,480.

Suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay comprises bentonite or montmorillonite; the principal component of bentonite is montmorillonite.

This invention also encompasses catalyst system components that further include chromium, vanadium, titanium, zirconium, hafnium, or a combination thereof, or other suitable transition metal, supported on the solid oxide, the chemically-treated solid oxide, or the clay (or acid-modified clay). Thus, the catalyst system component can comprise a supported catalyst, such as a chromium catalyst (e.g., a supported chromium catalyst), a Ziegler-Natta catalyst (e.g., supported titanium catalyst), or a metallocene catalyst (e.g., a supported zirconium or hafnium catalyst).

Representative examples of catalyst system components containing chromium supported on a solid oxide support include, but are not limited to, chromium/silica, chromium/silica-titania, chromium/silica-zirconia, chromium/silica-titania-magnesia, chromium/silica-alumina, chromium/silica-coated alumina, chromium/aluminophosphate, chromium/alumina, chromium/alumina borate, and the like, or any combination thereof. In one aspect, for instance, the catalyst system component can comprise chromium/silica, while in another aspect, the catalyst system component can comprise chromium/silica-titania, and in yet another aspect, the catalyst system component can comprise chromium/silica-alumina and/or chromium/silica-coated alumina. In circumstances in which the catalyst system component comprises chromium/silica-titania (or chromium/silica-zirconia), any suitable amount of titanium (or zirconium) can be present, including from 0.1 to 20 wt. %, from 0.5 to 15 wt. %, from 1 to 10 wt. %, or from 1 to 6 wt. % titanium (or zirconium), based on the total weight of the respective catalyst system component.

Representative examples of catalyst system components containing chromium supported on a chemically-treated solid oxide include, but are not limited to, chromium/sulfated alumina, chromium/fluorided alumina, chromium/fluorided silica-alumina, chromium/fluorided silica-coated alumina, and the like, as well as combinations thereof.

While not particularly limited, the amount of chromium present on such supported chromium catalyst system components typically can range from 0.01 to 20 wt. %. In some aspects, the catalyst system component contains from 0.01 to 10 wt. %, from 0.05 to 15 wt. %, from 0.1 to 15 wt. %, or from 0.2 to 10 wt. % chromium, while in other aspects, the catalyst system component contains from 0.1 to 5 wt. %, from 0.5 to 5 wt. %, or from 0.5 to 2.5 wt. % chromium. These amounts are based on the total weight of the catalyst system component.

Consistent with one aspect of this invention, the catalyst system component (or modified catalyst system component) can comprise a solid oxide, a chemically-treated solid oxide, a clay, or a supported catalyst, and this can include combinations of two or more of these materials. In another aspect, the catalyst system component (or modified catalyst system component) can comprise a solid oxide; alternatively, silica, silica-titania, silica-coated alumina, or a combination thereof, alternatively, a chemically-treated solid oxide; alternatively, sulfated alumina, fluorided silica-coated alumina, or a combination thereof, alternatively, a clay; alternatively, sulfated bentonite; alternatively, a supported catalyst; alternatively, a chromium/silica catalyst; or alternatively, a chromium/silica-titania catalyst.

The catalyst system component can have any suitable shape or form, and such can depend on the type of process that the catalyst system component is intended to be used (e.g., fixed bed versus fluidized bed). Illustrative and non-limiting shapes and forms include powder, round or spherical (e.g., a sphere), ellipsoidal, bead, granule (e.g., regular and/or irregular), and the like, as well as any combination thereof.

Modified Catalyst System Components

The result of the first method and the second method of this invention can be a modified catalyst system component. The modified catalyst system component can be any type of catalyst system component disclosed above; thus, the modified catalyst system component can comprise a solid oxide (e.g., silica or silica-coated alumina), a chemically-treated solid oxide (e.g., fluorided silica-coated alumina), a clay (e.g., an acid-modified clay), a supported transition metal catalyst (e.g., a supported chromium catalyst such as chromium/silica, a Ziegler-Natta catalyst, or a supported metallocene catalyst), and the like, as well as any combination thereof.

Likewise, the modified catalyst system component can have the same wet particle density (e.g., in a range from 1.05 to 2.0 g/cc, or any range within that range), the same BET surface area (e.g., in a range from 50 to 1000 $m^2/g$, or any range within that range), and the same pore volume (e.g., in a range from 0.3 to 5 mL/g, or any range within that range) as that of the catalyst system component (before contacting with the fluid to produce the paste or the agglomerated particles).

However, after the process steps in the first and second methods, the particle size distribution of the catalyst system component has been modified. For instance, a first (modified) catalyst component (composition) can have or can be characterized by (a) a d50 average particle size in a range from 60 to 140 μm, (b) a particle size span ((d90−d10)/d50) in a range from 0.6 to 1.8, and (c) a bulk density in a range from 0.22 to 0.42 g/mL, and wherein less than or equal to 10 wt. % of the catalyst component has a particle size of less than or equal to 10 μm. A second (modified) catalyst component (composition) can have or can be characterized by (A) a d50 average particle size in a range from 30 to 70 μm, (B) a particle size span ((d90−d10)/d50) in a range from 0.6 to 1.8, and (C) a bulk density in a range from 0.22 to 0.42 g/mL, and wherein less than or equal to 10 wt. % of the catalyst component has a particle size of greater than or equal to 100 μm.

Referring now to the first (modified) catalyst component (composition), the d50 average particle size can be any particle size in the range from 60 to 140 μm, and illustrative and non-limiting ranges include from 60 to 130 μm, from 60 to 120 μm, from 70 to 140 μm, from 70 to 130 μm, from 70 to 120 μm, from 80 to 140 μm, from 80 to 130 μm, or from 80 to 120 μm, and the like. The particle size span falls within a range from 0.6 to 1.8, however, other illustrative and non-limiting ranges for the span include from 0.6 to 1.7, from 0.6 to 1.6, from 0.6 to 1.5, from 0.7 to 1.8, from 0.7 to 1.7, from 0.7 to 1.6, from 0.7 to 1.5, from 0.8 to 1.8, from 0.8 to 1.7, from 0.8 to 1.6, from 0.8 to 1.5, from 0.9 to 1.7, from 0.9 to 1.6, or from 0.9 to 1.5, and the like. The bulk density of the first (modified) catalyst component (composition) is in a range from 0.22 to 0.42 g/mL, and other illustrative and non-limiting ranges include from 0.22 to 0.4 g/mL, from 0.22 to 0.38 g/mL, from 0.22 to 0.35 g/mL, from 0.24 to 0.42 g/mL, from 0.24 to 0.38 g/mL, from 0.24 to 0.35 g/mL, from 0.26 to 0.4 g/mL, from 0.26 to 0.38 g/mL, or from 0.26 to 0.35 g/mL, and the like.

The amount of the first (modified) catalyst component having a particle size of less than or equal to 10 μm can be less than or equal to 10 wt. %; alternatively, less than or equal to 9 wt. %; alternatively, less than or equal to 8 wt. %; alternatively, less than or equal to 6 wt. %; or alternatively, less than or equal to 4 wt. %. Minimum amounts can be any amount greater than zero, such as at least 0.05 wt. %, at least 0.1 wt. %, or at least 0.5 wt. %. As noted above, because the catalyst component densities are the same regardless of particle size, vol % and wt. % are the same and thus these values are interchangeable. Generally, wt. % will be used herein.

Additionally, the amount of the first (modified) catalyst component having a particle size of greater than or equal to 200 μm, in one aspect, can be less than or equal to 10 wt. %; alternatively, less than or equal to 8 wt. %; alternatively, less than or equal to 6 wt. %; alternatively, less than or equal to 5 wt. %; or alternatively, less than or equal to 4 wt. %. As above, minimum amounts can be any amount greater than zero, such as at least 0.05 wt. %, at least 0.1 wt. %, or at least 0.5 wt. %.

The first (modified) catalyst component also can be further characterized by a ratio of d90/d50 from 1.2 to 2.2, such as from 1.2 to 2, from 1.2 to 1.9, from 1.3 to 2.2, from 1.3 to 2, from 1.3 to 1.9, from 1.4 to 2.2, from 1.4 to 2.1, or from 1.4 to 1.9, although not limited thereto.

Referring now to the second (modified) catalyst component (composition), the d50 average particle size can be any particle size in the range from 30 to 70 μm, and illustrative and non-limiting ranges include from 30 to 60 μm, from 30 to 55 μm, from 30 to 50 μm, from 35 to 70 μm, from 35 to 65 μm, from 35 to 60 μm, from 35 to 55 μm, from 35 to 50 μm, from 40 to 65 μm, or from 40 to 60 μm, and the like. The particle size span falls within a range from 0.6 to 1.8, however, other illustrative and non-limiting ranges for the span include from 0.6 to 1.7, from 0.6 to 1.6, from 0.6 to 1.5, from 0.7 to 1.8, from 0.7 to 1.7, from 0.7 to 1.6, from 0.7 to 1.5, from 0.8 to 1.8, from 0.8 to 1.7, from 0.8 to 1.6, from 0.8 to 1.4, from 0.8 to 1.2, from 0.9 to 1.6, from 0.9 to 1.4, from 0.9 to 1.3, or from 0.9 to 1.2, and the like. The bulk density of the second (modified) catalyst component (composition) is in a range from 0.22 to 0.42 g/mL, and other illustrative and non-limiting ranges include from 0.22 to 0.4 g/mL, from 0.22 to 0.38 g/mL, from 0.22 to 0.35 g/mL, from 0.24 to 0.42 g/mL, from 0.24 to 0.38 g/mL, from 0.24 to 0.35 g/mL, from 0.26 to 0.4 g/mL, from 0.26 to 0.38 g/mL, or from 0.26 to 0.35 g/mL, and the like.

The amount of the second (modified) catalyst component having a particle size of greater than or equal to 100 μm can be less than or equal to 10 wt. %; alternatively, less than or equal to 8 wt. %; alternatively, less than or equal to 7 wt. %; alternatively, less than or equal to 6 wt. %; alternatively, less than or equal to 4 wt. %; alternatively, less than or equal to 3 wt. %; or alternatively, less than or equal to 2 wt. %. Minimum amounts can be any amount greater than zero, such as at least 0.05 wt. %, at least 0.1 wt. %, or at least 0.5 wt. %.

Additionally, the amount of the second (modified) catalyst component having a particle size of less than or equal to 10 μm, in one aspect, can be less than or equal to 10 wt. %; alternatively, less than or equal to 9 wt. %; alternatively, less than or equal to 8 wt. %; alternatively, less than or equal to 7 wt. %; alternatively, less than or equal to 6 wt. %; or alternatively, less than or equal to 4 wt. %. As above, minimum amounts can be any amount greater than zero, such as at least 0.05 wt. %, at least 0.1 wt. %, or at least 0.5 wt. %.

The second (modified) catalyst component also can be further characterized by a ratio of d90/d50 from 1.1 to 2.1, such as from 1.1 to 2, from 1.1 to 1.9, from 1.1 to 1.8, from 1.2 to 2, from 1.2 to 1.9, from 1.2 to 1.8, from 1.3 to 2, or from 1.3 to 1.8, although not limited thereto.

Both the first and second (modified) catalyst components, in some aspects, can be further characterized by sphericity, compactness, or aspect ratio, or any combination of these features. Accordingly, the first and second (modified) catalyst components, independently, can have a sphericity in a range from 0.9 to 0.98, from 0.9 to 0.97, or from 0.9 to 0.95 in one aspect, and from 0.91 to 0.98, from 0.91 to 0.97, from 0.91 to 0.95, from 0.93 to 0.97, or from 0.93 to 0.95 in another aspect. Additionally or alternatively, the first and second (modified) catalyst components, independently, can have a compactness in a range from 0.75 to 0.87, from 0.75 to 0.85, or from 0.75 to 0.83 in one aspect, and from 0.8 to 0.85, from 0.8 to 0.83, from 0.81 to 0.87, from 0.81 to 0.85, or from 0.81 to 0.83 in another aspect. Additionally or alternatively, the first and second (modified) catalyst components, independently, can have an aspect ratio (W/L) in a range from 0.7 to 0.78, from 0.7 to 0.76, or from 0.7 to 0.75 in one aspect, and from 0.71 to 0.78, from 0.71 to 0.75, from 0.72 to 0.78, from 0.72 to 0.76, or from 0.72 to 0.75 in another aspect.

Polymerization Processes and Ethylene Polymers

Olefin polymers (e.g., ethylene polymers) can be produced from catalyst compositions containing any of the (modified) catalyst components using any suitable polymerization process using various types of polymerization reactors, polymerization reactor systems, and polymerization reaction conditions. A representative polymerization process can comprise, therefore, contacting a catalyst composition comprising a (modified) catalyst component and an optional co-catalyst with an olefin monomer and an optional olefin comonomer in a polymerization reactor system under polymerization conditions to produce an olefin polymer. This invention also encompasses any olefin polymers (e.g., ethylene polymer compositions) produced by the polymerization processes disclosed herein.

As used herein, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof, or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high-pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst system, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608. Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst system under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327.

According to still another aspect, the polymerization reactor system can comprise a high-pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst system by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously or pulsed).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some reactor systems, the polymerization temperature generally can be within a range from 70° C. to 105° C., or from 75° C. to 100° C.

Suitable pressures will also vary according to the reactor and polymerization type. The pressure for liquid phase polymerizations in a loop reactor is typically less than 1000 psig (6.9 MPa). Pressure for gas phase polymerization is usually at 200 to 500 psig (1.4 MPa to 3.4 MPa). High pressure polymerization in tubular or autoclave reactors is generally run at 20,000 psig to 75,000 psig (138 MPa to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with the catalyst compositions—containing any of the (modified) catalyst components disclosed herein—and polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin or a $C_3$-$C_{20}$ alpha-olefin). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof, alternatively, the comonomer can comprise 1-butene, 1-hexene, 1-octene, or any combination thereof, alternatively, the comonomer can comprise 1-butene; alternatively, the comonomer can comprise 1-hexene; or alternatively, the comonomer can comprise 1-octene.

This invention is also directed to, and encompasses, the olefin polymers produced using any of the catalyst compositions—containing any of the (modified) catalyst components—and polymerization processes disclosed herein. Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can comprise an ethylene homopolymer, an ethylene/1-butene copolymer, an ethylene/1-hexene copolymer, and/or an ethylene/1-octene copolymer, while in another aspect, the olefin polymer can comprise an ethylene/1-hexene copolymer.

An illustrative and non-limiting example of an ethylene polymer composition (e.g., fluff or powder) that can be produced using the catalyst compositions—containing any of the (modified) catalyst components—and polymerization processes disclosed herein can have or can be characterized by a d50 average particle size in a range from 700 to 1800 μm, a particle size span ((d90−d10)/d50) in a range from 0.4 to 2.4, less than or equal to 7 wt. % (or vol %) of the ethylene polymer composition with a particle size of less than or equal to 250 μm, and less than or equal to 18 wt. % (or vol %) of the ethylene polymer composition with a particle size of greater than or equal to 2500 μm. The ethylene polymer composition can be in powder form (also referred to as fluff), prior to mixing and homogenizing to form typical resin pellets or beads.

A very small amount of the ethylene polymer composition is of a relatively small particle size and of a relatively large particle size. For instance, the amount of the ethylene polymer composition with a particle size of less than or equal to 250 μm often can be less than or equal to 7 wt. % of the ethylene polymer composition, such as less than or equal to 4%, less than or equal to 2%, less than or equal to 1%, less than or equal to 0.5%, or less than or equal to 0.3%. Likewise, the amount of the ethylene polymer composition with a particle size of greater than or equal to 2500 μm often can be less than or equal to 18 wt. % of the ethylene polymer composition, such as less than or equal to 10%, less than or equal to 7%, less than or equal to 5%, less than or equal to 3%, or less than or equal to 1%. As noted above, because the polymer densities are the same regardless of particle size, vol % and wt. % are the same and thus these values are interchangeable. Generally, wt. % will be used herein.

The d50 average particle size of the ethylene polymer composition is in a range from 700 to 1800 μm, and more often, the d50 average particle size can be in a range from 700 to 1700 μm, from 700 to 1500 μm, from 700 to 1300 μm, from 800 to 1800 μm, from 800 to 1700 μm, from 800 to 1600 μm, from 800 to 1400 μm, from 900 to 1700 μm, or from 900 to 1500 μm.

The particle size span ((d90−d10)/d50) of the ethylene polymer composition is in a range from 0.4 to 2.4, and more often, the particle size span can be in a range from 0.4 to 2 in one aspect, from 0.4 to 1.8 in another aspect, from 0.4 to 1.5 in another aspect, from 0.4 to 1 in another aspect, from 0.4 to 0.8 in another aspect, from 0.45 to 2.4 in another aspect, from 0.45 to 2 in another aspect, from 0.45 to 1.8 in another aspect, from 0.45 to 1.5 in another aspect, from 0.45 to 1 in yet another aspect, and from 0.45 to 0.8 in still another aspect.

While not limited thereto, the ethylene polymer composition can have a d90 particle size in a range from 1200 to 3500 μm. Other illustrative and non-limiting ranges include from 1200 to 2500 μm, from 1200 to 2000 μm, from 1300 to 3500 μm, from 1300 to 2500 μm, from 1300 to 2200 μm, or from 1300 to 2000 μm, and the like. Additionally or alternatively, the ethylene polymer composition can have a d10 particle size in a range from 300 to 1300 μm, and other illustrative and non-limiting ranges include from 300 to 1200 μm, from 400 to 1300 μm, from 400 to 1200 μm, from 500 to 1300 μm, from 500 to 1200 μm, or from 700 to 1200 μm, and the like. Additionally or alternatively, the ethylene polymer composition can have a ratio of d90/d10 in a range from 1.2 to 6, from 1.2 to 5, from 1.2 to 4, or from 1.2 to 2 in some aspects, and from 1.4 to 5, from 1.4 to 3, from 1.4 to 3, from 1.5 to 5, from 1.5 to 2.5, or from 1.5 to 2 in other aspects.

As a further quantification of the very small amount of the ethylene polymer composition of a relatively small particle size and of a relatively large particle size, the amount of the ethylene polymer composition with a particle size of less than or equal to 500 μm often can be less than or equal to 15 wt. % of the ethylene polymer composition, such as less than or equal to 7%, less than or equal to 4%, less than or equal to 2%, less than or equal to 1%, or less than or equal to 0.5%, and additionally or alternatively, the amount of the ethylene polymer composition with a particle size of greater than or equal to 3000 μm often can be less than or equal to 12 wt. % of the ethylene polymer composition, such as less than or equal to 5%, less than or equal to 3%, less than or equal to 2%, less than or equal to 1%, or less than or equal to 0.5%.

Moreover, any of the ethylene polymer compositions disclosed herein can be further described or characterized by conventional analytical techniques known and used in the polyolefin industry. As an example, the density of the ethylene polymer composition often can range from 0.90 to 0.965 or from 0.91 to 0.96 g/cm$^3$. In some aspects, the density can range from 0.91 to 0.95, from 0.92 to 0.96, or from 0.92 to 0.95 g/cm$^3$, and the like.

The ethylene polymer composition can have any suitable melt flow properties, such as indicated by the high load melt index (HLMI) in a range from 1 to 100 g/10 min. In some aspects, the HLMI can fall within a range from 2 to 80, from 3 to 60, from 4 to 50, or from 5 to 40 g/10 min, and the like.

As indicated above, the ethylene polymer composition can comprise an ethylene homopolymer and/or an ethylene/α-olefin copolymer. Thus, in one aspect, the ethylene polymer composition can comprise an ethylene homopolymer, an ethylene/1-butene copolymer, an ethylene/1-hexene copolymer, and/or an ethylene/1-octene copolymer, while in another aspect, the ethylene polymer composition can comprise an ethylene/1-hexene copolymer.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

BET surface areas can be determined using the BET nitrogen adsorption method of Brunauer et al., *J. Am. Chem. Soc.,* 60, 309 (1938) as described in ASTM D1993-91. Total pore volumes can be determined in accordance with Halsey, G. D., *J. Chem. Phys.* (1948), 16, pp. 931.

Void volume (VV) utilizes the method described in Innes (Anal. Chem. 23, 759, 1951, and Anal. Chem. 28, 332, 1956) for determining the porosity of a powder/particle. Prior to testing, the sample was dried for 2 hr at 110° C. Water was slowly dripped onto the powder, with gentle shaking and stirring, until the formerly free flowing superficially dry powder becomes wet enough that it starts to stick together and to the glass mixing vessel. The end point is defined as that point at which the seemingly dry powder begins to stick to the glass and is no longer free flowing. It was usually a sharp endpoint, meaning that the change was abrupt with the last increment of water added. In the Innes procedure, water goes into the smallest pores first, due to strong capillary forces, then the larger ones, and when the largest pores are full, the next increments of water start to fill void spaces between particles. At this point, the high surface tension of water begins to stick particles together in a very clear endpoint. This volume of water is referred to as the "void volume" herein.

For most catalyst system components, the void volume (per Innes) tracks very closely with the pore volume (per Halsey). One main difference is that the VV can also include the largest pores or macro-pores, e.g., those greater than approximately 10,000 Angstroms in diameter, which are more difficult to distinguish through nitrogen sorption. The VV also include some space between the particles, which when filled create a paste or dough-like consistency. A specific example of the determination of void volume is provided further below.

Bulk density measurements were performed by rolling the bottle in which the dry sample was stored to mix and produce a representative sample. About 8 mL of the material was transferred into a clean dry 10 mL graduated cylinder with stopper (Exax Nr 20040) having a known tare weight. The cylinder was then stoppered, rolled, and then rocked back and forth 3 times. The sample was then weighed. The settled volume of the material was measured after setting for 10 minutes. The material mass was determined by difference from the tare weight of the graduated cylinder which was then divided by the settled volume of the material to give the bulk density in g/mL.

Particle size distributions of the catalyst system components were determined by using an aqueous suspension of the particles and a Microtrac S3500 laser particle size analyzer. Conditions were set to "absorbing" with a run time of 30 sec, number of measurements 3, and shape irregular. Prior to testing, each catalyst system component material was first calcined at 450-550° C. for several hours to better resist breakage or swelling caused by circulation in the machine itself.

Polymer particle size distributions were obtained on a dry basis with a Beckman-Coulter, model Fraunhofer RF780F LS 13 320 laser-based particle size analyzer. Conditions were set to 0.7% residual, 9.9 inches of water of vacuum, 2% of obscuration, number of passes 3, and a 23 sec run time.

Melt index (MI, g/10 min) can be determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter (g/cm$^3$) on a compression molded sample, cooled at 15° C. per minute, and conditioned for 40 hours at room temperature in accordance with ASTM D1505 and ASTM D4703.

Spray drying, when used, was performed on a Buchi B-290 lab spray dryer, using a stainless steel Two Fluid Nozzle of diameter 0.7 mm. The suspension being spray dried was varied between 5 and 20 wt. % solids, to avoid settling out of the suspended material. The peristaltic pump rate varied from 10-15% (2.5-4 mL/min) based on dryer conditions at the time. This produced dried solid particles at the approximate rate of 5 to 10 g per 15 min.

The initial starting catalyst system components were as follows. AS-1 was a fine silica-coated alumina, containing 4 wt. % fluoride. It had a surface area of about 400 m$^2$/g and a nitrogen pore volume of about 1.2 mL/g. This material had been sieved through a screen to remove particles larger than about 200 mesh. AS-2 was a fine material similar to AS-1 in BET surface area and nitrogen pore volume, except that this material had been air classified in an attempt to remove particles larger than about 10 microns. Fluoriding and calcining of AS-1 and AS-2 were performed as described in U.S. Pat. No. 11,912,809. AS-3 was a fine bleaching earth (clay material) available from Clariant under the trade name Tonsil 1206. AS-4 was a silica-coated alumina like AS-1, but containing no fluoride, and having a surface area of 450 m$^2$/g, and a nitrogen pore volume of about 1.35 mL/g. It had a broad particle size distribution. AS-5 was a fine sepiolite obtained from Aldrich Chemicals. AS-6 was a fine sodium bentonite sold as a swellable potter's clay. AS-7 was a silica-coated alumina under the name of Siral 40, to which phosphoric acid was added. It had a BET surface area of about 350 m$^2$/g and a nitrogen pore volume of about 1.1 mL/g. The final composition was 57 wt. % alumina, 38 wt. % silica, and 5 wt. % $P_2O_4$.

A representative determination of void volume for AS-2 is as follows. After drying, 40 g of the fine solid AS-2 was added to a breaker. The initial, static, bulk volume occupied by the powder was 125 mL. A mechanical stirrer, equipped with four small paddles was added to the dry powder, and the motor was turned on to 100 rpm. After 1 min of stirring, the speed was turned up to 200 rpm and the material was stirred for 1 min. The powder appeared to be very dusty. At this point, 24 mL of deionized water was added to the dry powder. It quickly adsorbed into the powder. The powder remained superficially dry, although the dusty character immediately disappeared, so that the stirring speed was turned up to 300 rpm without generating dust. The bulk volume now occupied by the powder, even during stirring, was 200 mL. Then with continued stirring at 300 rpm, another 16 mL of water was added and the powder was stirred 1 min. At this point, compact spheres of 2-6 mm in diameter were formed, although the material still appeared to be dry. The bulk volume occupied by these spheres was now 180 mL. Another 4 mL of water was added during 1 min of stirring. The spheres grew larger, now 10-15 mm in diameter. The bulk volume of the material dropped more, now to 160 mL, indicating a further compaction of the original dry powder. Another 4 mL of water was introduced with stirring over 15 sec. The material clumped into still larger particles, now about 20 mm in diameter, giving a final compacted bulk volume of 100 mL. Finally, 6 more mL of water was added to the mixture with stirring. Immediately the entire mass turned into a dough consistency, yielding one large particle having the same shape as the beaker. The final compacted volume was now estimated at just 50 mL (and certainly no more than 75 mL), indicating a major compaction of the original dry powder. When pressed quickly, the dough resisted deformation, taking on a hard texture. In contrast, when pressed slowly, the dough slowly yielded and deformed in a slow flow. This indicates that the dough had strong non-Newtonian shear-thinning flow behavior. In this disclosure, the void volume is the point at which the powder sets up into a solid mass. In the example for AS-2, 40 g of dry powder adsorbed 54 mL of water. Therefore, the void volume is 54 mL/40 g or 1.35 mL/g. The void volumes of the other catalyst system components were determined with the same procedure, and similar transitions to a solid mass were observed. Table A summarizes the void volumes of AS-1 to AS-7.

In the examples below, the measured void volume (VV) was then used to determine the "relative fill volume" or RFV. This indicates what fraction of the voids (such as pores) have been filled when the powder catalyst system component is intensely mixed or "worked" to cause agglomeration. As an illustration, AS-1 has a void volume (VV) of 1.25 mL/g, and if 10 mL of water is added to 20 g of AS-1, then the relative fill volume (RFV) is 10/(20*1.25) or 40%.

Example 1

The experiments in Example 1 are an illustration of the first method of making a modified catalyst system component, using spray drying or oven drying as the method of removing water. The starting catalyst system component was AS-4 powder (void volume of 2.75 mL/g). Representative information from the particle size distribution curve of the AS-4 starting catalyst system component are shown in Table 1 as Example 1a for comparison.

For Example 1b, 15.0 g of AS-4 was stirred with 50 mL deionized water for 4-5 min, then another 0.9 g of AS-4 was added with continued stirring (relative fill volume, RFV, was 114%). This produced a thick paste with viscosity similar to that of cake batter. The intent of this example was to spray dry the mixture. However, after ~15 min of stirring, the paste was too viscous for spray drying, because it plugged the pump. Therefore, 500 more mL of water was added to reduce the viscosity. This allowed for acceptable spray drying and a portion of the slurry was dried to generate two fractions, one collected in a cyclone (fraction 1b-1, 54 wt. %) and the other which had fallen into a different collector (fraction 1b-2, 46 wt. %). Fraction 1b-2 was finer than fraction 1b-1, and particle size distribution information for the overall product (1b) and fraction 1b-1 and fraction 1b-2 are provided in Table 1.

Another portion of the slurry in Example 1b was spray dried but then the dried product was sieved using a 140 mesh screen (104 μm) and a 500 mesh screen (30 μm). Particle size distribution information on this isolated fraction (Example 1b-3) with particles mainly in the 30-104 μm range is also shown in Table 1.

For Example 1c, 33.2 g of AS-4 was mixed with 100 mL of deionized water for 4-5 min while stirring. In Example 1c, 5 mL of concentrated nitric acid was also added to the water to partially peptize the support. To obtain the desired viscosity, 7.5 g more of AS-4 was then added with another 10 min of stirring (final RFV of 94%). Finally, after another ~15 min of stirring, the "cake batter" consistency was again reached. To spray dry the mixture, an additional 550 mL of water was added to reduce the viscosity. Spray drying produced two dried powder fractions, collected in two places on the spray dryer. Fraction 1c-2 was finer than fraction 1c-1, and particle size distribution information for the overall product (1c) and fraction 1c-1 (15 wt. %) and fraction 1c-2 (85 wt. %) are provided in Table 1.

For Example 1d, Example 1c was repeated, except for the following. Instead of being spray dried, the wet dough was dried in a vacuum oven at 100° C. for 24 hr. Then, the soft brick was crushed and pushed through a 20 mesh screen. This was calcined at 550° C. for 3 hr. It was next pushed through a 50 mesh screen and this material was then sieved using a 100 mesh screen. Two particle size distributions are shown in Table 1. Fraction 1d-1 contained primarily the particles smaller than 100 microns, while fraction 1d-2 contained the particles that remained on the 100 mesh screen.

Table 1 summarizes the particle size distributions for all of the materials analyzed in Example 1. Importantly, the first method of making a modified catalyst system component was able to manipulate the particle size distribution over a wide range. This first method, used with water alone or acidified water, decreased the oversized fraction, as indicated by Example 1b and Example 1c, which is useful. However, water alone also tended to increase the fine fraction, which is not always desirable. When acid was added, though, the fine fraction also decreased, which is beneficial. Even without acid, however, there was a significant narrowing of the distribution, as shown by the decrease in the span and Mv/Mn ratio in Example 1b and Example 1c.

Example 2

The experiments in Example 2 are another illustration of the first method of making a modified catalyst system component, using spray drying as the method of removing water. The starting catalyst system component was AS-3 powder (void volume of 0.95 mL/g). Representative information from the particle size distribution curve of the AS-3 starting catalyst system component are shown in Table 2 as Example 2a for comparison.

For Example 2b, 30.6 g of AS-3 was combined with 100 mL of deionized water to make a paste (RFV was 344%), which was then stirred rapidly by hand for about 15 min. The intent of this variation was to spray dry the mixture. However, the paste was too viscous for spray drying because it plugged the pump. Therefore, 100 mL of additional water was added to reduce the viscosity. This allowed for acceptable spray drying to generate two fractions, fraction 2b-1 collected in a cyclone (59 wt. % of total) and fraction 2b-2 which had fallen into a different collector (41 wt. %). Fraction 2b-2 was finer than fraction 2b-1, and particle size distribution information for the overall product (2b) and fraction 2b-1 and fraction 2b-2 are provided in Table 2.

For Example 2c, 15.0 g of AS-3 was combined with only 15 mL of deionized water to make a much thicker paste, resulting in a RFV of 105%. The intent of this variation was to work a more viscous paste more intensely and for a much longer time, and therefore the paste was then stirred rapidly with a magnetic stirrer for 4 days. The thick paste was much too viscous for spray drying, but in this example, a bare minimum, only 5 mL, of additional water was added to thin the mixture enough to allow for acceptable spray drying. Again, this generated two dry fractions, fraction 2c-2 collected in a cyclone (75 wt. % of total) and fraction 2c-1 which had fallen into a different collector (25 wt. %). Fraction 2c-2 was finer than fraction 2c-1, and particle size distribution information for the overall product (2c) and fraction 2c-1 and fraction 2c-2 are provided in Table 2.

Table 2 summarizes the particle size distributions for all of the materials analyzed in Example 2. Importantly, the first method of making a modified catalyst system component was able to manipulate the particle size distribution over a wide range. In both Examples 2b and 2c, the amount of material greater than 100 microns was lowered, which can be desirable, and there was little change in the fine particle amount (<10 microns). Example 2c, which used a more concentrated mixture (lower RFV), yielded less fine material, less larger material, and a significantly lower Mv/Mn.

Example 3

The experiments in Example 3 are another illustration of the first method of making a modified catalyst system component, but with oven drying as the method of removing water. The starting catalyst system component was AS-3 powder (void volume of 0.95 mL/g). Representative information from the particle size distribution curve of the AS-3 starting catalyst system component are shown in Table 3 as Example 3a for comparison.

For Example 3b, 9.25 g of AS-3 was combined with 15.0 mL of deionized water to produce a very thick soup or paste-like consistency (RFV of 344%). This paste was stirred intensely with a magnetic stirrer for 4 days, and then it was dried in a vacuum oven for 18 hr at 100° C. This resulted in a hard "brick" that was then pushed with effort through a 30-mesh screen. The resultant coarse powder was then sieved using a 100-mesh screen. Larger particles that did not go through the 100-mesh screen were then pushed with some effort through the screen, yielding the final combined product of Example 3b-1. The particle size distribution of Example 3b-1 is shown in Table 3. This product was then further screened to isolate a fraction (Example 3b-2) with particles mainly in the 38-106 μm range, which was 50 wt. % of the total product; particle size distribution information on this isolated fraction (Example 3b-2) is also shown in Table 3.

For Example 3c, 9.25 g of AS-3 was again combined with 15.0 mL of deionized water, to produce a very thick soup or paste-like consistency (RFV of 168%), as described in Example 3b. However, in this example, the water also contained 0.1 g of guar gum dissolved into the water, which was 1.1 wt. % based on the weight of the AS-3. This paste was stirred intensely for 4 days, and then it was dried in a vacuum oven for 18 hr at 100° C. This again resulted in a hard "brick" that was then pushed with effort through a 20-mesh screen. The resultant coarse powder was then sieved using a 50-mesh screen. Larger particles that did not go through the 50-mesh screen were then pushed with some effort through the screen, yielding the final combined product. The same operation was repeated using a 100-mesh screen. The particle size distribution of Example 3c is shown in Table 3.

Example 3d-1 was conducted in the same manner as Examples 3b and 3c, except that 0.2 g of guar gum was first dissolved in the water, which is 2.2 wt. % guar gum based on the AS-3. Particle size distribution information on the product obtained through a 50 mesh screen is shown in Table 3. This material was further pushed through a 100 mesh screen and that which passed through a 325 mesh screen was removed. Particle size distribution information on this isolated fraction (Example 3d-2) is also provided in Table 3.

For Example 3e, 15 mL of a 0.5 wt. % guar solution was added to 24.0 g of a slurry of 38.5 wt. % AS-3 and 400 mL of deionized water (9.25 g AS-3, RFV of 168%). The final guar gum amount was 0.8 wt. % based on the weight of the AS-3. The mixture was stirred vigorously for about 15 min, after which it was dried into a "brick' in a 100° C. vacuum oven for 18 hr. The solid brick was then pushed through a 20-mesh screen and then sieved with a 30 mesh screen. Larger particles that did not naturally fall through the 30-mesh screen were pushed through. Particle size distribution information on the final product after calcining at 550° C. for 3 hr (Example 3e) is provided in Table 3.

For example 3f, 20 mL of a 0.5 wt. % guar solution was added to 24.0 g of a slurry of 38.5 wt. % AS-3 and 400 mL of deionized water (9.25 g AS-3, RFV of 168%). That final guar gum amount was 1.1 wt. % based on the weight of the AS-3. The mixture was stirred vigorously for about 15 min, after which it was dried into a "brick' in a 100° C. vacuum oven for 18 hr. The solid brick was then pushed through a 20-mesh screen and then sieved with a 30-mesh screen. Larger particles that did not naturally fall through the 30-mesh screen were pushed through. Particle size distribution information on the final product (Example 3f) is provided in Table 3.

Example 3g was performed in the same manner as Example 3f (9.25 g AS-3, RFV of 168%), except that the final guar gum amount was 1.6 wt. % based on the weight of the AS-3. Particle size distribution information on Example 3g is provided in Table 3.

For Example 3h, 9.0 g of AS-3 was combined with 1.0 g of AS-6 as a binder, then 25.0 mL of deionized water was added. This mixture was stirred intensively for 18 hr to produce a very thick soup or paste-like consistency (RFV of 317%). Drying in a vacuum oven at 100° C. for 18 hr resulted in a hard "brick" that was then pushed with some effort through a 20-mesh screen. The resultant coarse powder was then sieved using a 30-mesh screen. Larger particles that did not fall naturally through the 30-mesh screen were then pushed through with some effort. This combined product was then sieved with a 100-mesh screen. Again, larger particles that did not fall through the 100-mesh screen naturally were then pushed through with some effort, yielding the final combined product of Example 3h. Particle size distribution information on Example 3h is provided in Table 3.

Example 3i was performed in a manner similar to Example 3e, except that 5.0 g of AS-3 was combined with 5.0 g of AS-6 as a binder, then 100 mL of deionized water was added. This mixture was mixed intensively in a magnetic stirrer for 18 hr to produce a very thick soup or paste-like consistency (RFV of 2590%). Drying in a vacuum oven at 100° C. for 18 hr resulting in a hard "brick" that was then pushed with some effort through a 20-mesh screen. The resultant coarse powder was sieved using a 30-mesh screen. Larger particles that did not fall naturally through the 30-mesh screen were then pushed through with some effort. This combined product was then sieved with a 50-mesh screen. Again, larger particles that did not fall through the 50-mesh screen naturally were then pushed through with some effort, yielding the final combined product of Example 3i. Particle size distribution information on Example 3i is provided in Table 3.

Example 3j was performed in the same manner as Example 3i, except that 2.5 g of AS-3 was combined with 7.5 g of AS-6 as a binder (RFV of 2482%). Particle size distribution information on Example 3j is provided in Table 3.

Example 3k was performed in the same manner as Example 3i, except that 7.5 g of AS-3 was combined with 2.5 g of AS-6 as a binder (RFV of 1779%). Also, after the 30-mesh screen, the combined product was then sieved with a 100-mesh screen. Larger particles that did not fall through the 100-mesh screen naturally were then pushed through with some effort, yielding the final combined product of Example 3k. Particle size distribution information on Example 3k is provided in Table 3.

For Example 3l, 30.0 g of AS-3 was combined with 10.0 g of AS-6 as a binder, then 200 mL of deionized water was added. This mixture was stirred intensively for 18 hr to produce a very thick soup or paste-like consistency (RFV of 872%). Drying in a vacuum oven at 100° C. for 18 hr resulting in a hard "brick" that was then pushed with some effort through a 20-mesh screen. The resultant coarse powder was sieved using a 30-mesh screen. Larger particles that did not fall naturally through the 30-mesh screen were then pushed through with some effort. This combined product was then sieved with a 50-mesh screen. Again, larger particles that did not fall through the 50-mesh screen naturally were then pushed through with some effort, yielding the final combined product of Example 3l. Particle size distribution information on Example 3l is provided in Table 3.

Example 3m is a continuation of Example 3i and demonstrates how further processing and recycling can be accomplished. The final product from Example 3i was first sieved using a 100-mesh screen, to remove 6 g of fine material. This fine material, which in some situations might be discarded as "waste" due to the small particle size, was instead recycled by adding it back to another batch made using the identical procedure of Example 3i. The recycled fines were combined with 30.0 g of AS-3, 10.0 g of AS-6, and 200 mL of water. The mixture was stirred and then dried in a vacuum oven exactly as in Example 3i. The dried brick that was formed was then pushed through a 20-mesh screed, then a 30-mesh screen, then a 50-mesh screen just as described in Example 3i. Next, this product was sieved using a 100-mesh screen, and the fine material falling through the screen was separated out. In a third repetition of the process, the fines removed from the second batch, as described immediately above, were then added back to a third batch using exactly the same recipe. In this way the fines were removed and recycled in a process that ultimately left little to no fine material in the final product. Particle size distribution information on the final product from the third cycle of this process (Example 3m) is provided in Table 3. Note that very little fines remain.

Table 3 summarizes the particle size distributions for all of the materials analyzed in Example 3. Importantly, the first method of making a modified catalyst system component was able to manipulate the particle size distribution over a wide range. Most of the experiments using guar gum as the binder succeeded in narrowing the particle size distribution significantly, as shown in the span and Mv/Mn. The second series in Example 3 utilized AS-6 as the binder, and also greatly lowered Mv/Mn and also the span values. Beneficially, all of the experiments in Example 3 succeeded in agglomerating the particles, that is, in producing larger particles from smaller ones. Thus, resizing by means of grinding becomes possible, to eventually convert all of the catalyst system component into the desired particle size range. But, and equally desirable, all of the experiments in Example 3 also reduced the amount of fine material (e.g., amount with a particle size less than 10 μm) compared to the original catalyst system component.

Example 4

The experiments in Example 4 are an illustration of the second method of making a modified catalyst system component. Generally, the catalyst system component was simply stirred under various conditions to agglomerate it into densified larger particles, but not into a brick. The starting catalyst system component was AS-1 powder (void volume of 1.25 mL/g), which is extremely fine without larger particles. Representative information from the particle size distribution curve of the AS-1 starting catalyst system component are shown in Table 4 as Example 4a for comparison (note the d50 of less than 10 μm).

In Example 4b, 20 g of AS-1 powder was added to a small blender along with 4 g of glucomannan powder (20 wt. %). These materials were dry-blended a few min. Then, 10 mL of deionized water were added, followed by blending for a few min, which produced a superficially dry powder. Another 10 mL of water was added followed by blending for a few min (RFV of 80%). After a few min more of mixing and blending, the now visibly agglomerated powder was dried and calcined at 500° C. for 3 hr. Particle size distribution information on Example 4b is provided in Table 4.

In Example 4c, 25 g of AS-1 powder was added to a plastic 600 mL beaker along with 3 g of glucomannan powder (12 wt. %). A paddle mixer was then added and the two powders were dry-mixed at 300 rpm for a few min. While still mixing, 20 mL of deionized water was dripped in, followed by another few min of mixing. This produced a superficially dry powder (RFV of 64%). The now visibly agglomerated powder, which contained some 2-3 mm spheres that broke up upon transport, was dried and calcined at 500° C. for 3 hr. Particle size distribution information on Example 4c is provided in Table 4.

In Example 4d, 27 g of AS-1 powder was added to a plastic 600 mL beaker along with 3 g of guar gum powder (11 wt. %). A paddle mixer was then added and the two powders were dry-mixed at 300 rpm for a few min. While still mixing, 21 mL of deionized water was dripped in at the rate of about 4 drops/sec, followed by another three min of mixing at 400 rpm. This produced a superficially dry powder (RFV of 67%). The now visibly agglomerated powder, which contained some 2-3 mm spheres that broke up upon transport, was dried and calcined at 500° C. for 3 hr. Particle size distribution information on Example 4d is provided in Table 4.

In Example 4e, 0.4 g of guar gum (2.5 wt. % based on AS-1) was dissolved in 50 mL of deionized water. Separately, 16 g of AS-1 was mixed in 50 mL of water (RFV of 500%). The two mixtures were combined, and then the resultant slurry was spray dried. Two fractions were obtained: Example 4e-1 (fine fraction) and Example 4e-2 (coarse fraction). Particle size distribution information for fraction 4e-1 and fraction 4e-2 are provided in Table 4.

Table 4 summarizes the particle size distributions for all of the materials analyzed in Example 4. Importantly, the second method of making a modified catalyst system component was able to manipulate the particle size distribution over a wide range. These experiments, which used glucomannan or guar gum as the binder, succeeded at greatly increasing the particle size, while not producing a thick paste or brick. In Example 4b, for instance, the large majority of product was inside a generally desirable range of 10-100 microns. Other examples also successfully produced significant product inside this range, however, many of the fines were not fully agglomerated, leaving too many fine particles for a one-pass operation. In a multistep process, particles in the desired size range would have been removed and the fines would have been added to the next batch for further agglomerating. Thus, resizing by means of sieving and grinding becomes possible, to eventually convert all of the original catalyst system component into the desired particle size range.

Example 5

The experiments in Example 5 are another illustration of the second method of making a modified catalyst system component. The starting catalyst system component was AS-2 powder (void volume of 1.35 mL/g), which is extremely fine without larger particles. Representative information from the particle size distribution curve of the AS-2 starting catalyst system component are shown in Table 5 as Example 5a for comparison (note the d50 of less than 10 μm).

In Example 5b, 40.0 g of AS-2 powder was stirred in a paddle mixer for one min at 100 rpm, then 200 rpm. Over the next min, 15 mL of deionized water was slowly dripped in while stirring at 200 rpm. The stirring speed was increased to 300 rpm and over the next min another 15 mL of water was added (RFV of 58%). Stirring was continued for another 3.5 min at 300 rpm. The stirrer was stopped and any larger particles clinging to the walls were knocked down. Stirring was continued at 400 rpm for another 4 min. The resultant powder was dried in a muffle furnace at 450° C. for 3 hr. Particle size distribution information on Example 5b is provided in Table 5.

In Example 5c, 40.0 g of AS-2 powder was stirred in a paddle mixer for one minute at 100 rpm, then 200 rpm. Over the next few min, water was slowly dripped in and the stirring speed was increased to 300 rpm. A total of 54 mL of water was added (RFV of 104%). Stirring was continued for another 3.5 min at 300 rpm. The stirrer was stopped and any larger particles clinging to the walls were knocked down. Stirring was continued at 400 rpm for another 4 min. The resultant powder was dried in a muffle furnace at 450° C. for 3 hr. The resulting coarse powder was then sieved to remove anything smaller than 20 mesh. Particles larger than 20-mesh were subjected to a single pass through a conical burr grinder (Hario Mini Mill Slim Manual Grinder with ceramic conical burr set, set at 15 clicks above burr contact), and sieved again. Once again, the particles not passing through the 20-mesh screen were passed through the grinder. This pattern continued through 12 cycles of alternate sieving and grinding the oversize, until finally all of the powder/particles were smaller than 20-mesh. This repetitive pattern was superior to one long grinding session, because it produced fewer fine particles. Particle size distribution information on the final product of Example 5c is provided in Table 5, and the cumulative amount of material passing through 20 mesh for each sieve and grind cycle is provided in Table B.

In Example 5d, 40.0 g of AS-2 powder was stirred in a paddle mixer for one min at 100 rpm, then 200 rpm. Over the next few min, water was slowly dripped in and the stirring speed was increased to 300 rpm. A total of 40 mL of water was added (RFV of 77%). Stirring was continued for another 3.5 min at 300 rpm. The stirrer was stopped and any larger particles clinging to the walls were knocked down. Stirring was continued at 400 rpm for another 4 min. The resultant powder was dried in a muffle furnace at 450° C. for 3 hr. Particle size distribution information on Example 5d is provided in Table 5.

In Example 5e-1, 40.0 g of AS-2 powder was stirred in a paddle mixer for one min at 100 rpm, then 200 rpm. Over the next few min, water was slowly dripped in and the stirring speed was increased to 300 rpm. A total of 44 mL of water was added (RFV of 85%). Stirring was continued for another 3.5 min at 300 rpm. The stirrer was stopped and any larger particles clinging to the walls were knocked down. Stirring was continued at 400 rpm for another 4 min. The resultant powder was dried in a muffle furnace at 450° C. for 3 hr. Particle size distribution information on Example 5e-1 is provided in Table 5. The product from Example 5e-1 was further processed by sieving using a 20-mesh screen. The portion that did not pass through the screen was then ground as above with burr setting of 1 click above contact. Then, this portion was combined with the portion that went through the screen to form the modified product of Example 5e-2, and particle size distribution information on Example 5e-2 is provided in Table 5.

In Example 5f, 40.0 g of AS-2 powder was stirred in a paddle mixer for one min at 100 rpm, then 200 rpm. Over the next few min, water was slowly dripped in and the stirring speed was increased to 300 rpm. A total of 48 mL of water was added (RFV of 92%). Stirring was continued for another 3.5 min at 300 rpm. The stirrer was stopped and any larger particles clinging to the walls were knocked down. Stirring was continued at 400 rpm for another 4 min. The resultant powder was dried in a muffle furnace at 450° C. for 3 hr. Particle size distribution information on Example 5f is provided in Table 5.

In Example 5g, the agglomerated product of Example 5f was then sieved through a 30-mesh screen, much like the process described in Example 5c. Material passing through the screen was set aside, but the material that did not pass through the screen was then given a single pass (~10 sec) through the mechanical grinder described in Example 5c. That material was then sieved again, and then the "overs" were ground again. This process was continued through ten cycles. Each cycle produced new material in the desired range (smaller than 30 mesh in this example) which was then added to the total. Particle size distribution information on the final product of Example 5g is provided in Table 5, and the cumulative amount of material passing through 30 mesh for each sieve and grind cycle is provided in Table B.

In Example 5h, the agglomerated product of Example 5g was then sieved through a 50-mesh screen, much like the process described in Example 5g. The process was continued through eight cycles. Particle size distribution information on the final product of Example 5h is provided in Table 5, and the cumulative amount of material passing through 50 mesh for each sieve and grind cycle is provided in Table B.

In Example 5i, the procedure described in Example 5c was repeated using 40 g AS-2 and 30 mL of deionized water. However, in Example 5i, 5 g of inulin was also blended into the AS-2 as a binder prior to adding the water. This equals 12.5 wt. % inulin based on the AS-2 (RFV of 58%). Particle size distribution information on Example 5i is provided in Table 5.

In Example 5j, the procedure described in Example 5c was repeated using 40 g AS-2 and 30 mL of deionized water. However, in Example 5j, 5 g of microcrystalline cellulose was also blended into the AS-2 as a binder prior to adding the water. This equals 12.5 wt. % cellulose based on the AS-2 (RFV of 58%). Particle size distribution information on Example 5j is provided in Table 5.

In Example 5k, the procedure described in Example 5c was repeated using 40 g AS-2 and 30 mL of deionized water. However, in Example 5k, 5 g of AS-6 was also blended into the AS-2 as a binder prior to adding the water. This equals 12.5 wt. % AS-6 based on the AS-2 (RFV of 58%). Particle size distribution information on Example 5k is provided in Table 5.

In Example 5l, the procedure described in Example 5c was repeated using 40 g AS-2 and 30 mL of deionized water. However, in Example 5l, 5 g of AS-3 was also blended into the AS-2 as a binder prior to adding the water. This equals 12.5 wt. % AS-3 based on the AS-2 (RFV of 58%). Particle size distribution information on Example 5l is provided in Table 5.

In Example 5m, the procedure described in Example 5c was repeated using 40 g AS-2 and 48 mL of deionized water. However, in Example 5m, 1 g of glucomannan was dissolved into the water as a binder prior to the addition of the AS-2. This equals 2.5 wt. % glucomannan based on the AS-2 (RFV of 92%). Particle size distribution information on Example 5m is provided in Table 5.

In Example 5n, the agglomerated product of Example 5m was sieved with a 30-mesh screen, much like process described in Example 5g, using 1 pass through the conical burr grinder described in Example 5c, set at 15 clicks above burr contact. This ground material was then sieved again using a 30-mesh screen. Once again, larger particles that did not pass through the screen were ground again at the same settings. Another cycle was continued, however, the grinder burr setting was closed three clicks. This product was sieved again, as before, and the portion passing through the screen was ground again at the same settings. The process was continued for three more cycles, closing the burr settings another 3 clicks every second grind. The final grind occurred at burr contact. Particle size distribution information on the final product of Example 5n is provided in Table 5, and the cumulative amount of material passing through 30 mesh for each sieve and grind cycle is provided in Table B.

In Example 5p-1, the product from Example 5n was further processed in the same way, for seven more cycles, but this time using a 50-mesh screen. The same grinder in Example 5c was used, and the final grinder settings from Example 5n were used as the starting position in this example. The burr position was further decreased each second cycle during this example, resulting in a final setting of 12 clicks closer than the initial burr position. Particle size distribution information on the final product of Example 5p-1 is provided in Table 5, and the cumulative amount of material passing through 50 mesh for each sieve and grind cycle is provided in Table B.

In Example 5p-2, some of the product from Example 5p-1 was further processed by subjecting it to three more cycles of grinding and sieving. Finally, fine material was removed from the powder using a 325-mesh screen and the coarse particles removed using a 100-mesh screen. Particle size distribution information on this isolated fraction with particles mainly in the 45-150 μm range is provided in Table 5.

In Example 5q, the procedure described in Example 5m was repeated except with that 2 g of glucomannan was dry-mixed with the AS-2 powder and water was dripped in during the stirring process. The final RFV was 92%. Particle size distribution information on Example 5q is provided in Table 5.

In Example 5r, the procedure described in Example 5n was repeated except that 2 g of glucomannan and more grinding cycles were used. The initial burr setting was 15 clicks above contact, and this setting was lowered every second cycle, ending in 6 clicks beyond contact. Particle size distribution information on the final product of Example 5r is provided in Table 5, and the cumulative amount of material passing through 30 mesh for each sieve and grind cycle is provided in Table B.

In Example 5s, the product of Example 5r was treated in the same manner as described in Example 5p-1, using 7 grinding cycles. The starting burr setting was identical to the final setting in Example 5r. This setting was decreased by 3 clicks each second grind, to a final value of 15 clicks beyond burr contact. Particle size distribution information on the final product of Example 5s is provided in Table 5, and the cumulative amount of material passing through 50 mesh for each sieve and grind cycle is provided in Table B.

In Example 5t, the procedure of Example 5f was used, but with these changes to the grinding step. A 20-mesh sieve was used, and larger particles that did not fall through the screen were then ground in the same manual grinder, set at 10 clicks above burr rub. The product was then sieved again using a 20-mesh screen. Larger particles that did not pass through the screen were then ground again, with the grinder set at 2 clicks closer to burr rub. This process was continued for three more cycles, where the final grinder setting was only 2 clicks above burr rub. Particle size distribution information on Example 5t is provided in Table 5.

For Example 5u, the product from Example 5t was then sieved using three stacked screens (20/50/200 mesh). Larger particles that did not pass through the (top 20 mesh) screen were then ground using a setting of 2 clicks above burr rub, and again put through the 3-screen stack. Again, larger particles that did not pass through the top 20-mesh screen were ground, with a setting again of 2 clicks above burr rub. This cycle was repeated one more time, leaving nothing on the top screen. When the stack was disconnected, 38 wt. % of the final product was on the 50-mesh screen (>297 μm, 5u-1), 58 wt. % of the final product was on the 200-mesh screen (75-297 μm, 5u-2), and 5 wt. % passed through the 200-mesh screen (<75 μm, 5u-3). Particle size distribution information on the 5u-1, 5u-2, and 5u-3 fractions are provided in Table 5. As would be recognized by those skilled in the art, theoretically, there should be nothing below 75 microns in Example 5u-2, but sieve screens are not perfect in practice.

In Example 5v, the procedure of Example 5f was repeated, except that the fractions of particles from Example 5u remaining above 50-mesh (or >297 μm) and below 200-mesh (or <75 μm) totaling 10.7 g and 1.4 g, respectively, were added to the preparation for a total of 52.1 g AS-2. Water was added in a similar manner as before for a total of 62 mL (RFV of 92%). No particle size analysis was completed as resultant particles were too large for the instrument.

For Example 5w, the agglomerated product of Example 5v was then sieved in the same way as Example 5t. Initial weight before grinding was 43 g. The weight after grinding and sieving was 41.9 g (5w-1). Particle size distribution information on Example 5w-1 is provided in Table 5. The product from Example 5w-1 was separated into three fractions using the 50-mesh and 200-mesh screens: >297 μm (5w-2), 75-297 μm (5w-3), and <75 μm (5w-4). Particle size distribution information on the 5w-2, 5w-3, and 5w-4 fractions is provided in Table 5.

For Example 5x, the product from Example 5w was further processed by sieving through stacked 100-mesh and 325-mesh screens. In step 1, particles remaining over the 100-mesh were ground at the same ending burr setting from Example 5w. In step 2, to continue to break particles apart, sixty 5 mm steel ball bearings were added to the 100-mesh sieve and shaken. Steps 1 and 2 were repeated 5 times with no change in the grind setting. Fractions of particles were isolated with 9.8 g above 100-mesh (or >150 μm, 5x-1), 4.3 g below 325-mesh (or <45 μm, 5x-2), and 21.7 g between 325-mesh and 100-mesh (or 45 μm-150 μm, 5x-3). Final weight was 35.8 g. Particle size distribution information on the 5x-1, 5x-2, and 5x-3 fractions is provided in Table 5.

For Example 5y, the procedure of Example 5f was repeated, except that 5 mL of nitric acid was added to the 48 mL DI water (RFV of 89%). The stirring process was stopped at 7.5 min as the sample became a single mass. After sitting covered for 35 min, a spatula was used to break the mass into 20-30 mm clumps. The resultant sample was calcined at 450° C. for 3 hr. No particle size analysis was completed as resultant particles were too large for the instrument.

For Example 5z, the agglomerated AS-2 from Example 5y was then sieved using a 20-mesh screen. The oversized particles, those not falling through the screen, were ground in the manual grinder described previously at 10 clicks more open than burr touch. This ground material was then sieved again using 20-mesh, and oversized material was again ground, but using 1 click closer to burr touch. Once again, the ground material was sieved using a 20-mesh screen, and the oversized material was ground as before, but now using 1 click closer to burr touch. Again, this ground material was sieved using a 20-mesh screen. The residual oversized material was ground again using 1 click closer to burr touch. Then, the cumulative total of all the product previously collected was sieved together using a stacked 100-, 200-, and 325-mesh screen pack. The oversized material, that not falling through the 100-mesh screen, was ground again using but using 1 click closer to burr touch. This oversized material was sieved again using the stacked screens and the process was repeated again and again for a total of ten iterations, moving the grinding setting 1 click closer to burr touch each time. Four isolated fractions were produced: >150 μm (5z-1), 75-150 μm (5z-2), and 45-75 μm (5z-3), and <45 μm (5z-4). In a final step, two of the cuts were re-combined to produce an isolated 45-150 μm fraction (5z-5) and an isolated 25-75 μm fraction (5z-6). Particle size distribution information on the 5z-1, 5z-2, 5z-3, 5z-4, 5z-5, and 5z-6 fractions is provided in Table 5.

For Example 5aa, 40 g of AS-2 was added to a 600 mL beaker. Using an overhead stirrer, the powder was stirred 1 min at 100 rpm. With a syringe, 5 mL of deionized water was dripped in and then the mixture was stirred for 1 min at 100 rpm. 9 more mL of deionized water was then added and the mixture was stirred for 1 min at 100 rpm. Another 13 mL of deionized water was added, followed by stirring for 1 min at 200 rpm. Another 3 mL of water was added followed by stirring 1 min at 400 rpm. Next, 5 mL of water was dripped in and the mixture stirred for another 1 min at 400 rpm. Finally, 6 mL of water was added and the mixture again stirred for another 1 min at 400 rpm. The volume of the mixture was recorded after each 1 min of stir cycle. Total water added was 54 mL (RFV of 100%). This mixture was then dried in a vacuum oven at 60° C. for 24 hr. It was then sieved using a stack of three screens (35-, 100- and 325-mesh). The material that did not pass through the upper screen was then ground in one pass each at +15 clicks. The powder was sieved again and the oversized portion ground again at +0 clicks. The cycle was repeated, grinding the oversized portion again using −5 clicks relative to burr touch. The 35-mesh screen was then removed and the cumulative powder was then sieved using a 100-mesh screen. The oversized material was then ground at −5 clicks once. The ground powder was then re-sieved using a 100 mesh screen, and the oversized powder was ground again at −10 clicks relative to burr touch. The sieving and grinding operations were repeated three times at the same setting. The two cuts were calcined at 450° C. for 3 hr. The fine cut was discarded, and particle size distribution information on the 45-150 μm fraction of Example 5aa is provided in Table 5. During these operations, minimal dust was noticed during grinding. The total process produced 31 wt. % fines (<45 μm), 67 wt. % isolated target product (45-150 μm), and 1 wt. % oversized particles (>150 μm).

Table 5 summarizes the particle size distributions for all of the materials analyzed in Example 5. Importantly, the second method of making a modified catalyst system component was able to manipulate the particle size distribution over a wide range. Also, beneficially, several of the examples demonstrate that—by a combination of agglomeration procedures, drying, sieving and grinding operations—it is possible to convert a starting catalyst system component, whether too fine or too coarse, into a desired range of particle sizes with effectively 100% yield.

Example 6

The experiments in Example 6 are an illustration of the first method and the second method of making a modified catalyst system component. The starting catalyst system component was AS-5 powder (void volume of 1.70 mL/g), which has a large amount of fines. Representative information from the particle size distribution curve of the AS-5 starting catalyst system component are shown in Table 6 as Example 6a for comparison (note the 30 wt. % of the distribution has a particle size of less than 10 μm).

In Example 6b, 12.0 g of AS-5 powder was stirred into 60 mL of deionized water to form a thick slurry, which actually became thicker as stirring was continued, so that an additional 10 mL of water had to be added. This gradual thickening was probably the result of breaking up the larger particles into smaller ones during the kneading process, allowing more water adsorption and more interaction between particles. The thick paste was then stirred for 1 hr. Since the VV was 1.7 mL/g, this amounts to a final RFV of 343%. This paste was then dried in a vacuum oven at 100° C. for 18 hr. The resulting solid cake was then broken up by grinding using the same operation and grinder described above. Material from the first grinding was then sieved using a 20-mesh screen. The undersized particles were set aside as product A. The oversized particles were then ground again, at a tighter burr setting, and the resulting powder was added to product A. This combination was sieved again using a 30-mesh screen. The undersized particles were set aside as product B. The oversized particles were again ground with a tighter burr setting, and combined with product B. The combination was then sieved again using a 50 mesh screen. The undersized particles were set aside as product C. The oversized particles were ground again at a tighter burr setting. The part passing through the screen was combined with product C, while the oversized particles were ground again. This process was repeated until all of the product passed through the 50-mesh screen. Particle size distribution information on Example 6b is provided in Table 6.

In Example 6c, 60 mL of deionized water was stirred into 40 g of AS-5, using the same process described above. The stirrer was set at 300 rpm and allowed to stir for two min (RFV of 88%). This produced a noticeable amount of shrinkage (compaction) as the powder turned into a viscous mud. It was placed in a muffle furnace set at 450° C. for 3 hr. This dried material was then subjected to grinding, using the same grinder described above, and sieved through a 35-mesh screen. The material that did not pass through the screen, was then removed and ground up again, to be sieved again using the same screen. This process was continued for four cycles, and each grinding operation was adjusted to a tighter burr gap as follows: grinding 1 was conducted at +15 clicks beyond burr contact, grinding 2 at +10 clicks, grinding 3 at +5 clicks, and finally grinding 4 was done +0 clicks, that is, at burr contact. The cumulative material that passed through the 35 mesh screen was then sieved again using 100-mesh screen on top, and a 325 mesh screen on the bottom. The material that did not pass through the 100-mesh screen was ground again as described above. Two cycles were required to pass nearly all of the powder though the 100 mesh screen. The first grinding was conducted at 0 clicks and then the second grinding used −4 clicks (that is, 4 additional clicks after burr contact). The last remaining trace of 100-mesh oversized material was pushed through the screen using gentle pressure on a rubber press applied with a circular motion. Particle size distribution information on the 325-mesh oversized fraction of Example 6c is provided in Table 6.

Example 7

The experiments in Example 7 used AS-7 as the starting material, and it also represents an example of the invention as applied to a supported chromium catalyst. Representative information from the particle size distribution curve of the AS-7 starting catalyst system component are shown in Table 7 as Example 7a for comparison.

In Example 7b, 40 g of AS-7 was combined with 70 mL of water (RFV of 100%), followed by stirring for 1 min and then it was dried in a vacuum oven at 100° C. for 24 hr. This process was similar to Examples 5b-5c, thus a soft brick was formed. This solid was then broken up using the grinder described above. The initial setting started at 20 clicks beyond burr contact, and the resulting powder was sieved using a stack of three screens, 50 mesh, 100 mesh, and 325 mesh. That portion that remained on the 50 mesh screen was ground again at a tighter burr setting, followed by screening again. Thus, the process continued through multiple cycles, each time with a tighter burr setting. Sequential burr settings used during these cycles were 20, 10, 5, 4, 3, 2 and 1 click. Three fractions were obtained as follows: 28 wt. % at <45 μm (7b-1), 54 wt. % at 45-150 μm (7b-2), and 17 wt. % at >150 μm (7b-3). Particle size distribution information on the 7b-1, 7b-2, and 7b-3 fractions is provided in Table 7.

In Example 7c, 40 g of AS-7 was dry mixed with 2 g of chromium (III) acetate. Then, 62 mL of water was added (RFV of 89%) and the mixture was stirred or worked as described above in Examples 5b-5c. This powder was dried in a vacuum oven for 24 hr at 100° C. After drying, the material was subjected to the same grinding/sieving treatment as described in Example 7b, using only a 50-mesh screen this time. The burr settings used in the grinding/sieving cycles were 20, 10, 5, 4, 3 and 2 clicks sequentially. Particle size distribution information for the material passing through a 50 mesh screen (Example 7c) is provided in Table 7.

Further Information Relating to Examples 1-7

As summarized above, a first (modified) catalyst component (composition) can have or can be characterized by (a) a d50 average particle size in a range from 60 to 140 μm, (b) a particle size span ((d90−d10)/d50) in a range from 0.6 to 1.8, and (c) a bulk density in a range from 0.22 to 0.42 g/mL, and wherein less than or equal to 10 wt. % of the catalyst component has a particle size of less than or equal to 10 μm. Table 8 summarizes four representative examples (1d-2, 5p-2, 5z-2, and 3m) that illustrate the first catalyst component, and FIGS. 1-4 are plots of the particle size distributions of Examples 1d-2, 5p-2, 5z-2, and 3m, respectively.

Likewise, a second (modified) catalyst component (composition) can have or can be characterized by (A) a d50 average particle size in a range from 30 to 70 μm, (B) a particle size span ((d90−d10)/d50) in a range from 0.6 to 1.8, and (C) a bulk density in a range from 0.22 to 0.42 g/mL, and wherein less than or equal to 10 wt. % of the catalyst component has a particle size of greater than or equal to 100 μm. Table 9 summarizes five representative examples (1b-1, 1b-3, 3b-2, 4e-1, and 5z-6) that illustrate the second catalyst component, and FIGS. 5-8 are plots of the particle size distributions of Examples 1b-1, 1b-3, 3b-2, and 4e-1, respectively.

In many cases, the original A-S particles can have an irregular or odd shape, which leads to poor packing and thus a low bulk density. For example, some particles can have the shape of platelets, whiskers, or worms, etc., which can make it difficult to pack into a uniform or reasonably dense powder that flows easily. However, when subjected to the first and second methods described herein, these low bulk density particles, when worked or kneaded into a paste or semi-wet state or into agglomerated particles, can significantly change, typically becoming more round or regular as whiskers and other protrusions become broken off and then agglomerated into new larger particles.

One beneficial result is that the modified catalyst system component particles often have higher bulk densities than the original catalyst system component. Table C summarizes the bulk densities and the compaction ratios (the bulk density of the modified catalyst system component divided by the bulk density of the (original or initial) catalyst system component) of many of the examples discussed above, obtained after agglomeration and drying. The compaction ratio increases with increasing degrees of compaction or higher degrees of densification. In many cases, the bulk density increase and the compaction ratio was quite significant, which can lead to more efficient particle/powder flowing, transfer, storage, and even more consistent polymerization performance. In Table C, the bulk densities of the modified catalyst system components were generally in the 0.2-0.4 range, with compaction ratios generally ranging from 1.1 to 4.

In addition to particle size distribution data, the Microtrac S3500 laser particle size analyzer also has a camera that can take pictures of thousands of catalyst particles as they pass through the instrument. This allows an analysis of the shape of the particles, in addition to their size (and distribution of size). Table D summarizes three of these features for many of the examples discussed above. In Table D, the sphericity of the particles generally ranged from 0.91 to 0.93, the compactness of the particles generally ranged from 0.79 to 0.83, and the aspect ratio (W/L) of the particles generally ranged from 0.67 to 0.75.

Polymerization Experiments and Ethylene Polymers

Polymerization experiments were performed as follows. Ethylene was polymerization grade ethylene obtained from Union Carbide Corporation. This ethylene was then further purified through a column of ¼-inch beads of Alcoa A201 alumina activated at about 250° C. in nitrogen. Isobutane was polymerization grade obtained from Phillips Petroleum Company, which was further purified by distillation and then also passed through a column of ¼-inch beads of Alcoa A201 alumina activated at about 250° C. in nitrogen. The 1-hexene was polymerization grade obtained from Chevron Chemical Company, which was further purified by nitrogen purging and storage over 13× molecular sieve activated at about 250° C. Triisobutylaluminum (TIBA) was obtained from Akzo Corporation as a 1M solution in heptane.

Table E summarizes polymerization experiments that were performed using a metallocene-based catalyst system. The polymerization experiments were conducted for 20-60 min in a 2.2 L stainless-steel autoclave reactor containing isobutane as diluent. First, approximately 0.05-0.15 g of the catalyst system component (e.g., an activator-support) was added to the reactor, followed by 0.4-0.5 mL of 1M TIBA in heptane, then 2-3 mg of a metallocene compound (methyl (buten-3-yl) methylidene ($\eta^5$-cyclopentadien-1-ylidene) ($\eta^5$-2,7-di-tert-butylfluoren-9-ylidene) zirconium dichloride) via a 1 mg/mL toluene solution of the metallocene compound, followed by isobutane. At the desired polymerization temperature of 90° C., ethylene was charged to the reactor and fed on demand to maintain the target pressure of 400 psig (no hydrogen or comonomer was used). The reactor was maintained at the target temperature throughout the experiment by an automated heating-cooling system. After venting of the reactor, purging, and cooling, the resulting polymer product was dried under reduced pressure.

Table E lists the polymer example number and the respective catalyst example used (from Examples 2-5, above), calcination temperature of the A-S, amount of catalyst charged to the reactor, amount of polymer made and reaction time, and the productivity or yield of polymer (g/g) and catalyst activity (g/g/hr, weight of polymer produced divided by the weight of solid catalyst divided by the reaction time).

For some of these polymer examples, information on the respective particle size distributions are provided in Table F. An ethylene polymer (fluff or powder) composition described herein can have (or can be characterized by) a d50 average particle size in a range from 700 to 1800 μm and a particle size span ((d90−d10)/d50) in a range from 0.4 to 2.4, and wherein less than or equal to 7 wt. % of the composition has a particle size of less than or equal to 250 μm, and less than or equal to 18 wt. % of the composition has a particle size of greater than or equal to 2500 μm. Table F also summarizes eight representative polymer examples (2d-1, 2b, 3a, 3b2, 5b, 5c, 5d, and 4b) that illustrate this disclosed ethylene polymer composition. Particularly noteworthy are polymer examples 5b, 5c, 5d, and 4b, with span values in the 0.4-0.7 range.

Figure 9:
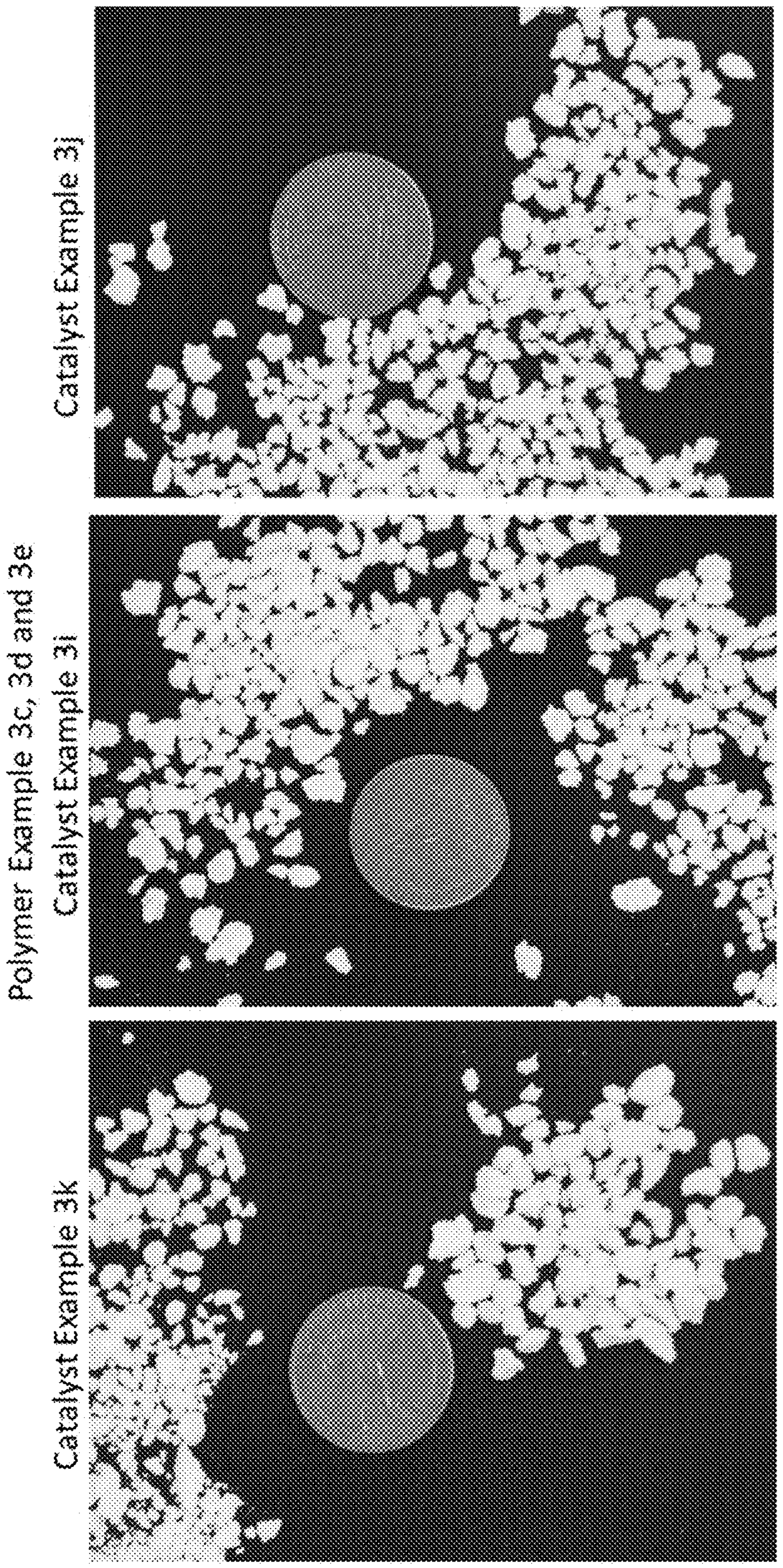
FIGS. 9-13 are photographs of the polymers of Examples 3c and 3d and 3e, Example 4b, Example 5a, Example 5d, and Examples 5e and 5f, respectively.
Figure 10:
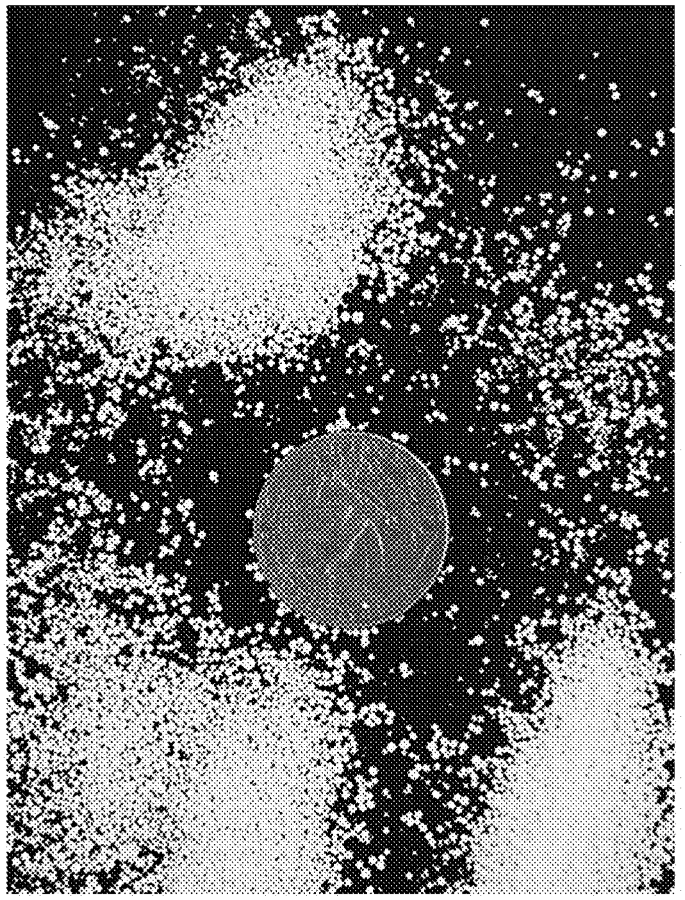
Figure 11:
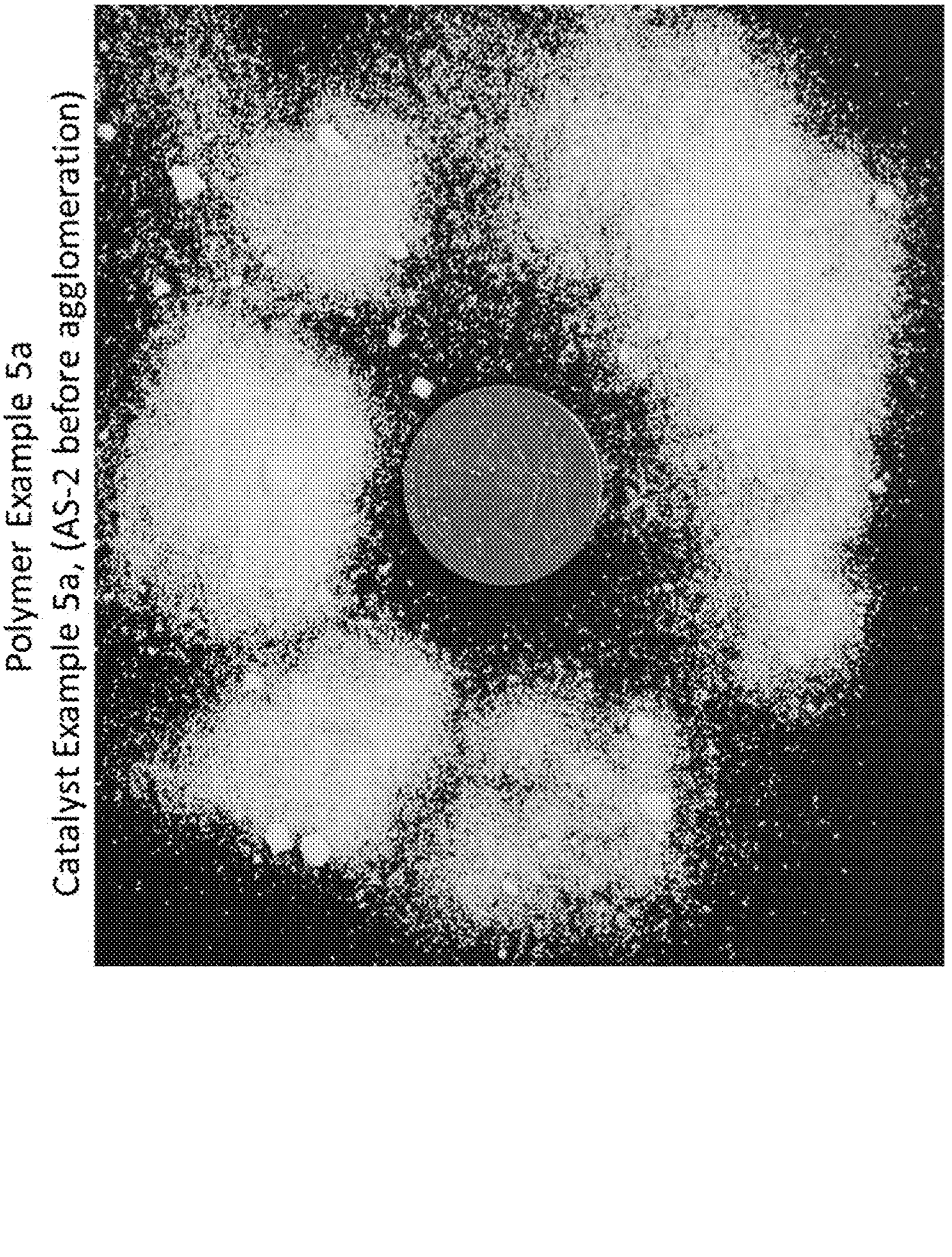
Figure 12:
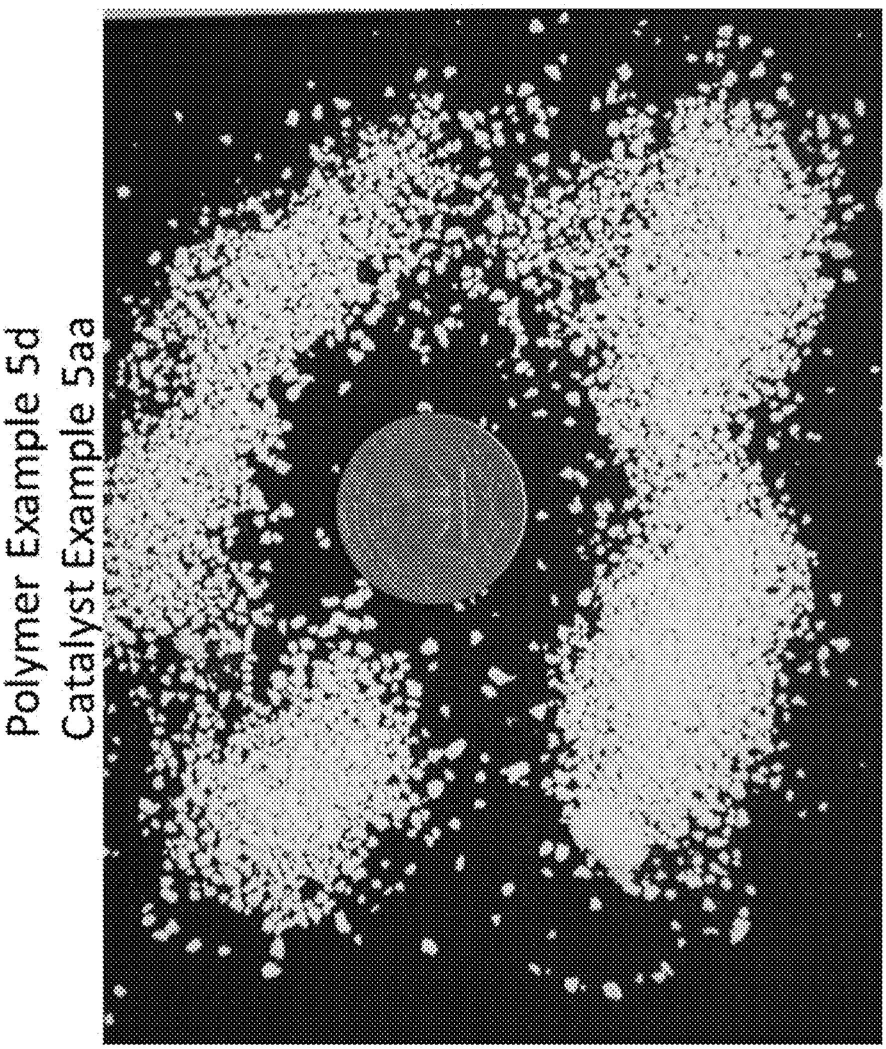
Figure 13:
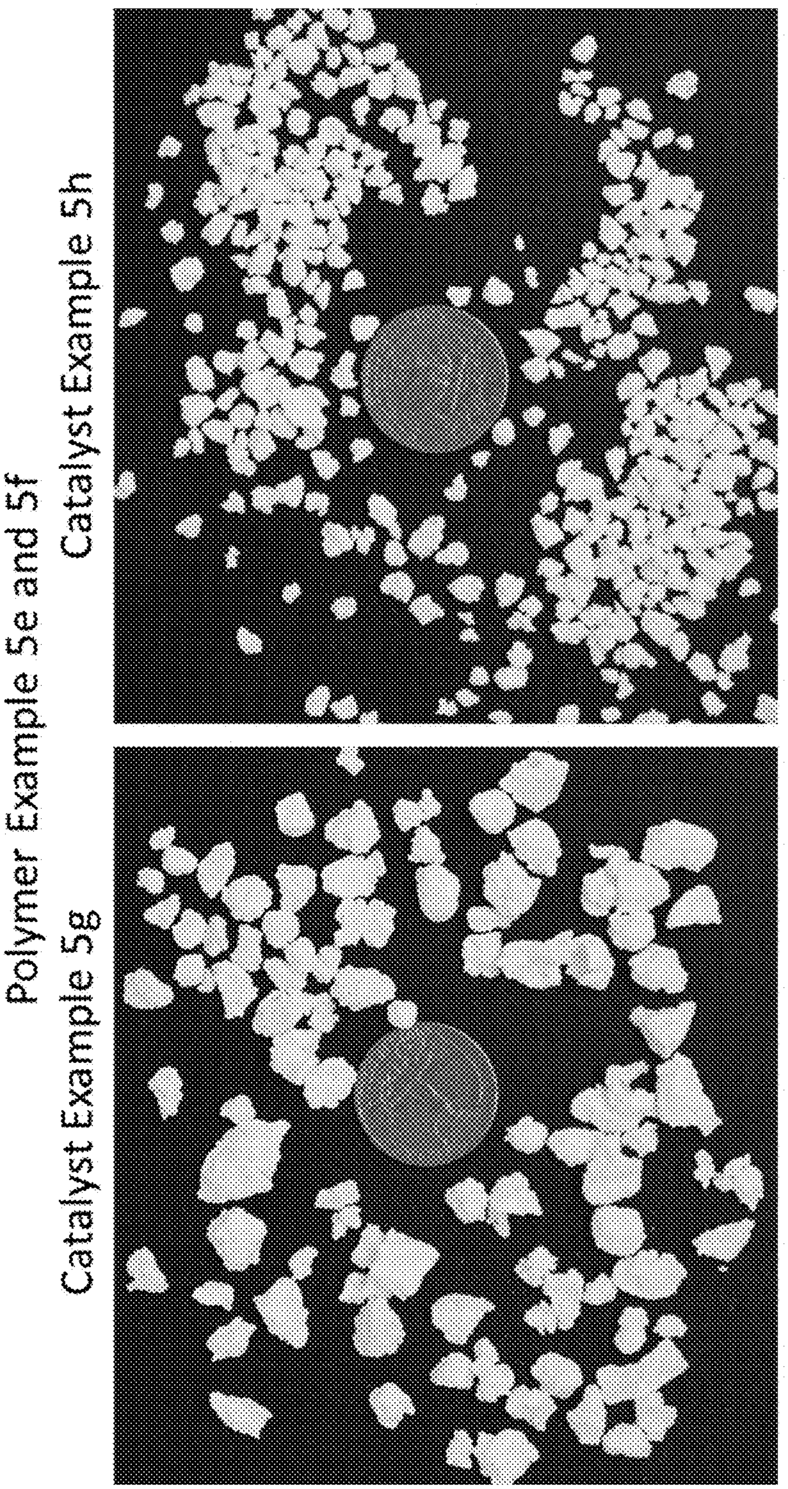

FIGS. 9-13 are photographs of the polymers of Examples 3c and 3d and 3e, Example 4b, Example 5a, Example 5d, and Examples 5e and 5f, respectively. A quarter is included in each photograph for a visual reference of the relative size of each polymer product. Polymer Examples 3c and 3d and 3e in FIG. 9 show representative polymer produced as large irregular granules, whereas Polymer Example 4b in FIG. 10 is a representative polymer produced as extremely uniform spheres. Polymer Example 5a in FIG. 11 is a representative polymer produced with catalyst prior to agglomeration; note the large amount of small polymer fines and varying size distribution. After agglomeration, Polymer Example 5d in FIG. 12 illustrates polymer produced as extremely uniform spheres, while Polymer Examples 5e and 5f in FIG. 13 illustrate polymer produced as large irregular granules.

When a chromium catalyst was used (catalyst example 7c), 1 wt. % Cr was added as chromium (III) acetate. This was accomplished by addition to the mixture of the water and the catalyst system component during the step to form the paste or agglomerated particles. The catalyst was then calcined at 800° C. for 3 hr. Then, 0.0858 g of the calcined (activated) catalyst was added to the reactor, followed by 1.2 L of isobutane liquid. The temperature was then raised to 105° C. and ethylene was supplied on demand to 550 psig. A metal alkyl cocatalyst was not used. Polymerization started quickly, with no induction time which is unusual for chromium catalysts, and after only 38 min, the reactor was full and thus polymerization was stopped. The resulting clean dry polymer powder, 240 g, was recovered, and found to have a HLMI of 2.83 g/10 min and an $I_{10}$ of 0.13 g/10 min.

TABLE 1

Summary of Example 1.

| Example | Mv (μm) | Mn (μm) | Mv/Mn | d10 (μm) | d50 (μm) | d90 (μm) | Span | <10 μm (wt. %) | >100 μm (wt. %) |
|---|---|---|---|---|---|---|---|---|---|
| 1a | 84.1 | 5.65 | 14.9 | 13.17 | 79.6 | 159.8 | 1.84 | 6.85 | 33.14 |
| 1b | 39.2 | 4.66 | 8.4 | 11.32 | 35.0 | 66.9 | 1.59 | 13.53 | 3.19 |
| 1b-1 | 52.0 | 4.67 | 11.1 | 15.30 | 47.6 | 85.3 | 1.47 | 6.53 | 5.46 |
| 1b-2 | 24.0 | 4.65 | 5.2 | 6.63 | 20.1 | 45.3 | 1.92 | 21.79 | 0.52 |
| 1b-3 | 40.3 | 5.41 | 7.4 | 13.17 | 40.8 | 62.1 | 1.20 | 7.99 | 0.24 |
| 1c | 27.4 | 5.93 | 4.6 | 7.22 | 22.3 | 55.5 | 2.16 | 22.14 | 2.50 |
| 1c-1 | 62.6 | 5.93 | 10.6 | 12.04 | 48.0 | 141.8 | 2.70 | 8.29 | 16.66 |
| 1c-2 | 21.1 | 5.93 | 3.6 | 6.37 | 17.8 | 40.2 | 1.90 | 24.59 | 0.00 |
| 1d-1 | 46.1 | 1.89 | 24.4 | 6.84 | 31.0 | 87.8 | 2.61 | 15.18 | 70.94 |
| 1d-2 | 115.2 | 25.32 | 4.5 | 64.20 | 115.1 | 165.8 | 0.88 | 0.04 | 61.55 |

TABLE 2

Summary of Example 2.

| Example | Mv (μm) | Mn (μm) | Mv/Mn | d10 (μm) | d50 (μm) | d90 (μm) | Span | <10 μm (wt. %) | >100 μm (wt. %) |
|---|---|---|---|---|---|---|---|---|---|
| 2a | 58.6 | 2.30 | 25.5 | 7.28 | 37.7 | 132.3 | 3.32 | 14.51 | 15.30 |
| 2b | 68.4 | 10.50 | 6.5 | 18.98 | 52.8 | 134.1 | 2.18 | 8.57 | 21.13 |
| 2b-1 | 93.7 | 14.55 | 6.4 | 27.63 | 73.8 | 178.0 | 2.04 | 1.21 | 33.71 |
| 2b-2 | 32.1 | 4.70 | 6.5 | 6.58 | 22.7 | 71.2 | 2.84 | 19.12 | 3.10 |

TABLE 2-continued

Summary of Example 2.

| Example | Mv (μm) | Mn (μm) | Mv/Mn | d10 (μm) | d50 (μm) | d90 (μm) | Span | <10 μm (wt. %) | >100 μm (wt. %) |
|---|---|---|---|---|---|---|---|---|---|
| 2c | 36.0 | 8.04 | 4.5 | 11.12 | 26.0 | 83.5 | 2.79 | 15.63 | 5.29 |
| 2c-1 | 79.6 | 18.22 | 4.4 | 24.96 | 42.3 | 222.7 | 4.68 | 1.12 | 21.14 |
| 2c-2 | 21.5 | 4.64 | 4.6 | 6.51 | 20.6 | 37.1 | 1.49 | 20.47 | 0.00 |

TABLE 3

Summary of Example 3.

| Example | Mv (μm) | Mn (μm) | Mv/Mn | d10 (μm) | d50 (μm) | d90 (μm) | Span | <10 μm (wt. %) | >100 μm (wt. %) |
|---|---|---|---|---|---|---|---|---|---|
| 3a | 58.6 | 2.30 | 25.5 | 7.28 | 37.7 | 132.3 | 3.32 | 14.51 | 15.30 |
| 3b-1 | 68.4 | 3.80 | 18.0 | 11.32 | 57.2 | 137.9 | 2.21 | 8.72 | 20.07 |
| 3b-2 | 56.7 | 4.26 | 13.3 | 23.38 | 55.6 | 88.2 | 1.17 | 5.02 | 5.39 |
| 3c | 261.7 | 29.05 | 9.0 | 58.04 | 221.6 | 512.2 | 2.05 | 0.00 | 76.99 |
| 3d-1 | 106.5 | 7.38 | 14.4 | 30.47 | 112.0 | 174.7 | 1.29 | 2.87 | 53.49 |
| 3d-2 | 82.4 | 6.59 | 12.5 | 42.65 | 72.1 | 142.3 | 1.38 | 3.04 | 26.88 |
| 3e | 98.3 | 4.41 | 22.3 | 16.26 | 82.5 | 197.8 | 2.20 | 5.85 | 41.81 |
| 3f | 116.1 | 5.82 | 19.9 | 23.45 | 103.8 | 225.1 | 1.94 | 3.62 | 49.69 |
| 3g | 143.7 | 5.10 | 28.2 | 19.95 | 133.8 | 283.4 | 1.97 | 4.72 | 56.75 |
| 3h | 171.7 | 5.02 | 34.2 | 21.95 | 179.9 | 310.1 | 1.60 | 4.51 | 67.35 |
| 3i | 183.5 | 11.40 | 16.1 | 40.44 | 188.7 | 322.4 | 1.49 | 1.22 | 69.42 |
| 3j | 247.7 | 17.63 | 14.0 | 59.44 | 242.0 | 432.0 | 1.54 | 0.21 | 80.98 |
| 3k | 145.4 | 5.86 | 24.8 | 20.21 | 139.8 | 281.8 | 1.87 | 4.05 | 58.85 |
| 3L | 74.1 | 3.13 | 23.7 | 9.66 | 64.3 | 150.6 | 2.19 | 10.45 | 27.82 |
| 3m | 119.4 | 6.15 | 19.4 | 35.72 | 121.6 | 188.9 | 1.26 | 2.99 | 62.92 |

TABLE 4

Summary of Example 4.

| Example | Mv (μm) | Mn (μm) | Mv/Mn | d10 (μm) | d50 (μm) | d90 (μm) | Span | <10 μm (wt. %) | >100 μm (wt. %) |
|---|---|---|---|---|---|---|---|---|---|
| 4a | 9.2 | 2.66 | 3.4 | 3.10 | 7.9 | 16.4 | 1.69 | 65.64 | 0.00 |
| 4b | 62.8 | 2.67 | 23.5 | 8.74 | 33.8 | 160.6 | 4.49 | 11.45 | 14.74 |
| 4c | 60.6 | 2.65 | 22.9 | 3.86 | 12.4 | 213.9 | 16.88 | 41.08 | 17.88 |
| 4d | 33.6 | 2.72 | 12.3 | 3.95 | 12.1 | 89.7 | 7.08 | 41.30 | 8.64 |
| 4e-1 | 41.4 | 4.73 | 8.7 | 22.09 | 39.3 | 61.7 | 1.01 | 3.11 | 1.20 |
| 4e-2 | 257.8 | 2.93 | 88.1 | 5.41 | 158.1 | 707.7 | 4.44 | 22.18 | 53.58 |

TABLE 5

Summary of Example 5.

| Example | Mv (μm) | Mn (μm) | Mv/Mn | d10 (μm) | d50 (μm) | d90 (μm) | Span | <10 μm (wt. %) | >100 μm (wt. %) |
|---|---|---|---|---|---|---|---|---|---|
| 5a | 7.7 | 2.98 | 2.6 | 3.26 | 6.9 | 12.5 | 1.33 | 80.10 | 0.00 |
| 5b | 76.9 | 3.06 | 25.1 | 4.10 | 10.6 | 315.0 | 29.47 | 47.75 | 19.42 |
| 5c | 376.4 | 4.69 | 80.3 | 21.44 | 393.5 | 657.4 | 1.62 | 6.60 | 83.95 |
| 5d | 82.5 | 3.02 | 27.3 | 5.29 | 20.1 | 298.2 | 14.58 | 25.23 | 19.02 |
| 5e-1 | 96.9 | 3.09 | 31.4 | 6.83 | 32.0 | 333.8 | 10.21 | 14.82 | 22.75 |
| 5e-2 | 113.2 | 2.94 | 38.5 | 5.45 | 30.1 | 365.2 | 11.95 | 30.29 | 21.47 |
| 5f | 269.7 | 10.04 | 26.9 | 98.39 | 228.8 | 533.2 | 1.90 | 0.71 | 88.54 |
| 5g | 314.4 | 4.46 | 70.5 | 19.42 | 327.5 | 574.8 | 1.70 | 6.73 | 81.30 |
| 5h | 170.3 | 4.03 | 42.3 | 9.82 | 179.2 | 307.1 | 1.66 | 10.26 | 69.56 |
| 5i | 35.7 | 3.30 | 10.8 | 4.46 | 11.8 | 58.6 | 4.59 | 41.79 | 7.78 |
| 5j | 52.6 | 3.23 | 16.3 | 4.56 | 12.7 | 165.0 | 12.60 | 38.77 | 11.77 |
| 5k | 13.0 | 3.46 | 3.8 | 4.40 | 10.7 | 23.2 | 1.76 | 46.45 | 0.00 |
| 5L | 32.7 | 3.29 | 9.9 | 4.23 | 10.4 | 43.9 | 3.80 | 47.99 | 6.65 |
| 5m | 123.7 | 4.35 | 28.4 | 26.62 | 68.6 | 316.0 | 4.22 | 5.48 | 31.80 |

TABLE 5-continued

Summary of Example 5.

| Example | Mv (μm) | Mn (μm) | Mv/Mn | d10 (μm) | d50 (μm) | d90 (μm) | Span | <10 μm (wt. %) | >100 μm (wt. %) |
|---|---|---|---|---|---|---|---|---|---|
| 5n | 145.8 | 5.68 | 25.7 | 35.19 | 89.1 | 345.0 | 3.48 | 3.33 | 44.29 |
| 5p-1 | 127.7 | 5.51 | 23.2 | 34.13 | 91.5 | 265.8 | 2.53 | 3.80 | 45.83 |
| 5p-2 | 92.2 | 5.63 | 16.4 | 39.21 | 82.7 | 157.9 | 1.44 | 3.03 | 32.45 |
| 5q | 136.0 | 3.88 | 35.1 | 13.60 | 83.0 | 325.8 | 3.76 | 7.55 | 45.17 |
| 5r | 198.6 | 3.63 | 54.7 | 10.77 | 127.0 | 520.0 | 4.01 | 9.43 | 54.21 |
| 5s | 125.7 | 3.72 | 33.8 | 9.52 | 101.1 | 270.7 | 2.58 | 10.57 | 49.25 |
| 5t | 284.4 | 4.10 | 69.4 | 12.40 | 249.1 | 594.1 | 2.34 | 8.53 | 75.79 |
| 5u-1 | 429.0 | 5.91 | 72.6 | 312.30 | 424.2 | 584.5 | 0.64 | 2.31 | 97.05 |
| 5u-2 | 195.9 | 4.14 | 47.3 | 11.59 | 204.2 | 336.2 | 1.59 | 8.96 | 76.33 |
| 5u-3 | 33.8 | 3.13 | 10.8 | 4.76 | 22.4 | 74.8 | 3.13 | 32.57 | 3.41 |
| 5w-1 | 230.3 | 3.76 | 61.3 | 10.15 | 201.5 | 493.6 | 2.40 | 9.94 | 71.62 |
| 5w-2 | 401.8 | 5.24 | 76.7 | 284.70 | 401.8 | 564.9 | 0.70 | 3.89 | 94.56 |
| 5w-3 | 187.8 | 4.13 | 45.5 | 12.16 | 200.4 | 321.2 | 1.54 | 8.70 | 74.76 |
| 5w-4 | 22.9 | 3.18 | 7.2 | 4.05 | 10.9 | 57.7 | 4.93 | 46.95 | 1.99 |
| 5x-1 | 170.6 | 3.68 | 46.4 | 12.38 | 180.3 | 272.7 | 1.44 | 8.78 | 80.10 |
| 5x-2 | 12.2 | 2.88 | 4.2 | 3.45 | 8.0 | 26.1 | 2.84 | 62.99 | 0.00 |
| 5x-3 | 77.3 | 2.93 | 26.4 | 5.27 | 77.5 | 159.0 | 1.98 | 23.22 | 34.83 |
| 5z-1 | 239.4 | 190.10 | 1.3 | 164.60 | 233.4 | 321.9 | 0.67 | 0.00 | 99.48 |
| 5z-2 | 111.5 | 3.53 | 31.6 | 13.02 | 115.8 | 185.3 | 1.49 | 8.39 | 58.31 |
| 5z-3 | 56.3 | 3.16 | 17.8 | 7.03 | 56.6 | 96.8 | 1.59 | 14.33 | 7.51 |
| 5z-4 | 21.5 | 2.67 | 8.1 | 4.00 | 14.9 | 46.0 | 2.82 | 38.19 | 0.76 |
| 5z-5 | 108.8 | 3.51 | 31.0 | 12.47 | 112.4 | 184.0 | 1.53 | 8.65 | 55.55 |
| 5z-6 | 58.3 | 4.21 | 13.8 | 14.08 | 60.5 | 81.1 | 1.11 | 0.45 | 5.51 |
| 5aa | 89.3 | 3.23 | 27.7 | 6.63 | 93.4 | 163.7 | 1.68 | 15.64 | 42.14 |

TABLE 6

Summary of Example 6.

| Example | Mv (μm) | Mn (μm) | Mv/Mn | d10 (μm) | d50 (μm) | d90 (μm) | Span | <10 μm (wt. %) | >100 μm (wt. %) |
|---|---|---|---|---|---|---|---|---|---|
| 6a | 24.4 | 5.89 | 4.1 | 5.58 | 16.3 | 53.1 | 2.91 | 30.58 | 1.93 |
| 6b | 197.6 | 7.40 | 26.7 | 34.45 | 205.7 | 343.7 | 1.50 | 2.50 | 72.63 |
| 6c | 67.7 | 4.11 | 16.5 | 7.80 | 53.8 | 146.5 | 2.58 | 14.48 | 24.40 |

TABLE 7

Summary of Example 7.

| Example | Mv (μm) | Mn (μm) | Mv/Mn | d10 (μm) | d50 (μm) | d90 (μm) | Span | <10 μm (wt. %) | >100 μm (wt. %) |
|---|---|---|---|---|---|---|---|---|---|
| 7a | 19.5 | 4.88 | 4.0 | 5.31 | 17.5 | 36.3 | 1.76 | 29.86 | 0.00 |
| 7b1 | 14.5 | 4.29 | 3.4 | 4.44 | 11.7 | 28.1 | 2.02 | 43.95 | 0.00 |
| 7b2 | 49.2 | 4.01 | 12.3 | 5.22 | 28.8 | 124.5 | 4.14 | 24.10 | 16.01 |
| 7b3 | 179.6 | 5.78 | 31.1 | 25.50 | 201.5 | 257.2 | 1.15 | 4.50 | 83.01 |
| 7c | 229.2 | 6.62 | 34.6 | 34.52 | 224.7 | 401.5 | 1.63 | 3.38 | 81.51 |
| 7d | 22.4 | 5.22 | 4.3 | 6.59 | 20.9 | 39.0 | 1.55 | 18.65 | 0.00 |

TABLE 8

Examples of first modified catalyst system component.

| Example | d10 (μm) | d50 (μm) | d90 (μm) | d90/d50 | Span | <10 μm (wt. %) | >200 μm (wt. %) |
|---|---|---|---|---|---|---|---|
| 1d-2 | 64.2 | 115.1 | 165.8 | 1.44 | 0.88 | 0.04 | 1.8 |
| 5p-2 | 39.2 | 82.7 | 157.9 | 1.91 | 1.44 | 3.03 | 3.4 |
| 5z-2 | 13.0 | 115.8 | 185.3 | 1.60 | 1.49 | 8.39 | 5.0 |
| 3m | 35.7 | 121.6 | 188.9 | 1.55 | 1.26 | 2.99 | 5.4 |

TABLE 9

Examples of second modified catalyst system component.

| Example | d10 (μm) | d50 (μm) | d90 (μm) | d90/d50 | Span | <10 μm (wt. %) | >100 μm (wt. %) |
|---|---|---|---|---|---|---|---|
| 1b-1 | 15.3 | 47.6 | 85.3 | 1.79 | 1.47 | 6.53 | 5.46 |
| 1b-3 | 13.2 | 40.8 | 62.1 | 1.52 | 1.20 | 7.99 | 0.24 |
| 3b-2 | 23.4 | 55.6 | 88.2 | 1.59 | 1.17 | 5.02 | 5.39 |
| 4e-1 | 22.1 | 39.3 | 61.7 | 1.57 | 1.01 | 3.11 | 1.20 |
| 5z-6 | 14.1 | 60.5 | 81.1 | 1.34 | 1.11 | 0.45 | 5.51 |

TABLE A

| Void Volumes. | |
|---|---|
| Catalyst System Component | Void Volume (mL/g) |
| AS-1 | 1.25 |
| AS-2 | 1.35 |
| AS-3 | 0.95 |
| AS-4 | 2.75 |
| AS-5 | 1.70 |
| AS-6 | 0.63 |
| AS-7 | 1.75 |

TABLE C-continued

| Summary of bulk density and compaction data. | | |
|---|---|---|
| Example | Bulk Density (g/mL) | Compaction Ratio |
| 6a | 0.09 | — |
| 6b | 0.35 | 3.89 |
| 6c | 0.22 | 2.44 |

TABLE B

| Cumulative amount thru a particle mesh size after each cycle | | | | | | | |
|---|---|---|---|---|---|---|---|
| Cycle Number | Ex 5c 20 mesh (wt. %) | Ex 5g 30 mesh (wt. %) | Ex 5h 50 mesh (wt. %) | Ex 5n 30 mesh (wt. %) | Ex 5p-1 50 mesh (wt. %) | Ex 5r 30 mesh (wt. %) | Ex 5s 50 mesh (wt. %) |
| 1 | 0 | 0 | 0 | 0 | 0 | 0 | 0 |
| 2 | 25 | 33 | 41 | 76 | 56 | 47 | 58 |
| 3 | 39 | 58 | 61 | 87 | 72 | 66 | 69 |
| 4 | 50 | 65 | 73 | 88 | 75 | 71 | 71 |
| 5 | 55 | 78 | 88 | 90 | 81 | 72 | 80 |
| 6 | 62 | 89 | 93 | 92 | 85 | 77 | 85 |
| 7 | 71 | 92 | 97 | 93 | 90 | 79 | 91 |
| 8 | 76 | 96 | 100 | 94 | 93 | 81 | 95 |
| 9 | 85 | 100 | | 96 | 100 | 83 | 100 |
| 10 | 92 | 100 | | 97 | | 85 | |
| 11 | 99 | | | 99 | | 88 | |
| 12 | 100 | | | 99 | | 90 | |
| 13 | | | | 100 | | 93 | |
| 14 | | | | | | 95 | |
| 15 | | | | | | 97 | |
| 16 | | | | | | 98 | |
| 17 | | | | | | 100 | |

TABLE C

| Summary of bulk density and compaction data. | | |
|---|---|---|
| Example | Bulk Density (g/mL) | Compaction Ratio |
| 4a | 0.18 | — |
| 4b | 0.23 | 1.28 |
| 4c | 0.24 | 1.33 |
| 4d | 0.19 | 1.06 |
| 4e-1 | 0.29 | 1.59 |
| 5a | 0.20 | — |
| 5b | 0.25 | 1.25 |
| 5c | 0.35 | 1.75 |
| 5d | 0.31 | 1.55 |
| 5e | 0.30 | 1.50 |
| 5f | 0.34 | 1.70 |
| 5i | 0.23 | 1.15 |
| 5j | 0.24 | 1.20 |
| 5k | 0.19 | 0.95 |
| 5L | 0.18 | 0.90 |
| 5m-2 | 0.26 | 1.30 |
| 5p | 0.27 | 1.35 |
| 5s | 0.32 | 1.60 |
| 5u-2 | 0.33 | 1.65 |
| 5x-1 | 0.38 | 1.90 |
| 5x-2 | 0.21 | 1.05 |
| 5x-3 | 0.31 | 1.55 |
| 5y | 0.40 | 2.00 |
| 5z-1 | 0.34 | 1.70 |
| 5z-5 | 0.23 | 1.15 |
| 5z-4 | 0.31 | 1.55 |
| 5m-2 | 0.24 | 1.18 |
| 5aa | 0.31 | 1.55 |

TABLE D

| Summary of shape features. | | | |
|---|---|---|---|
| Example | Sphericity | Compactness | W/L Aspect Ratio |
| 4a | 0.93 | 0.82 | 0.73 |
| 4e-2 | 0.93 | 0.82 | 0.74 |
| 4e | 0.93 | 0.82 | 0.73 |
| 4b | 0.93 | 0.82 | 0.73 |
| 4c | 0.93 | 0.82 | 0.73 |
| 4d | 0.92 | 0.82 | 0.73 |
| 6a | 0.91 | 0.79 | 0.67 |
| 6b | 0.92 | 0.79 | 0.68 |
| 6c | 0.91 | 0.79 | 0.68 |
| 5a | 0.93 | 0.82 | 0.74 |
| 5b | 0.93 | 0.82 | 0.74 |
| 5c | 0.92 | 0.82 | 0.74 |
| 5d | 0.93 | 0.82 | 0.73 |
| 5e-2 | 0.92 | 0.82 | 0.74 |
| 5h | 0.93 | 0.83 | 0.74 |
| 5i | 0.93 | 0.82 | 0.73 |
| 5j | 0.93 | 0.82 | 0.73 |
| 5k | 0.93 | 0.82 | 0.73 |
| 5L | 0.92 | 0.82 | 0.73 |
| 5n | 0.92 | 0.83 | 0.75 |
| 5p-1 | 0.92 | 0.83 | 0.75 |
| 5p-2 | 0.92 | 0.83 | 0.75 |
| 5p-2 | 0.93 | 0.83 | 0.74 |
| 5p-2 | 0.92 | 0.83 | 0.75 |
| 5r | 0.92 | 0.82 | 0.74 |
| 5s | 0.92 | 0.82 | 0.74 |
| 5u | 0.92 | 0.82 | 0.73 |

TABLE E

| Polymerization Experiments. | | | | | |
|---|---|---|---|---|---|
| Polymer Example | Catalyst Used | Initial A-S | Calcining Temperature (° C.) | Weight (g) | Type |
| 2a | 2a | AS-3 | 280 | 0.087 | Comp |
| 2b | 2c-1 | AS-3 | 350 | 0.021 | Inv |
| 2c | 2c-2 | AS-3 | 350 | 0.028 | Inv |
| 2d-1 | 2b-1 | AS-3 | 350 | 0.050 | Inv |
| 2d-2 | 2b-2 | AS-3 | 350 | 0.080 | Inv |
| 3a | 3e | AS-3 | 350 | 0.076 | Inv |
| 3b | 3f | AS-3 | 350 | 0.045 | Inv |
| 3c | 3k | AS-3 | 350 | 0.045 | Inv |
| 3d | 3i | AS-3 | 350 | 0.041 | Inv |
| 3e | 3j | AS-3 | 350 | 0.056 | Inv |
| 4a | 4a | AS-1 | 600 | 0.043 | Comp |
| 4b | 4e-1&2 | AS-1 | 600 | 0.020 | Inv |
| 4c | 4c | AS-1 | 600 | 0.005 | Inv |
| 5a | 5a | AS-2 | 600 | 0.027 | Comp |
| 5b | 5z-1 | AS-2 | 600 | 0.089 | Inv |
| 5c | 5m-2 | AS-2 | 600 | 0.058 | Inv |
| 5d | 5aa | AS-2 | 600 | 0.097 | Inv |
| 5e | 5g | AS-2 | 600 | 0.062 | Inv |
| 5f | 5h | AS-2 | 600 | 0.078 | Inv |

| Polymer Example | Catalyst Used | Polymer Made (g) | Time (min) | Yield (g/g) | Activity (g/g/hr) |
|---|---|---|---|---|---|
| 2a | 2a | 189 | 42 | 2170 | 3100 |
| 2b | 2c-1 | 109 | 60 | 5317 | 5317 |
| 2c | 2c-2 | 160 | 45 | 5735 | 7646 |
| 2d-1 | 2b-1 | 132 | 49 | 2645 | 3239 |
| 2d-2 | 2b-2 | 81 | 34 | 1016 | 1793 |
| 3a | 3e | 181 | 35 | 2388 | 4093 |
| 3b | 3f | 118 | 31 | 2628 | 5087 |
| 3c | 3k | 159 | 44 | 3533 | 6424 |
| 3d | 3i | 90 | 59 | 2174 | 4422 |
| 3e | 3j | 37 | 60 | 660 | 2638 |
| 4a | 4a | 220 | 30 | 5093 | 10185 |
| 4b | 4e-1&2 | 90 | 61 | 4455 | 4382 |
| 4c | 4c | 27 | 41 | 5870 | 8590 |
| 5a | 5a | 91 | 30 | 3321 | 6642 |
| 5b | 5z-1 | 178 | 26 | 2011 | 4641 |
| 5c | 5m-2 | 179 | 20 | 3086 | 9259 |
| 5d | 5aa | 217 | 23 | 2239 | 5842 |
| 5e | 5g | 145 | 38 | 2358 | 3723 |
| 5f | 5h | 222 | 37 | 2843 | 4609 |

TABLE F

| Polymer particle size characterization. | | | | | |
|---|---|---|---|---|---|
| Polymer Example | d10 (µm) | d50 (µm) | d90 (µm) | Span | d90/d10 |
| 2d-1 | 739 | 1333 | 3367 | 1.97 | 4.56 |
| 2d-2 | 250 | 687 | 3984 | 5.44 | 15.94 |
| 2b | 546 | 862 | 2473 | 2.24 | 4.53 |
| 2c | 189 | 407 | 635 | 1.10 | 3.36 |
| 3a | 301 | 726 | 1909 | 2.21 | 6.34 |
| 3b1 | 1040 | 1948 | 3435 | 1.23 | 3.30 |
| 3b2 | 454 | 982 | 2123 | 1.70 | 4.68 |
| 3d | 3160 | 4236 | 5242 | 0.49 | 1.66 |
| 3e | 2791 | 3841 | 5951 | 0.82 | 2.13 |
| 3c | 2638 | 3924 | 5169 | 0.65 | 1.96 |
| 4a | 111 | 275 | 7285 | 26.1 | 65.63 |
| 5e | 4920 | 7109 | 9692 | 0.67 | 1.97 |
| 5f | 3147 | 4005 | 4724 | 0.39 | 1.50 |
| 5b | 1089 | 1601 | 2174 | 0.68 | 2.00 |
| 5c | 1178 | 1696 | 2226 | 0.62 | 1.89 |
| 5d | 1031 | 1463 | 1928 | 0.61 | 1.87 |
| 4b | 864 | 1100 | 1400 | 0.49 | 1.62 |

TABLE F-continued

| Polymer Example | <250 µm (wt. %) | <500 µm (wt. %) | >2500 µm (wt. %) | >3000 µm (wt. %) |
|---|---|---|---|---|
| 2d-1 | 0.3 | 1.8 | 16.8 | 12.0 |
| 2b | 0.2 | 5.1 | 9.3 | 3.7 |
| 3a | 6.2 | 28.6 | 5.8 | 1.4 |
| 3b2 | 1.7 | 12.8 | 6.9 | 3.5 |
| 5b | 0.1 | 0.1 | 3.8 | 1.9 |
| 5c | 0.0 | 0.0 | 2.6 | 0.1 |
| 5d | 0.1 | 0.1 | 2.4 | 1.8 |
| 4b | 0.1 | 0.2 | 0.2 | 0.0 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A catalyst component characterized by (a) a d50 average particle size in a range from 60 to 140 µm, (b) a particle size span ((d90−d10)/d50) in a range from 0.6 to 1.8, and (c) a bulk density in a range from 0.22 to 0.42 g/mL, wherein less than or equal to 10 wt. % of the catalyst component has a particle size of less than or equal to 10 µm.

Aspect 2. The catalyst component defined in aspect 1, wherein the d50 average particle size is in a range from 60 to 130 µm, from 60 to 120 µm, from 70 to 140 µm, from 70 to 130 µm, from 70 to 120 µm, from 80 to 140 µm, from 80 to 130 µm, or from 80 to 120 µm.

Aspect 3. The catalyst component defined in aspect 1 or 2, wherein the span is in a range from 0.6 to 1.7, from 0.6 to 1.6, from 0.6 to 1.5, from 0.7 to 1.8, from 0.7 to 1.7, from 0.7 to 1.6, from 0.7 to 1.5, from 0.8 to 1.8, from 0.8 to 1.7, from 0.8 to 1.6, from 0.8 to 1.5, from 0.9 to 1.7, from 0.9 to 1.6, or from 0.9 to 1.5.

Aspect 4. The catalyst component defined in any one of aspects 1-3, wherein the bulk density is in range from 0.22 to 0.4 g/mL, from 0.22 to 0.38 g/mL, from 0.22 to 0.35 g/mL, from 0.24 to 0.42 g/mL, from 0.24 to 0.38 g/mL, from 0.24 to 0.35 g/mL, from 0.26 to 0.4 g/mL, from 0.26 to 0.38 g/mL, or from 0.26 to 0.35 g/mL.

Aspect 5. The catalyst component defined in any one of aspects 1-4, wherein less than or equal to 9 wt. %, less than or equal to 8 wt. %, less than or equal to 6 wt. %, or less than or equal to 4 wt. %, of the catalyst component has a particle size of less than or equal to 10 µm.

Aspect 6. The catalyst component defined in any one of aspects 1-5, wherein less than or equal to 10 wt. %, less than or equal to 8 wt. %, less than or equal to 6 wt. %, less than or equal to 5 wt. %, or less than or equal to 4 wt. %, of the catalyst component has a particle size of greater than or equal to 200 µm.

Aspect 7. The catalyst component defined in any one of aspects 1-6, wherein the catalyst component has a ratio of d90/d50 in a range from 1.2 to 2.2, from 1.2 to 2, from 1.2 to 1.9, from 1.3 to 2.2, from 1.3 to 2, from 1.3 to 1.9, from 1.4 to 2.2, from 1.4 to 2.1, or from 1.4 to 1.9.

Aspect 8. A catalyst component characterized by (A) a d50 average particle size in a range from 30 to 70 μm, (B) a particle size span ((d90−d10)/d50) in a range from 0.6 to 1.8, and (C) a bulk density in a range from 0.22 to 0.42 g/mL, wherein less than or equal to 10 wt. % of the catalyst component has a particle size of greater than or equal to 100 μm.

Aspect 9. The catalyst component defined in aspect 8, wherein the d50 average particle size is in a range from 30 to 60 μm, from 30 to 55 μm, from 30 to 50 μm, from 35 to 70 μm, from 35 to 65 μm, from 35 to 60 μm, from 35 to 55 μm, from 35 to 50 μm, from 40 to 65 μm, or from 40 to 60 μm.

Aspect 10. The catalyst component defined in aspect 8 or 9, wherein the span is in a range from 0.6 to 1.7, from 0.6 to 1.6, from 0.6 to 1.5, from 0.7 to 1.8, from 0.7 to 1.7, from 0.7 to 1.6, from 0.7 to 1.5, from 0.8 to 1.8, from 0.8 to 1.7, from 0.8 to 1.6, from 0.8 to 1.4, from 0.8 to 1.2, from 0.9 to 1.6, from 0.9 to 1.4, from 0.9 to 1.3, or from 0.9 to 1.2.

Aspect 11. The catalyst component defined in any one of aspects 8-10, wherein the bulk density is in range from 0.22 to 0.4 g/mL, from 0.22 to 0.38 g/mL, from 0.22 to 0.35 g/mL, from 0.24 to 0.42 g/mL, from 0.24 to 0.38 g/mL, from 0.24 to 0.35 g/mL, from 0.26 to 0.4 g/mL, from 0.26 to 0.38 g/mL, or from 0.26 to 0.35 g/mL.

Aspect 12. The catalyst component defined in any one of aspects 8-11, wherein less than or equal to 8 wt. %, less than or equal to 7 wt. %, less than or equal to 6 wt. %, less than or equal to 4 wt. %, less than or equal to 3 wt. %, or less than or equal to 2 wt. %, of the catalyst component has a particle size of greater than or equal to 100 μm.

Aspect 13. The catalyst component defined in any one of aspects 8-12, wherein less than or equal to 10 wt. %, less than or equal to 9 wt. %, less than or equal to 8 wt. %, less than or equal to 7 wt. %, less than or equal to 6 wt. %, or less than or equal to 4 wt. %, of the catalyst component has a particle size of less than or equal to 10 μm.

Aspect 14. The catalyst component defined in any one of aspects 8-13, wherein the catalyst component has a ratio of d90/d50 in a range from 1.1 to 2.1, from 1.1 to 2, from 1.1 to 1.9, from 1.1 to 1.8, from 1.2 to 2, from 1.2 to 1.9, from 1.2 to 1.8, from 1.3 to 2, or from 1.3 to 1.8.

Aspect 15. The catalyst component defined in any one of aspects 1-14, wherein the catalyst component has a sphericity in a range from 0.9 to 0.98, from 0.9 to 0.97, from 0.9 to 0.95, from 0.91 to 0.98, from 0.91 to 0.97, from 0.91 to 0.95, from 0.93 to 0.97, or from 0.93 to 0.95.

Aspect 16. The catalyst component defined in any one of aspects 1-15, wherein the catalyst component has a compactness in a range from 0.75 to 0.87, from 0.75 to 0.85, from 0.75 to 0.83, from 0.8 to 0.85, from 0.8 to 0.83, from 0.81 to 0.87, from 0.81 to 0.85, or from 0.81 to 0.83.

Aspect 17. The catalyst component defined in any one of aspects 1-16, wherein the catalyst component has an aspect ratio (W/L) in a range from 0.7 to 0.78, from 0.7 to 0.76, from 0.7 to 0.75, from 0.71 to 0.78, from 0.71 to 0.75, from 0.72 to 0.78, from 0.72 to 0.76, or from 0.72 to 0.75.

Aspect 18. The catalyst component defined in any one of aspects 1-17, wherein the catalyst component has a wet particle density in a range from 1.05 to 2.0 g/cc, from 1.05 to 1.5 g/cc, from 1.2 to 2.0 g/cc, from 1.2 to 1.8 g/cc, from 1.2 to 1.6 g/cc, from 1.3 to 1.9 g/cc, from 1.3 to 1.7 g/cc, or from 1.3 to 1.5 g/cc.

Aspect 19. The catalyst component defined in any one of aspects 1-18, wherein the catalyst component has a BET surface area in a range from 50 to 1000 $m^2/g$, from 100 to 700 $m^2/g$, from 100 to 400 $m^2/g$, from 150 to 500 $m^2/g$, or from 200 to 450 $m^2/g$.

Aspect 20. The catalyst component defined in any one of aspects 1-19, wherein the catalyst component has a pore volume (total) in a range from 0.3 to 5 mL/g, from 0.5 to 5 mL/g, from 0.3 to 3 mL/g, from 0.5 to 2 mL/g, from 0.5 to 1.8 mL/g, or from 0.7 to 1.6 mL/g.

Aspect 21. The catalyst component defined in any one of aspects 1-20, wherein the catalyst component comprises a solid oxide, e.g., silica, alumina, silica-alumina, silica-coated alumina, aluminum phosphate, aluminophosphate, heteropolytungstate, titania, zirconia, magnesia, boria, zinc oxide, silica-titania, silica-zirconia, alumina-titania, alumina-zirconia, zinc-aluminate, alumina-boria, alumina borate, silica-boria, aluminophosphate-silica, or titania-zirconia; a clay, e.g., an acid-modified clay or a zinc-exchanged clay; or any combination thereof.

Aspect 22. The catalyst component defined in any one of aspects 1-20, wherein the catalyst component comprises silica, silica-alumina, silica-coated alumina, silica-titania, silica-titania-magnesia, silica-zirconia, silica-magnesia, silica-boria, aluminophosphate-silica, alumina, alumina borate, or any combination thereof.

Aspect 23. The catalyst component defined in any one of aspects 1-20, wherein the catalyst component comprises a chemically-treated solid oxide comprising a solid oxide (e.g., as in aspect 21 or 22, such as silica, alumina, silica-alumina, silica-coated alumina, silica-titania, silica-zirconia, silica-yttria, aluminophosphate, zirconia, titania, thoria, or stania) treated with an electron-withdrawing anion.

Aspect 24. The catalyst component defined in aspect 23, wherein the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, or any combination thereof.

Aspect 25. The catalyst component defined in aspect 23 or 24, wherein the chemically-treated solid oxide contains from 1 to 30 wt. %, from 2 to 20 wt. %, from 2 to 15 wt. %, from 2 to 10 wt. %, or from 3 to 10 wt. %, of the electron-withdrawing anion, based on a total weight of the chemically-treated solid oxide.

Aspect 26. The catalyst component defined in any one of aspects 1-20, wherein the catalyst component comprises a chemically-treated solid oxide comprising fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 27. The catalyst component defined in any one of aspects 1-20, wherein the catalyst component comprises a clay, an acid-modified clay, a zinc-exchanged clay, or a combination thereof.

Aspect 28. The catalyst component defined in any one of aspects 1-20, wherein the catalyst component comprises alumina, silica-alumina, silica-coated alumina, clay, or a combination thereof.

Aspect 29. The catalyst component defined in any one of aspects 1-28, wherein the catalyst component further comprises chromium, vanadium, titanium, zirconium, hafnium, or a combination thereof, supported on the solid oxide, the chemically-treated solid oxide, or the clay (or the acid-modified clay).

Aspect 30. The catalyst component defined in any one of aspects 1-20, wherein the catalyst component comprises a chromium/silica catalyst, a chromium/silica-titania catalyst, a chromium/silica-titania-magnesia catalyst, a chromium/silica-alumina catalyst, a chromium/silica-coated alumina catalyst, a chromium/aluminophosphate catalyst, a chromium/alumina catalyst, a chromium/alumina borate catalyst, or any combination thereof.

Aspect 31. The catalyst component defined in any one of aspects 1-20, wherein the catalyst component comprises a chromium/sulfated alumina catalyst, a chromium/fluorided alumina catalyst, a chromium/fluorided silica-alumina catalyst, a chromium/fluorided silica-coated alumina catalyst, or any combination thereof.

Aspect 32. An ethylene polymer (fluff or powder) composition having (or characterized by) a d50 average particle size in a range from 700 to 1800 μm, a particle size span ((d90−d10)/d50) in a range from 0.4 to 2.4, less than or equal to 7 vol % (or wt. %) of the composition with a particle size of less than or equal to 250 μm, and less than or equal to 18 vol % (or wt. %) of the composition with a particle size of greater than or equal to 2500 μm.

Aspect 33. The composition defined in aspect 32, wherein the d50 average particle size is in a range from 700 to 1700 μm, from 700 to 1500 μm, from 700 to 1300 μm, from 800 to 1800 μm, from 800 to 1700 μm, from 800 to 1600 μm, from 800 to 1400 μm, from 900 to 1700 μm, or from 900 to 1500 μm.

Aspect 34. The composition defined in aspect 32 or 33, wherein the span is in a range from 0.4 to 2, from 0.4 to 1.8, from 0.4 to 1.5, from 0.4 to 1, from 0.4 to 0.8, from 0.45 to 2.4, from 0.45 to 2, from 0.45 to 1.8, from 0.45 to 1.5, from 0.45 to 1, or from 0.45 to 0.8.

Aspect 35. The composition defined in any one of aspects 32-34, wherein the amount of the composition having a particle size of less than or equal to 250 μm is less than or equal to 4%, less than or equal to 2%, less than or equal to 1%, less than or equal to 0.5%, or less than or equal to 0.3%.

Aspect 36. The composition defined in any one of aspects 32-35, wherein the amount of the composition having a particle size of greater than or equal to 2500 μm is less than or equal to 10%, less than or equal to 7%, less than or equal to 5%, less than or equal to 3%, or less than or equal to 1%.

Aspect 37. The composition defined in any one of aspects 32-36, wherein the composition has a d90 particle size in a range from 1200 to 3500 μm, from 1200 to 2500 μm, from 1200 to 2000 μm, from 1300 to 3500 μm, from 1300 to 2500 μm, from 1300 to 2200 μm, or from 1300 to 2000 μm.

Aspect 38. The composition defined in any one of aspects 32-37, wherein the composition has a d10 particle size in a range from 300 to 1300 μm, from 300 to 1200 μm, from 400 to 1300 μm, from 400 to 1200 μm, from 500 to 1300 μm, from 500 to 1200 μm, or from 700 to 1200 μm.

Aspect 39. The composition defined in any one of aspects 32-38, wherein the composition has a ratio of d90/d10 in a range from 1.2 to 6, from 1.2 to 5, from 1.2 to 4, from 1.2 to 2, from 1.4 to 5, from 1.4 to 3, from 1.4 to 3, from 1.5 to 5, from 1.5 to 2.5, or from 1.5 to 2.

Aspect 40. The composition defined in any one of aspects 32-39, wherein the amount of the composition having a particle size of less than or equal to 500 μm is less than or equal to 15%, less than or equal to 7%, less than or equal to 4%, less than or equal to 2%, less than or equal to 1%, or less than or equal to 0.5%.

Aspect 41. The composition defined in any one of aspects 32-40, wherein the amount of the composition having a particle size of greater than or equal to 3000 μm is less than or equal to 12%, less than or equal to 5%, less than or equal to 3%, less than or equal to 2%, less than or equal to 1%, or less than or equal to 0.5%.

Aspect 42. The composition defined in any one of aspects 32-41, wherein the composition has a HLMI in a range from 1 to 100, from 2 to 80, from 3 to 60, from 4 to 50, or from 5 to 40 g/10 min.

Aspect 43. The composition defined in any one of aspects 32-42, wherein the composition has a density in a range from 0.90 to 0.965, from 0.91 to 0.96, from 0.91 to 0.95, from 0.92 to 0.96, or from 0.92 to 0.95 g/cm$^3$.

Aspect 44. The composition defined in any one of aspects 32-43, wherein the composition comprises an ethylene/α-olefin copolymer.

Aspect 45. The composition defined in any one of aspects 32-44, wherein the composition comprises an ethylene homopolymer, an ethylene/1-butene copolymer, an ethylene/1-hexene copolymer, and/or an ethylene/1-octene copolymer.

Aspect 46. The composition defined in any one of aspects 32-45, wherein the composition comprises an ethylene/1-hexene copolymer.

Aspect 47. A polymerization process comprising contacting a catalyst composition comprising the catalyst component defined in any one of aspects 1-31 and an optional co-catalyst with an olefin monomer and an optional olefin comonomer in a polymerization reactor system under polymerization conditions to produce an olefin polymer.

Aspect 48. The process defined in aspect 47, wherein the olefin polymer is the ethylene polymer composition defined in any one of aspects 32-46.

Aspect 49. The process defined in aspect 47 or 48, wherein the olefin monomer comprises any olefin monomer disclosed herein, e.g., any $C_2$-$C_{20}$ olefin.

Aspect 50. The process defined in any one of aspects 47-49, wherein the olefin monomer and the optional olefin comonomer independently comprise a $C_2$-$C_{20}$ alpha-olefin.

Aspect 51. The process defined in any one of aspects 47-50, wherein the olefin monomer comprises ethylene.

Aspect 52. The process defined in any one of aspects 47-51, wherein the catalyst composition is contacted with ethylene and the olefin comonomer comprising a $C_3$-$C_{10}$ alpha-olefin.

Aspect 53. The process defined in any one of aspects 47-52, wherein the catalyst composition is contacted with ethylene and the olefin comonomer comprising 1-butene, 1-hexene, 1-octene, or a mixture thereof.

Aspect 54. The process defined in any one of aspects 47-53, wherein the polymerization reactor system comprises a slurry reactor, a gas-phase reactor, a solution reactor, a multizone circulating reactor, or a combination thereof, alternatively, a loop slurry reactor; or alternatively, a fluidized bed reactor.

Aspect 55. The process defined in any one of aspects 47-54, wherein the polymerization reactor system comprises two or more reactors.

Aspect 56. The process defined in any one of aspects 47-55, wherein the olefin polymer comprises any olefin polymer disclosed herein.

Aspect 57. The process defined in any one of aspects 47-56, wherein the olefin polymer comprises an ethylene homopolymer, an ethylene/1-butene copolymer, an ethylene/1-hexene copolymer, and/or an ethylene/1-octene copolymer.

Aspect 58. The process defined in any one of aspects 47-57, wherein the olefin polymer comprises an ethylene/1-hexene copolymer.

Aspect 59. The process defined in any one of aspects 47-58, wherein the polymerization conditions comprise a polymerization reaction temperature in a range from 60° C. to 120° C. and a reaction pressure in a range from 200 to 1000 psig (1.4 to 6.9 MPa).

Aspect 60. The process defined in any one of aspects 47-59, wherein hydrogen is added to the polymerization reactor system.

Aspect 61. A method comprising (i) contacting a catalyst system component with a fluid to form a paste, wherein an amount of the fluid is in a range from 75 to 200% of a void volume of the catalyst system component, (ii) drying the paste to form a solid, and (iii) comminuting the solid to form a modified catalyst system component, wherein an amount (percentage by weight) of the modified catalyst system component having a particle size of less than or equal to 10 μm is less than that of the catalyst system component.

Aspect 62. The method defined in aspect 62, wherein step (i) comprises working, kneading, rolling, mixing, compressing, compacting, extruding, applying mechanical energy to, or any combination thereof, the paste (or a blend of the catalyst system component and the fluid).

Aspect 63. The method defined in aspect 61 or 62, wherein the amount of the fluid is from 80 to 150%, or from 85 to 125%, of the void volume.

Aspect 64. The method defined in any one of aspects 61-63, wherein a yield of the modified catalyst system component based on the paste (or the catalyst system component) is at least 40 wt. %, at least 50 wt. %, at least 60 wt. %, at least 70 wt. %, at least 80 wt. %, or at least 90 wt. %.

Aspect 65. A method comprising (I) contacting a catalyst system component with a fluid to form agglomerated particles, wherein an amount of the fluid is in a range from 10 to 90% of a void volume of the catalyst system component, and (II) drying the agglomerated particles to form a modified catalyst system component, wherein an amount (percentage by weight) of the modified catalyst system component having a particle size of less than or equal to 10 μm is less than that of the catalyst system component.

Aspect 66. The method defined in aspect 65, wherein step (I) comprises working, kneading, rolling, mixing, compressing, compacting, extruding, applying mechanical energy to, or any combination thereof, the agglomerated particles (or a blend of the catalyst system component and the fluid).

Aspect 67. The method defined in aspect 65 or 66, wherein the method further comprises (III) comminuting the modified catalyst system component.

Aspect 68. The method defined in any one of aspects 65-67, wherein the amount of the fluid is from 20 to 80%, or from 30 to 70%, of the void volume.

Aspect 69. The method defined in any one of aspects 65-68, wherein a yield of the modified catalyst system component based on the agglomerated particles (or the catalyst system component) is at least 40 wt. %, at least 50 wt. %, at least 60 wt. %, at least 70 wt. %, at least 80 wt. %, or at least 90 wt. %.

Aspect 70. The method defined in any one of aspects 65-69, wherein the agglomerated particles in step (I) and/or in step (II) are free flowing particles.

Aspect 71. The method defined in any one of aspects 65-70, wherein a d90 of the catalyst system component is within +/−25%, +/−20%, +/−15%, or +/−10%, of a d90 of the modified catalyst system component.

Aspect 72. The method defined in any one of aspects 61-71, wherein the modified catalyst system component is the catalyst component defined in any one of aspects 1-31.

Aspect 73. The method defined in any one of aspects 61-72, wherein the catalyst system component has a void volume in a range from 0.3 to 5 mL/g, from 0.5 to 4 mL/g, from 0.5 to 3 mL/g, from 0.5 to 2 mL/g, from 0.6 to 3 mL/g, or from 0.9 to 1.9 mL/g.

Aspect 74. The method defined in any one of aspects 61-73, wherein a compaction ratio of the method (bulk density of the modified catalyst system component divided by the bulk density of the catalyst system component) is at least 1.05, at least 1.1, at least 1.15, at least 1.2, at least 1.25, at least 1.3, at least 1.4, at least 1.5, at least 1.6, at least 1.7, at least 1.8, at least 1.9, or at least 2; additionally or alternatively, the compaction ratio is less than or equal to 5, less than or equal to 4.5, less than or equal to 4, less than or equal to 3.5, less than or equal to 3, less than or equal to 2.8, less than or equal to 2.4, less than or equal to 2, less than or equal to 1.8, or less than or equal to 1.5; and additionally or alternatively, the compaction ratio is in a range from any minimum compaction ratio to any maximum compaction ratio disclosed herein, such as from 1.05 to 5, from 1.1 to 4.5, from 1.1 to 3, from 1.1 to 2.4, from 1.1 to 1.8, from 1.2 to 3.5, from 1.2 to 2, from 1.2 to 1.8, from 1.2 to 1.5, from 1.5 to 4, from 1.5 to 3, from 1.5 to 2.4, from 2 to 5, from 2 to 4, or from 2 to 3.

Aspect 75. The method defined in any one of aspects 61-74, wherein the amount of the modified catalyst system component having a particle size of less than or equal to 10 μm is at least 10% less, at least 25% less, at least 40% less, at least 50% less, at least 60% less, at least 70% less, at least 80% less, or at least 90% less than that of the catalyst system component.

Aspect 76. The method defined in any one of aspects 61-75, wherein the fluid comprises at least 50 wt. %, at least 75 wt. %, at least 85 wt. %, at least 95 wt. %, at least 98 wt. %, or at least 99 wt. % water.

Aspect 77. The method defined in any one of aspects 61-76, wherein the fluid comprises a mixture of water and an alcohol compound.

Aspect 78. The method defined in any one of aspects 61-77, wherein the fluid further comprises a binder.

Aspect 79. The method defined in aspect 78, wherein the binder comprises an acid.

Aspect 80. The method defined in aspect 78, wherein the binder comprises a carbohydrate.

Aspect 81. The method defined in aspect 80, wherein the carbohydrate comprises a konjac, a glucose-starch, a chemically resistance starch, a dextrin, an inulin, a guar gum, a carboxycellulose, a glucomannan, a psyllium, or a combination thereof.

Aspect 82. The method defined in aspect 78, wherein the binder comprises a mineral.

Aspect 83. The method defined in aspect 82, wherein the mineral comprises a colloidal titania, a colloidal silica, a colloidal alumina-treated silica, a bentonite, a kaolin, or any combination thereof.

Aspect 84. The method defined in aspect 78, wherein the binder comprises a protein.

Aspect 85. The method defined in aspect 84, wherein the protein comprises a casein, a gelatin, a collagen, a collagen peptide, or a combination thereof.

Aspect 86. The method defined in aspect 78, wherein the binder comprises a polymer.

Aspect 87. The method defined in aspect 86, wherein the polymer comprises a polyvinyl alcohol, a polyoxyethylene, a polyoxypropylene, a polyvinyl pyrrolidone, a siloxane, a water-soluble or swellable organic polymer, or any combination thereof.

Aspect 88. The method defined in any one of aspects 61-87, wherein step (i) and step (I) comprise contacting the catalyst system component with the fluid in any suitable mixing device, e.g., a paddle blender, a ribbon blender, a fluidized bed mixer, a pin mixer, a tumble mixer, a roll mixer, a drum mixer, a tilted saucer or pan mixer, or any combination thereof.

Aspect 89. The method defined in any one of aspects 61-88, wherein step (ii) and step (II) comprise fluidized bed drying, rotary kiln drying, oven drying, tray drying, spray drying, flash drying, oil drying, belt drying, roll drying, or any combination thereof.

Aspect 90. The method defined in any one of aspects 61-89, wherein step (iii) and step (III) comprise comminuting in any suitable device, e.g., an impact crusher, a hammer mill, a jet mill, a ball or roller mill, a roll crusher, a jaw crusher, a v-crusher, an ultrasonic device, a blender, a rotating paddle mill, a grinder, or any combination thereof.

Aspect 91. The method defined in any one of aspects 61-90, further comprising a step of isolating a target particle size fraction from the modified catalyst system component.

Aspect 92. The method defined in aspect 91, wherein isolating comprising sieving, screening, air classifying, settling, cycloning, hydrocycloning, or any combination thereof.

Aspect 93. The method defined in aspect 91 or 92, further comprising segregating a first portion (all or any fraction) of the modified catalyst system component having particle sizes less than that of the target particle size fraction, and recycling the first portion to step (i) or step (I).

Aspect 94. The method defined in any one of aspects 91-93, further comprising segregating a second portion (all or any fraction) of the modified catalyst system component having particle sizes greater than that of the target particle size fraction, and recycling the second portion to step (iii) or optional step (III).

Aspect 95. The method defined in aspect 93 or 94, wherein the segregating and recycling steps are performed two or more times.

Aspect 96. The method defined in any one of aspects 91-95, wherein a yield of the target particle size fraction based on the catalyst system component is at least 70 wt. %, at least 80 wt. %, at least 90 wt. %, at least 95 wt. %, at least 98 wt. %, at least 99 wt. %, or at least 99.5 wt. %.

Aspect 97. A method comprising (i) contacting a catalyst system component with a fluid to form a paste, wherein an amount of the fluid is in a range from 75 to 200% of a void volume of the catalyst system component, (ii) drying the paste to form a solid, (iii) comminuting the solid to form a modified catalyst system component, wherein an amount (percentage by weight) of the modified catalyst system component having a particle size of less than or equal to 10 μm is less than that of the catalyst system component, (iv) isolating a target particle size fraction from the modified catalyst system component, (v) segregating a first portion of the modified catalyst system component having particle sizes less than that of the target particle size fraction, and recycling the first portion to step (i), and (vi) segregating a second portion of the modified catalyst system component having particle sizes greater than that of the target particle size fraction, and recycling the second portion to step (iii).

Aspect 98. A method comprising (I) contacting a catalyst system component with a fluid to form agglomerated particles, wherein an amount of the fluid is in a range from 10 to 90% of a void volume of the catalyst system component, (II) drying the agglomerated particles to form a modified catalyst system component, (III) comminuting the modified catalyst system component, wherein an amount (percentage by weight) of the modified catalyst system component having a particle size of less than or equal to 10 μm is less than that of the catalyst system component, (IV) isolating a target particle size fraction from the modified catalyst system component, (V) segregating a first portion of the modified catalyst system component having particle sizes less than that of the target particle size fraction, and recycling the first portion to step (I), and (VI) segregating a second portion of the modified catalyst system component having particle sizes greater than that of the target particle size fraction, and recycling the second portion to step (III).

We claim:

1. A method comprising:

(I) contacting a catalyst system component with a fluid comprising at least 50 wt. % water to form agglomerated particles, wherein an amount of the fluid is in a range from 10 to 90% of a void volume of the catalyst system component; and (II) drying the agglomerated particles to form a modified catalyst system component;

wherein an amount in percentage by weight of the modified catalyst system component having a particle size of less than or equal to 10 μm is less than that of the catalyst system component.

2. The method of claim 1, wherein the method further comprises (III) comminuting the modified catalyst system component.

3. The method of claim 2, further comprising:

(IV) isolating a target particle size fraction from the modified catalyst system component;

(V) segregating a first portion of the modified catalyst system component having particle sizes less than that of the target particle size fraction, and recycling the first portion to step (I); and (VI) segregating a second portion of the modified catalyst system component having particle sizes greater than that of the target particle size fraction, and recycling the second portion to step (III).

4. The method of claim 3, wherein the segregating and recycling steps are performed two or more times.

5. The method of claim 3, wherein a yield of the target particle size fraction based on the catalyst system component in step (I) is at least 70 wt. %.

6. The method of claim 1, wherein step (I) comprises working, kneading, rolling, mixing, compressing, compacting, extruding, applying mechanical energy to, or any combination thereof, the agglomerated particles or a blend of the catalyst system component and the fluid.

7. The method of claim 1, wherein:

the amount of the fluid is from 30 to 70% of the void volume;

the agglomerated particles in step (I) and/or in step (II) are free flowing particles;

a d90 of the catalyst system component in step (I) is within +/−25% of a d90 of the modified catalyst system component in step (II); or any combination thereof.

8. The method of claim 1, wherein:

the void volume of the catalyst system component is in a range from 0.3 to 5 mL/g;

a compaction ratio of a bulk density of the modified catalyst system component divided by a bulk density of the catalyst system component is from 1.05 to 5;

the amount of the modified catalyst system component having a particle size of less than or equal to 10 μm is at least 25% less than that of the catalyst system component;

the fluid comprises at least 95 wt. % water; or any combination thereof.

9. The method of claim 1, wherein:

the fluid further comprises a binder; and the binder comprises an acid, a carbohydrate, a mineral, a protein, a polymer, or a combination thereof.

10. The method of claim 1, wherein:

step (I) comprises contacting the catalyst system component with the fluid in a paddle blender, a ribbon blender, a fluidized bed mixer, a pin mixer, a tumble mixer, a roll mixer, a drum mixer, a tilted saucer or pan mixer, or any combination thereof; and/or step (II) comprises fluidized bed drying, rotary kiln drying, oven drying, tray drying, spray drying, flash drying, oil drying, belt drying, roll drying, or any combination thereof.

11. The method of claim 1, wherein the catalyst system component comprises a solid oxide or a chemically-treated solid oxide.

12. The method of claim 1, wherein the catalyst system component comprises a clay, an acid-modified clay, a zinc-exchanged clay, or a combination thereof.

13. The method of claim 1, wherein the catalyst system component comprises a supported catalyst.

14. The method of claim 1, wherein the catalyst system component comprises silica, silica-titania, silica-coated alumina, sulfated alumina, fluorided silica-coated alumina, sulfated bentonite, a chromium/silica catalyst, or a chromium/silica-titania catalyst.

15. The method of claim 1, wherein:

the amount of the fluid is from 30 to 70% of the void volume;

a d90 of the catalyst system component in step (I) is within +/−25% of a d90 of the modified catalyst system component in step (II);

the amount of the modified catalyst system component having a particle size of less than or equal to 10 μm is at least 25% less than that of the catalyst system component; and the fluid comprises at least 95 wt. % water.

16. A method comprising:

(i) contacting a catalyst system component with a fluid comprising at least 50 wt. % water to form a paste, wherein an amount of the fluid is in a range from 75 to 200% of a void volume of the catalyst system component;

(ii) drying the paste to form a solid; and (iii) comminuting the solid to form a modified catalyst system component;

wherein an amount in percentage by weight of the modified catalyst system component having a particle size of less than or equal to 10 μm is less than that of the catalyst system component.

17. The method of claim 16, wherein:

step (i) comprises working, kneading, rolling, mixing, compressing, compacting, extruding, applying mechanical energy to, or any combination thereof, the paste or a blend of the catalyst system component and the fluid;

the amount of the fluid is from 80 to 150% of the void volume;

a yield of the modified catalyst system component based on the paste or the catalyst system component is at least 40 wt. %; or any combination thereof.

18. The method of claim 16, further comprising:

(iv) isolating a target particle size fraction from the modified catalyst system component;

(v) segregating a first portion of the modified catalyst system component having particle sizes less than that of the target particle size fraction, and recycling the first portion to step (i); and (vi) segregating a second portion of the modified catalyst system component having particle sizes greater than that of the target particle size fraction, and recycling the second portion to step (iii).

19. The method of claim 18, wherein:

the segregating and recycling steps are performed two or more times; and a yield of the target particle size fraction based on the catalyst system component in step (i) is at least 70 wt. %.

20. The method of claim 16, wherein the catalyst system component comprises a solid oxide, a chemically-treated solid oxide, a clay, an acid-modified clay, a zinc-exchanged clay, or a combination thereof.

21. The method of claim 20, wherein:

the amount of the fluid is from 85 to 125% of the void volume; and the fluid comprises at least 95 wt. % water.

22. The method of claim 16, wherein the catalyst system component comprises a supported catalyst.

* * * * *